(12) United States Patent
Ayabe et al.

(10) Patent No.: US 7,470,042 B2
(45) Date of Patent: Dec. 30, 2008

(54) LUMINESCENT LIGHT SOURCE AND LUMINESCENT LIGHT SOURCE ARRAY

(75) Inventors: Takahiro Ayabe, Otsu (JP); Akira Matsui, Joyo (JP); Hironobu Kiyomoto, Nara (JP)

(73) Assignee: OMRON Corporation, Kyoto (JP)

( * ) Notice: Subject to any disclaimer, the term of this patent is extended or adjusted under 35 U.S.C. 154(b) by 23 days.

(21) Appl. No.: 11/333,121

(22) Filed: Jan. 17, 2006

(65) Prior Publication Data
US 2006/0158899 A1    Jul. 20, 2006

(30) Foreign Application Priority Data
Jan. 17, 2005    (JP)    ............... 2005-008760
Dec. 5, 2005    (JP)    ............... 2005-351315

(51) Int. Cl.
F21V 7/00    (2006.01)
(52) U.S. Cl. ............... 362/297; 362/346; 362/348
(58) Field of Classification Search ............... 362/297, 362/346, 348
See application file for complete search history.

(56) References Cited

U.S. PATENT DOCUMENTS

| | | | | |
|---|---|---|---|---|
| 4,021,659 A | | 5/1977 | Wiley | |
| 5,568,967 A | * | 10/1996 | Sikkens et al. | ............... 362/297 |
| 5,613,751 A | * | 3/1997 | Parker et al. | ............... 362/297 |
| 2002/0080622 A1 | | 6/2002 | Pashley et al. | |
| 2004/0027833 A1 | | 2/2004 | Amano et al. | |
| 2004/0119668 A1 | | 6/2004 | Homma et al. | |

FOREIGN PATENT DOCUMENTS

JP    2004-186092    12/2002

OTHER PUBLICATIONS

European Search Report issued in European Patent Application 06100391.9, dated Apr. 21, 2006, 9 pages.
Taiwanese Patent Office Search Report issued in Taiwanese Application No. 095100488 completed May 16, 2008, 1 page.

\* cited by examiner

*Primary Examiner*—Ali Alavi
*Assistant Examiner*—William J Carter
(74) *Attorney, Agent, or Firm*—Osha • Liang LLP

(57) ABSTRACT

To provide a luminescent light source that can increase the number of divisions of a reflecting mirror without reducing pitch interval of reflection areas. A luminescent light source comprises a reflecting mirror for reflecting light, a mold unit arranged on a light reflection surface of the reflecting mirror, and light emitting devices of three luminescent devices of red, blue and green that are placed in the central part and output light to the mold unit. In the reflecting mirror, rectangular reflection areas are arranged vertically and horizontally in a grid.

15 Claims, 81 Drawing Sheets

US 7,470,042 B2

LUMINESCENT LIGHT SOURCE AND LUMINESCENT LIGHT SOURCE ARRAY

BACKGROUND OF THE INVENTION

1. Field of the Invention

This invention relates to a luminescent light source and a luminescent light source array, and, more specifically, to a luminescent light source or a luminescent light source array using an LED (light emitting diode) chip. In addition, the invention relates to a lighting system or a liquid crystal display device, etc.

2. Description of the Related Art

A luminescent light source that has a large area and high light use efficiency is disclosed in Patent Document 1. FIG. 1 shows a cross sectional view of a part of such a luminescent light source. In the luminescent light source 11, a white-color or monochromatic light emitting device 13 is arranged in the central part of the back side of a mold unit 14 made of transparent resin, and a reflecting mirror 12 is formed by depositing a metal thin film such as Al or Au, Ag, etc. in a concentric pattern formed on the back side of the mold unit 14. FIG. 2 shows a front elevation in which the light emitting device 13 and the reflecting mirror 22 are represented with the mold unit 14 excluded from the luminescent light source 11. The reflecting mirror is concentric and consists of a plurality of concentrically arranged ring zone shaped reflecting areas 12a, 12b, . . . .

Thus, at the luminescent light source 11, as shown in FIG. 1, among light exiting from the light emitting device 13, light L1 incident to a central part 15a of the front side of the mold unit 14 (hereinafter referred to as a direct output area) transmits through the direct output area 15a and is outputted to the front side. In addition, light L2 incident to an area other than the direct output area 15a on the front face of the mold unit 14 (hereinafter referred to as total reflection area) 15b is reflected by the reflecting mirror 12 after being totally reflected in the total reflection area 15b, then transmits through the total reflection area 15b, and is outputted to the front face. Thus, in such the luminescent light source 11, expansion A of the light L2 reflected by one reflection area (e.g., 12c) substantially equals to size of the reflection area (e.g., 12c).

In a backlight for color liquid crystal display, use of a multi-color light source such as red LED, green LED, blue LED, etc. allows three primary colors of the color liquid crystal display to exhibit bright color and to offer excellent color reproducibility, than using a white light source such as white LED. However, in the luminescent light source 11 configured as described above, when three light emitting devices of red, green and blue, for instance, are arranged in the central area of the reflecting mirror 12 to configure a white light source, each color will be separated, leading to the problem of irregular color in the luminescent light source 11. In the following we explain the reasons. FIG. 3 represents light behavior of respective colors when the light emitting devices of three luminescent colors 13R, 13G, 13B of three colors, i.e., red, green and blue are arranged in the central area of the luminescent light source 11. For instance, in FIG. 3, red light is represented as LR, green light is represented as LG, and blue light is represented as LB, wherein an irradiated area of red light LR at a certain distance from the luminescent light source 11 is represented as AR, that of green light LG is represented as AG, and that of blue light LB is represented as AB.

In the case of the luminescent light source 11, since positions of the respective light emitting devices 13R, 13G, 13B are slightly offset, output directions of light reflected by the reflection area 12c after being reflected by the total reflection area 15b differ, depending on a color of light, and thus the irradiated areas AR, AG, AB of the respective colors are mutually offset. Accordingly, a region where light of the respective colors overlap to be a white color is a shaded region in FIG. 3. Also as can be seen from FIG. 3, the shaded white light region is narrower than the reflection area 12c, in the outer region of which output light is colored, resulting in irregular light.

To solve such the problem, it is only necessary to subdivide the respective reflection areas 12a, 12b, . . . to design a cross sectional shape of the reflection area according to light of the respective colors. For instance, in a luminescent light source 16 shown in FIG. 4, the reflection area 12c is subdivided into three reflection areas 19a, 19b, 19c, wherein the reflection area 19a is designed so that blue light LB is outputted to the front face direction in the reflection area 19, the reflection area 19b is designed so that green light LG is outputted to the front face direction in the reflection area 19b, and the reflection area 19c is designed so that red light LR is outputted to the front face direction in the reflection area 19c.

In the luminescent light source 16 thus designed, a region where light of the respective colors overlap to be white light is substantially the same size as the whole reflection areas 19a, 19b, 19c (i.e., the reflection area 12c), as shown in FIG. 4.

As can be seen from the example of FIG. 4, also when the light emitting devices of multiple colors are used, it is learned that if a greater number of divisions of a reflecting mirror of a light source is set, it becomes possible to set in details a traveling direction of light, which thus improves degree of freedom in designing of a light path, enables finer adjustment of the light output direction, and also improves uniformity in optical intensity.

Now, as shown in FIG. 5, on the basis of the reflecting mirror 12 wherein the number of divisions of the reflecting mirror 12 (the number of the reflection areas) is 3, and pitch interval P (width in a radial direction of the reflection area) of the reflection areas 12a, 12b, 12c is 6 mm, consider respective reflection areas that are further divided into three reflection areas. FIG. 6 shows such the reflecting mirror 12. In the reflecting mirror 12 as shown in FIG. 6, the number of divisions of the reflecting mirror 12 is 9, and the pitch interval of the reflection areas 17a, 17b, 17c, 18a, 18b, 18c, 19a, 19b, and 19c is 2 cm. Thus, although use of the reflecting mirror 12 as shown in FIG. 6 could improve color uniformity of a luminescent light source, increased number of divisions will narrow the pitch interval of a reflection area, thus making it difficult to manufacture a reflecting mirror, and increasing cost. In other words, there is the problem that as the number of the divisions of the reflecting mirror 12 increases, a balance between performance improvement and the cost will be lost.

In addition, as the light emitting devices 13R, 13G, 13B are arranged in two dimensions, a distance between the light emitting devices of the respective colors 13R, 13G, 13B and the reflection areas 12a, 12b, . . . differs depending on a direction of viewing. Therefore, in the concentric reflecting mirror 12 in which the respective reflecting areas 12a, 12b, . . . are arranged circumferentially and equidistant around one point, comparable overlap (mixed colors) in the whole circumferential direction cannot be achieved. To describe this concretely with reference to FIG. 4, when the red light emitting device 13R, the green light emitting device 13G, and the blue light emitting device 13B are arranged in this order from the left as one faces, to the left thereof are arranged the reflection area 19a from which red light is vertically outputted, the reflection area 19b from which green light is vertically outputted, and the reflection area 19c from which blue light is vertically outputted in this order from the inner circumference. On the contrary, to the right of the light emitting devices 13R, 13G, 13B, the reflection area 19c from which blue light is vertically outputted, the reflection area 19b from which green light is vertically outputted, and the reflection area 19a from which red light is vertically outputted must be arranged in this order from the inner circumference side. Such the arrangement cannot be implemented with the ring zone shaped reflection areas.

SUMMARY OF THE INVENTION

An object of the present invention is to provide a luminescent light source that can increase the number of divisions of a reflecting mirror without narrowing pitch intervals of reflection areas. Another object of the invention is to enable light traveling direction to be set in details in a luminescent light source, thus improving degree of freedom in optical designing and enabling finer adjustment of light output direction.

A luminescent light source in accordance with embodiments of the present invention comprises a reflecting mirror for reflecting light, a light guide unit arranged on a light reflection surface of the reflecting mirror, and a light emitting device for outputting light to the light guide unit. A luminescent light source in accordance with embodiments of the present invention has the light emitting device arranged in the central area of the reflecting mirror. The light guide unit has a light output surface that outputs to the outside light outputted from the light emitting device and light of the light emitting device reflected by the reflecting mirror, wherein the reflecting mirror has a light reflection surface that reflects the light outputted from the light emitting device and reflected by the light output surface of the light guide unit, and the light reflection surface comprises a plurality of reflection areas arranged along at least two directions.

Because a luminescent light source in accordance with embodiments of the present invention includes a plurality of reflection areas in which light reflection surfaces of the reflecting mirror are arranged along at least two directions, the number of divisions (number of reflection areas) of the reflecting mirror may be increased without narrowing the pitch interval of the reflection areas. Thus, as the light traveling direction in the luminescent light source may be set in details, the degree of freedom in designing of a light path is increased, enabling finer adjustment of the light output direction. Hence, distribution of optical intensity of light outputted from a luminescent light source may be equalized. Furthermore, if light emitting devices of more than one luminescent color are used, color uniformity may be improved and color irregularity maybe reduced, thereby enabling quality of the luminescent light source to be improved. Because there is no need to reduce pitch intervals of the reflection areas, neither manufacturing of a reflecting mirror will be difficult nor cost will increase, even though the degree of freedom in designing of a light path may be increased, more detailed adjustment of the light output direction may be enabled, or optical intensity or color uniformity may be improved.

In addition, arrangement of a plurality of reflection regions along at least two directions is not necessarily limited to a case in which they are arranged along two orthogonal directions. For instance, reflection areas may be arranged along two directions defined in polar coordinates (i.e., radial direction and circumferential direction). Furthermore, they may even be arranged along at least two arbitrary, curved lines.

A luminescent light source in accordance with embodiments of the present invention comprises a reflecting mirror for reflecting light, a light guide unit arranged on a light reflection surface of the reflecting mirror, and a light emitting device for outputting light to the light guide unit. The luminescent light source in accordance with embodiments of the present invention has the light emitting device arranged in the central area of the reflecting mirror, wherein the light guide unit has a light output surface that outputs to the outside light outputted from the light emitting device and light of the light emitting device reflected by the reflecting mirror, the reflecting mirror has a light reflection surface that reflects the light outputted from the light emitting device and reflected by the light output surface of the light guide unit, and the light reflection surface is a mosaic arrangement of a plurality of reflection areas.

The reflection areas arranged in mosaic herein refer to reflection areas having comparable horizontal and vertical sizes (those having about several hold horizontal to vertical ratios may also be acceptable) and being arranged with little or no space. In addition, respective reflection areas may have an identical shape, reflection areas of different shapes may be combined, or irregular shaped reflection areas may be arranged. Also, respective reflection areas may be arranged regularly or irregularly.

In accordance with one embodiment of the present invention, a luminescent light source has a plurality of reflection areas that are arranged in mosaic to configure reflection areas, the number of divisions of reflection surfaces of a reflecting mirror (the number of the reflection areas) may be increased without narrowing pitch interval of the reflection areas. Thus, as light traveling direction within the luminescent light source can be set in details, the degree of freedom in designing of a light path increases, and more detailed adjustment of light output direction becomes possible. Thus, optical intensity distribution of light to be outputted from the luminescent light source can be equalized. In addition, if light emitting devices of a plurality of luminescent colors are used, color uniformity may be improved, color irregularity may be reduced, and quality of the luminescent light source may be improved. Yet, since there is no need to reduce pitch intervals of the reflection areas, neither manufacturing of a reflecting mirror will be difficult nor cost will increase, even though the degree of freedom in designing of a light path may be increased, more detailed adjustment of the light output direction may be enabled, or optical intensity or color uniformity may be improved.

In accordance with embodiments of the present invention, the luminescent light source may have reflection areas that are square, rectangular, hexagonal, triangular, or fan-shaped. Thus, a light reflection surface may be formed by arranging reflection areas with little or no space therebetween, thereby increasing the light use efficiency. In particular, if reflection areas are arranged by dividing a light reflection surface of a reflecting mirror into concentric ring zone shaped regions centering on the optical axis thereof, and by dividing the regions into a plurality of regions along circumferential direction, it becomes possible to arrange a plurality of fan-shaped reflection areas with little or no space therebetween.

In accordance with embodiments of the present invention, reflection areas that are adjacent in respective directions in which the reflection areas are arranged are characterized in that they have mutually different amount of characteristic that characterizes respective reflection areas.

In accordance with some embodiments of the present invention, reflection areas that are adjacent in intermediate direction between respective directions in which the reflection areas are arranged are characterized that they have mutually different amount of characteristic that characterizes respective reflection areas, wherein the intermediate direction refers to a diagonal direction if the directions in which the reflection areas are arranged are directions in opposite sides.

In some of the abovementioned embodiments, if each reflection area is expressed by a curved surface expression including the amount of characteristic (parameter) of 1 or more than 1, reflection direction or degree of expansion of light, etc., to be reflected by each reflection area can be adjusted by determining, as appropriate, a value of amount of characteristic that characterizes each curved surface, thereby facilitating designing of a reflecting mirror.

For instance, the amount of displacement of the each reflection area in the optical axis direction of the reflecting mirror can be selected as the amount of characteristic. Thus, designing as appropriate the amount of displacement of each reflection area in the optical axis direction enables adjustment of the reflection direction or degree of expansion, etc., thereby facilitating designing of a reflecting mirror.

In addition, if the each reflection area is represented as a conic surface and the radius of curvature is used as the amount of characteristic of the conic surface, the reflection direction of light reflected by each reflection area may be adjusted by the radius of curvature, and uniformity of optical intensity may be improved in a narrow area. In addition, if more than one light emitting device is used, color uniformity may be enhanced by improving color mixing performance in a narrow area.

In addition, if the each reflection area is represented as a conic surface and a conic coefficient is used as the amount of characteristic of the conic surface, spread of light reflected by each reflection area depending on a distance from the light emitting device, etc. may be adjusted by the conic coefficient, and uniformity of optical intensity in a wide area may be improved. In addition, if more than one light emitting device is used, color uniformity may be enhanced by improving color mixing performance in a wide area.

In accordance with embodiments of the present invention, a luminescent light source comprises a plurality of light emitting devices of different luminescent colors. In the luminescent light source, even when light is emitted in a color different from that of the original light emitting device, by mixing light of a plurality of light emitting devices having different luminescent colors, light can be uniformly mixed, thereby reducing color irregularity.

In particular, if light of respective light emitting devices is reflected in reflection areas so that light outputted from light emitting devices that are mutually different in adjacent reflection areas are outputted substantially vertically to the front face direction, an overlap area of light from the respective light emitting devices expands, thereby reducing color irregularity.

In accordance with yet another embodiment of the present invention, the luminescent light source is characterized in that a surface of the light guide unit is divided into a plurality of areas and an angle of inclination or direction of inclination of the surface is varied in every divided area. According to the embodiment, output direction or reflection direction of light distributed from the light emitting devices to each divided area of the surface of the light guide unit can be adjusted with a high degree of freedom by an angle of inclination or direction of inclination of each area of the light guide unit. Thus, uniformity of optical intensity of the luminescent light source may be improved. In addition, if more than one light emitting device is used, color mixing performance of light to be outputted from each light emitting device may be improved, thereby reducing color irregularity. If a plurality of a light emitting device is used, light of the respective light emitting colors can be mixed uniformly.

In accordance with embodiments of the present invention, a luminescent light source array is characterized in that a plurality of luminescent light sources are arranged. According to some embodiments of the luminescent light source array, a degree of freedom in designing a light path may increase, more detailed adjustment of light output direction may be enabled, and a surface light source having uniform optical intensity distribution of output light, having a large area, and being thinned may be implemented.

In accordance with embodiments of the present invention, in a luminescent light source comprising a reflecting mirror for reflecting light, a light guide unit arranged on the side of a light reflection surface of the reflecting mirror, and a light emitting device for outputting light to the light guide unit, a method of setting a light path in the luminescent light source in accordance with embodiments of the present invention is characterized in that the light emitting device is arranged in the central area of the reflecting mirror, the light guide unit has a light output surface that outputs to the outside light outputted from the light emitting device and light of the emitting device reflected by the reflecting mirror, the reflecting mirror has a light reflection surface that reflects the light outputted from the light emitting device and reflected by the light output surface of the light guide unit, and the light reflection surface comprises a plurality of reflection areas arranged along at least two directions, and reflection direction of reflected light by each reflection area may be individually set.

In the method of setting a light path in the luminescent light source in accordance with embodiments of the present invention, since the reflection direction of the reflected light can be individually set by reflecting light by a plurality of reflection areas arranged along at least two directions, light traveling direction within the luminescent light source can be elaborately set, and the degree of freedom in designing a light path increases, thereby enabling more detailed adjustment of light output direction. Thus, optical intensity distribution of light to be outputted from the luminescent light source may be equalized. In addition, if more than one light emitting device is used, color uniformity can be improved, color irregularity may be reduced, and quality of the luminescent light source may be enhanced. Yet, as there is no need to reduce pitch intervals of reflection areas, neither manufacturing of a reflecting mirror will be difficult nor cost will increase, even when the degree of freedom in designing of a light path or color uniformity is improved.

In a luminescent light source comprising a reflecting mirror for reflecting light, a light guide unit arranged on the side of a light reflection surface of the reflecting mirror, and a light emitting device for outputting light to the light guide unit, a method of outputting light in the luminescent light source in accordance with embodiments of the present invention is characterized in that the light emitting device is arranged in the central area of the reflecting mirror, the light guide unit has a light output surface that outputs to the outside light outputted from the light emitting device and light of the emitting device reflected by the reflecting mirror, the reflecting mirror has a light reflection surface that reflects the light outputted from the light emitting device and reflected by the light output surface of the light guide unit, and the light reflection surface comprises a plurality of reflection areas arranged along at least two directions, and light output direction and optical intensity distribution of light to be outputted from the light output surface of the light guide unit can be adjusted by individually setting a reflection direction of reflected light by each reflection area.

In the method of outputting light in the luminescent light source in accordance with embodiments of the present invention, since the light output direction and optical intensity distribution of light to be outputted from the light output surface of the light guide unit may be adjusted by reflecting light by the plurality of reflection areas arranged along at least two directions and thus individually setting the reflection direction of the reflected light, the light traveling direction within the luminescent light source may be set elaborately, the degree of freedom in designing a light path may increase, and more detailed adjustment of the light output direction may be enabled. Thus, the optical intensity distribution of light to be outputted from the luminescent light source may be equalized. In addition, if more than one light emitting device of more than one luminescent color is used, color uniformity may be improved, color irregularity may be reduced, and quality of the luminescent light source may be improved. Yet, as there is no need to reduce pitch intervals of reflection areas, neither manufacturing of a reflecting mirror will be difficult nor cost will increase, even when the degree of freedom in designing of a light path or color uniformity may be improved.

A lighting system in accordance with embodiments of the present invention comprises a luminescent light source array in which a plurality of luminescent light sources are arranged and a power supply unit that supplies power to the luminescent light source array.

A backlight in accordance with embodiments of the present invention comprises a plurality of luminescent light sources that are arranged in a same plane.

A liquid crystal display in accordance with embodiments of the present invention comprises a luminescent light source array in which a plurality of luminescent light sources are arranged, and a liquid crystal display panel arranged opposed to the luminescent light source array.

In accordance with one embodiment of the present invention, a liquid crystal display device is characterized in that between the luminescent light source array and the liquid crystal display panel, it does not have an optical element for directing to the front face direction of the liquid crystal display panel traveling direction of light outputted from the luminescent light source array. Herein, the optical element for directing to the front face direction of the liquid crystal display panel the traveling direction of the light outputted from the luminescent light source array refers to, for instance, a prism sheet in line with the embodiment. As use of the luminescent light source array comprising the luminescent light source in accordance with embodiments of the invention enables adjustment with high precision of the direction or spread of light to be outputted from the luminescent light source, the optical element such as a prism sheet, etc. that was used in a conventional liquid crystal display device or backlight may be rendered unnecessary. As a result, thinning of the liquid crystal display device and reduction of assembly cost may be achieved. Furthermore, as there will be no loss of light due to the light emitting device, the light use efficiency can be improved.

In accordance with yet another embodiment of the present invention, the liquid crystal display device is characterized in that between the luminescent light source and the liquid crystal panel, it does not have the optical element for improving intensity of light illuminating the liquid crystal display panel. Herein, the optical element for improving intensity of light illuminating the liquid crystal display panel refers to, for instance, a luminance improvement film in line with the embodiment. As use of the luminescent light source array comprising the luminescent light source of the invention enables adjustment of the direction or spread of light to be outputted from the luminescent light source, thereby improving the optical intensity, the optical element such as a luminescence improvement film, etc. that was used in a conventional liquid crystal display device may be rendered unnecessary. As a result, thinning of the liquid crystal display device and reduction of assembly cost may be achieved. Furthermore, as there will be no loss of light due to the light emitting device, the light use efficiency may be improved.

While the invention has been summarized with respect to a limited number of embodiments, those skilled in the art, having benefit of the disclosure in the present application, will appreciate that other embodiments, for example, any combinations of components of the present invention as summarized above, can be advised which do not depart from the scope of the invention as disclosed herein. Accordingly, the scope of the invention should be limited only by the attached claims.

DETAILED DESCRIPTION OF THE PREFERRED EMBODIMENTS

In the following, we describe the embodiments of the present invention with reference to the drawings. However, the invention is not limited to the following embodiments but can undergo design changes, as appropriate, depending on an application, etc.

Embodiment 1

Figure 7:
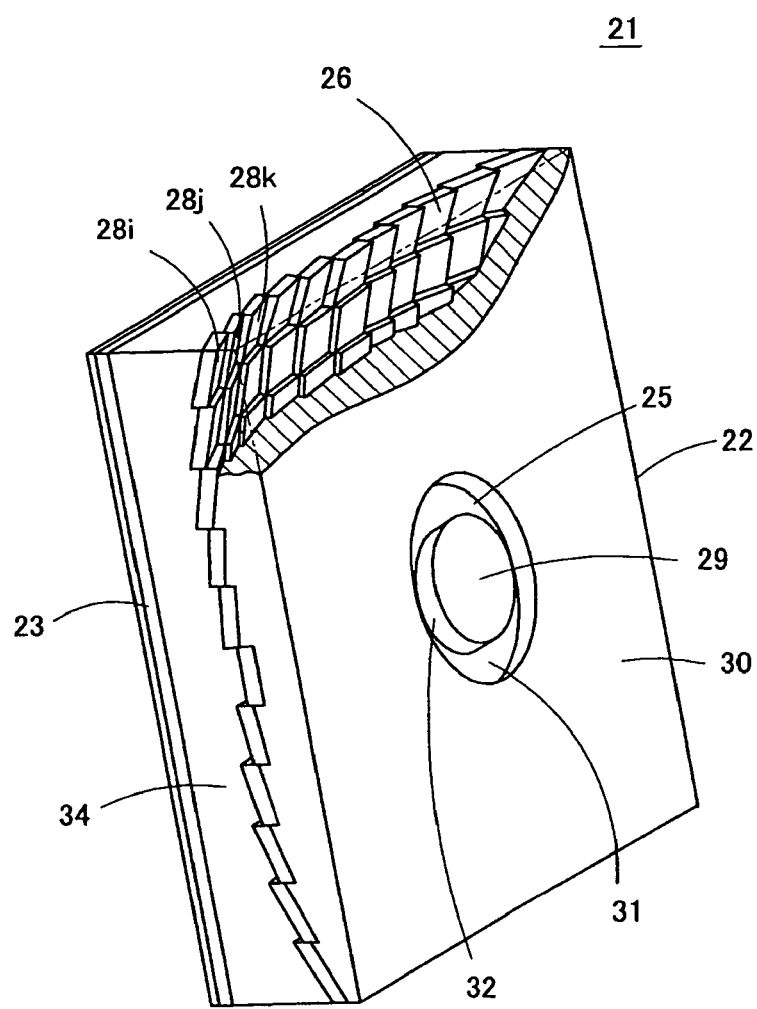
FIG. 7 shows a partially broken-away perspective view of the luminescent light source according to Embodiment 1 of the present invention.
Figure 8:
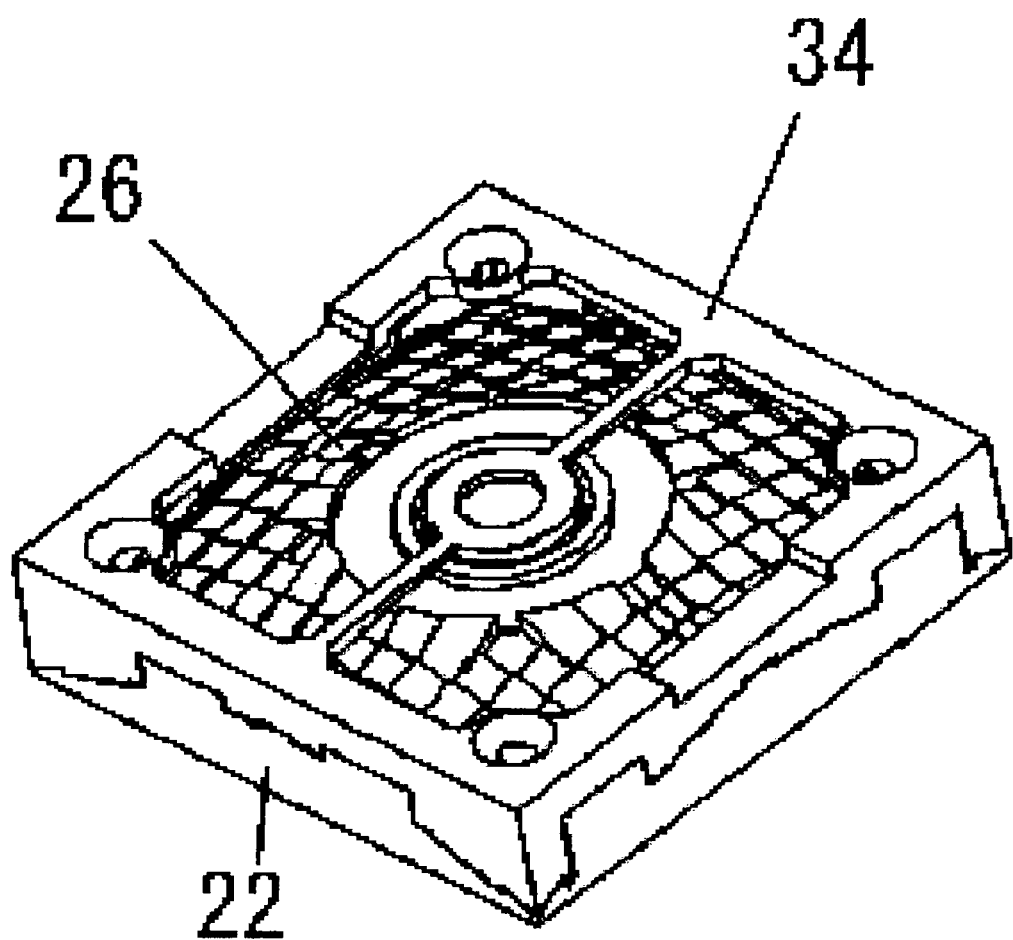
FIG. 8 shows a perspective view from the rear, illustrating the condition in which a wiring board is removed from the luminescent light source according to Embodiment 1.

FIG. 7 shows a partly broken perspective view of a luminescent light source 21 according to Embodiment 1 of the present invention. FIG. 8 shows a perspective view of the luminescent light source that is viewed from the rear side and from which a wiring board has been removed. FIG. 9A and B show perspective views, viewed from the front side and from the rear side, respectively, of a mold unit 22 (light guide unit) on the rear side of which a reflecting mirror 26 is formed. In addition, FIGS. 10A, B and C show a front elevation, a back side view, and a bottom plan view of the mold unit 22. FIG. 11A shows a front elevation of the luminescent light source 21, FIG. 11(b) shows a cross sectional view in X-X direction (diagonal direction) of FIG. 11A, and FIG. 11(c) shows a cross sectional view in Y-Y direction (opposite side direction) of FIG. 11A.

In the luminescent light source 21, an substantially dish-shaped mold unit (light guide unit) 22 is formed of optically-transparent material of high refractive index, for instance, transparent resin. As the optically-transparent material comprising the mold unit 22, the optically-transparent materials such as epoxy resin or acrylic resin or glass materials may also be used.

Figure 10:
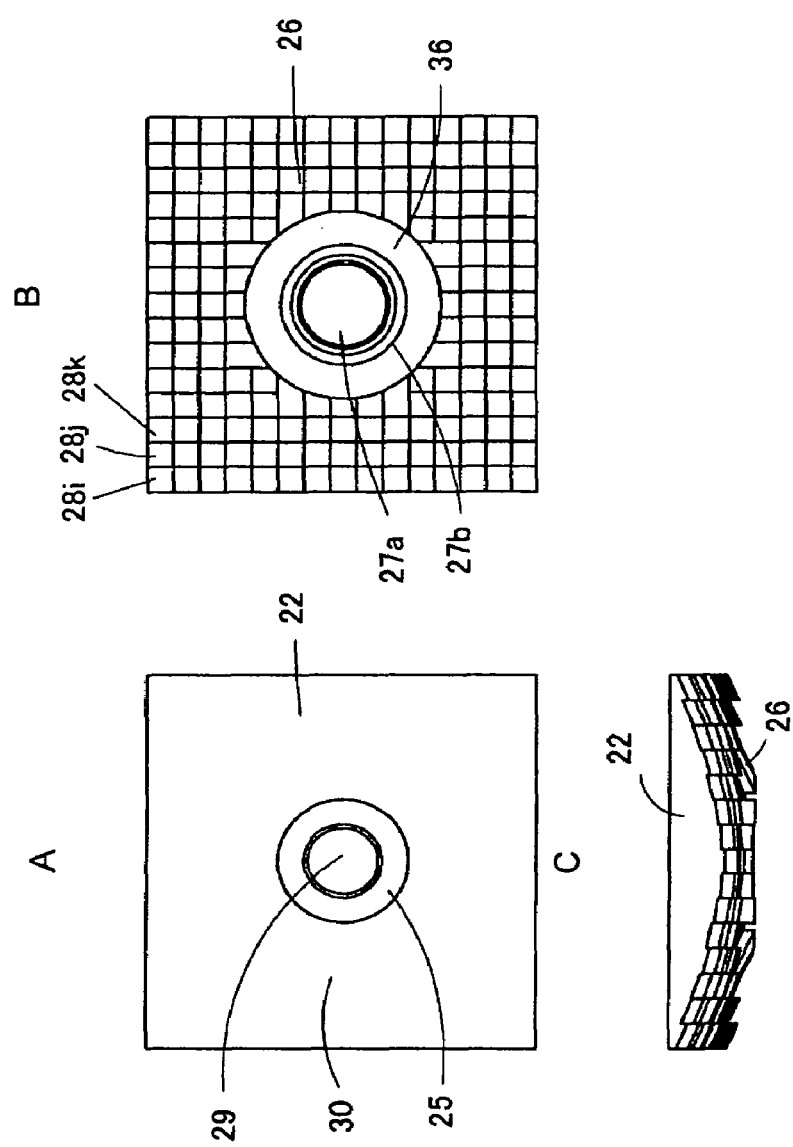
FIG. 10A shows a front elevation of the mold unit on the rear of which the reflecting mirror is formed.
FIG. 10B shows a backside view thereof.
FIG. 10C shows a bottom view thereof.
Figure 11:
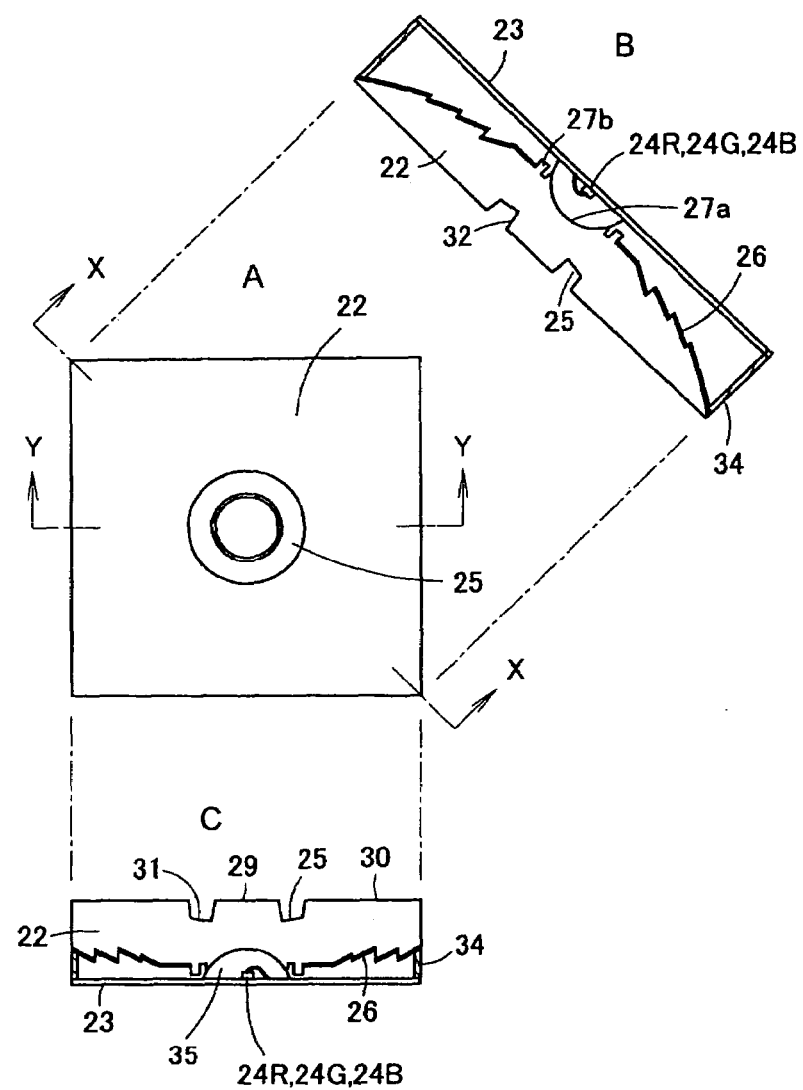
FIG. 11A shows a front elevation of the luminescent light source of Embodiment 1.
FIG. 11B shows a cross sectional view in X-X direction (diagonal direction) of FIG. 11A.
FIG. 11C shows a cross sectional view in Y-Y direction (opposite side direction) of FIG. 11A.

As shown in FIG. 7, FIG. 10 or FIG. 11, when viewed from the front face, the mold unit 22 is rectangular. In the central front area of the mold unit 22 is provided a circular direct output area 29, outside of which a total reflection area 30 is provided. The direct output area 29 is a smooth, circular region formed by a plane perpendicular to a central axis of the mold unit 22, and the total reflection area 30 is also a smooth region formed by the plane perpendicular to the central axis of the mold unit 22. In addition, in the illustrated examples, although the direct output area 29 and the total reflection area 30 are formed in the same plane and the direct output area 29 is located level with the total reflection area 30, it would be reasonable to protrude the direct output area 29 in a channel 25, making the direct output area higher than the total reflection area 30. On the contrary, it would also be reasonable to retract the direct reflection area 29 into the channel 25 so as to make the direct output area 29 lower than the total reflection area 30. Although primarily the direct output area 29 serves to directly outputting light output from the light emitting devices 24R, 24G, 24B to the outside, as described later, it also serves to totally reflect incident light. Similarly, although the total reflection area 30 primarily serves to totally reflect incident light toward a reflecting mirror 26, it also serves to transmit and output the incident light to the outside.

The toric channel 25 is provided between the direct output area 29 and the total reflection area 30, and on the base of the channel 25 a total reflection area 31 is formed by an annular plane. In addition, an obliquely tilted inclined total reflection area 32 is formed on the inner circumferential flank of the channel 25, and the inclined total reflection area 32 is formed like a tapered truncated cone so that the diameter decreases as it moves to the front face of the mold unit 22. Although the total reflection area 31 and the inclined total reflection area 32 primarily serve to totally reflect incident light, it is also possible that some of the incident light may transmit the inclined total reflection area 32 and be outputted to the outside.

Figure 9:
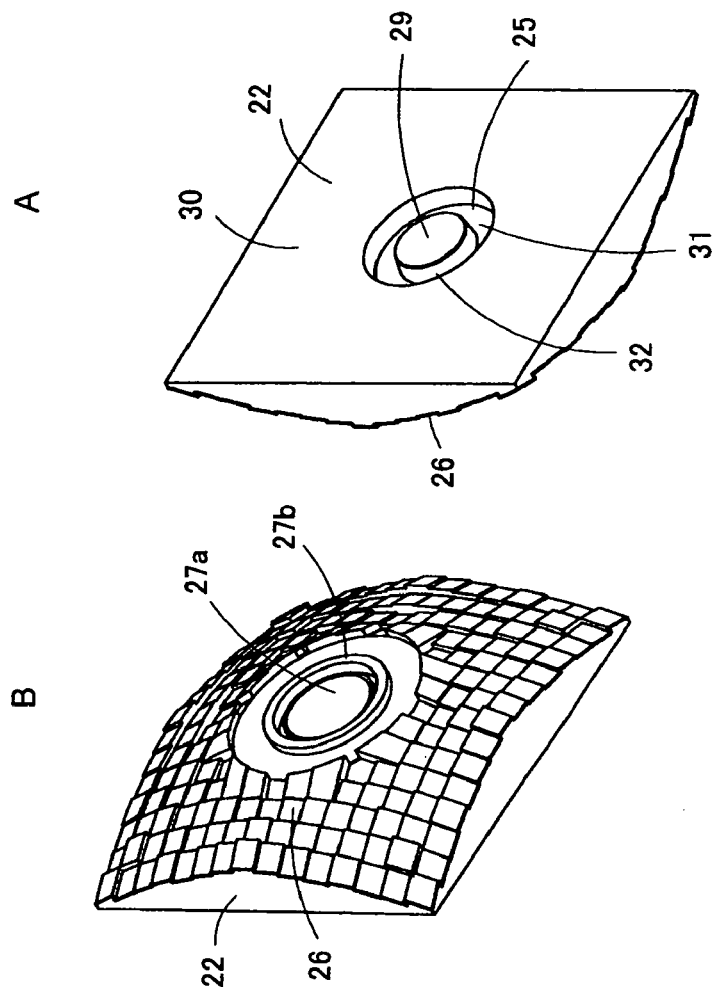
FIG. 9A and FIG. 9B show a perspective view when viewed from the front side and a perspective view when viewed from the rear side, illustrating the mold unit on the rear of which the reflecting mirror is formed.

As shown in FIG. 9, the back side of the mold unit 22 is curved, and on the back side is provided a concave mirror shaped reflecting mirror 26 for reflecting the light totally reflected by the front face of the mold unit 22. The reflecting mirror 26 may be a metal coating such as Au, Ag, Al, etc. deposited on the back side (pattern surface) of the mold unit 22, white paint painted on the back side of the mold unit 22, a metal plate such as aluminum, etc. having surface reflectance improved by specular working the surface, a metal or resin curved plate a surface of which is plated by Au, Ag, Al, etc., or a curved plate a surface of which is painted with white paint.

As shown in FIG. 10, a light reflection surface of the reflecting mirror 26 is formed in mosaic by a plurality of reflection areas arranged along at least two directions when viewed from the light output direction. A ring zone shaped reflection area 36 is provided in the periphery of an opening located in the central part of the reflecting mirror 26, and in the peripheral area of the reflection area 36, the reflecting mirror 26 is divided into a plurality of columns and a plurality of rows, thus being divided into the grid reflection areas 28$i$, 28$j$, 28$k$ . . . . The reflection areas 28$i$, 28$j$, 28$k$ . . . comprise the reflection surface shaped like a concentric circle. In addition, although the light reflection surface such as the reflection areas 28$i$, 28$j$, 28$k$ . . . is a mirror plane, a light reflection surface of the reflection area 36 may be made to be slightly rough so as to diffuse light.

Also, as shown in FIG. 9, the reflecting mirror 26 is open in the central area of the back side of the mold unit 22. In the opening of the reflecting mirror 26, a semispherical concave portion 27$a$ is formed in-the central part of the back side of the mold unit 22, and a convex portion 27$b$ is protruded in the periphery of the concave portion 27$a$.

To assemble the luminescent light source 21, as shown in FIG. 11, the light emitting devices 24R, 24G, 24B, such as three LED chips having luminescent colors of red, green, and blue are installed on the surface of the wiring board 23, and then a holder 34 is secured to the surface of the wiring board 23. Next, the concave portion 27$a$ on the back side of the mold unit 22 is filled with transparent resin 35 such as thermosetting resin or ultraviolet-curing resin, etc., and the holder 34 secured to the wiring board 23 is made to support the mold unit 22 (FIG. 8 shows how the holder 34 supports the mold unit 22). Then, the transparent resin 35 being hardened, the mold unit 22 and the wiring board 23 are integrally bonded by the transparent resin 35. In addition, the light emitting devices 24R, 24G, 24B are sealed in the transparent resin 35 at positions biased more to the front of the optical axis than to the center of the semispherical surface forming the concave portion 27$a$.

In addition, the transparent resin 35 may be same as or different from the material of the mold unit 22. Also, an electronic circuit for adjusting amount of light of the light emitting devices 24R, 24G, 24B may be installed in a space (space outside of the transparent resin 35) between the wiring board 23 and the mold unit 22.

When viewed from the front face, the outline size of the above luminescent light source 21 is, for instance, 30 mm by 30 mm, and is 5 mm thick when viewed from lateral direction, thus being thinner than the outline. In addition, the concave portion 27$a$ on the back side of the mold unit 22 is formed like a hemisphere having a radius of 3.90 mm. However, the concave portion 27$a$ is slightly smaller than ½ of a sphere, the radius of the opening of the concave portion being 3.25 mm. In addition, values mentioned herein are simply an example, the size may be designed as appropriate so that it may be optimal values depending on the efficiency of light emitting devices or desired amount of light, etc.

Figure 12:
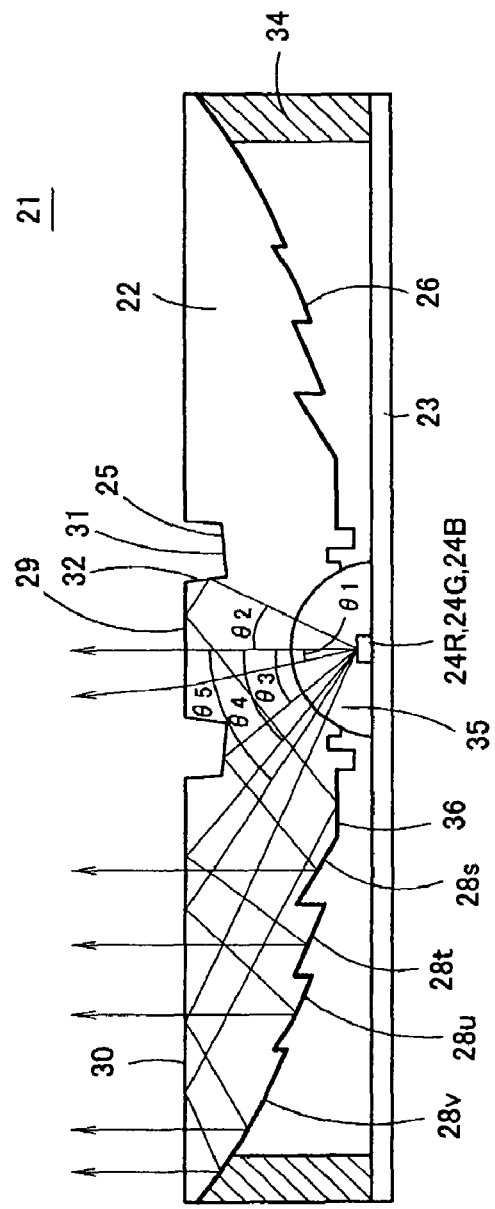
FIG. 12 shows a cross sectional view illustrating optical behavior of light in the luminescent light source according to Embodiment 1.

FIG. 12 shows a cross sectional view of the structure of the luminescent light source 21 of the invention and behavior of light outputted from the light emitting devices 24R, 24G, 24B which represent a cross section in the diagonal direction. In the drawings, a thin line arrow designates a light. The reflection areas shall be the reflection area 28$s$, the reflection area 28$t$, the reflection area 28$u$, and the reflection area 28$v$ in this order from the side closer to the reflection area 36. When the light emitting devices 24R, 24G, 24B of three colors, i.e., red, green, and blue, arranged in the central area of the luminescent light source 21 are emitted, among light outputted from this light emitting devices 24R, 24G, 24B, light outputted at an output angle θ1 (<θc) smaller than a critical angle θc of total reflection on a boundary face of the mold unit 22 enters the direct output area 29, and this light transmits through the direct output area 29 and is directly outputted to the front from the luminescent light source 21. In addition, light outputted at the output angle θ3 (>θc) greater than the critical angle θc of total reflection enters the total reflection area 31, and this light, by being totally reflected by the total reflection area 31, enters the reflection area 28$s$, and transmits through the total reflection area 30 and is outputted to the front after being reflected by the reflection area 28$c$. In addition, when the total reflection area 31 is slightly inclined as shown in FIG. 12, the output angle θ3 may be slightly smaller than the critical angle θc of the total reflection. Also, the light outputted at the output angle θ4 (>θ3) greater than the critical angle θc of the total reflection enters the total reflection area 30, and this light, by being totally reflected by the total reflection area 30, enters the reflection area 28$t$, and transmits through the total reflection area 30 and is outputted to the front after being reflected by the reflection area 28$t$. Furthermore, light outputted at the output angle θ5 (>θ4) greater than the output angle θ4 or at the output angle greater than that, by being totally reflected by the total reflection area 30, enters the reflection area 28$u$ or the reflection area 28$v$, and transmits through the total reflection area 30 and is outputted to the front after being reflected by the reflection areas 28$u$, 28$v$. In addition, light outputted from the light emitting devices 24R, 24G, 24B at the output angle θ2 (θ1<θ2<θ3) intermediate the output angle θ1 to the direct output area 29 and the output angle θ3 to the total reflection area 31 enters the inclined total reflection area 32, and then the reflection area 36 after being totally reflected twice by the inclined total reflection area 32 and the direct reflection area 29. The light reflected by the reflection area 36 is reflected toward the corner area of the luminescent light source 21, and outputted to front from the corner area by further being reflected by the total reflection area 30 and the reflection area 28$v$.

In addition, in the Embodiment 1, as the reflecting mirror 26 consists of mosaic arrangement of either square or rectangular reflection areas 28$i$, 28$j$, 28$k$, . . . , color uniformity at the luminescent light source 21 can be improved. In particular, when the luminescent light source is used as white light source, color irregularity or a partial coloring can be reduced. In the following, we describe this in details.

Figure 13:
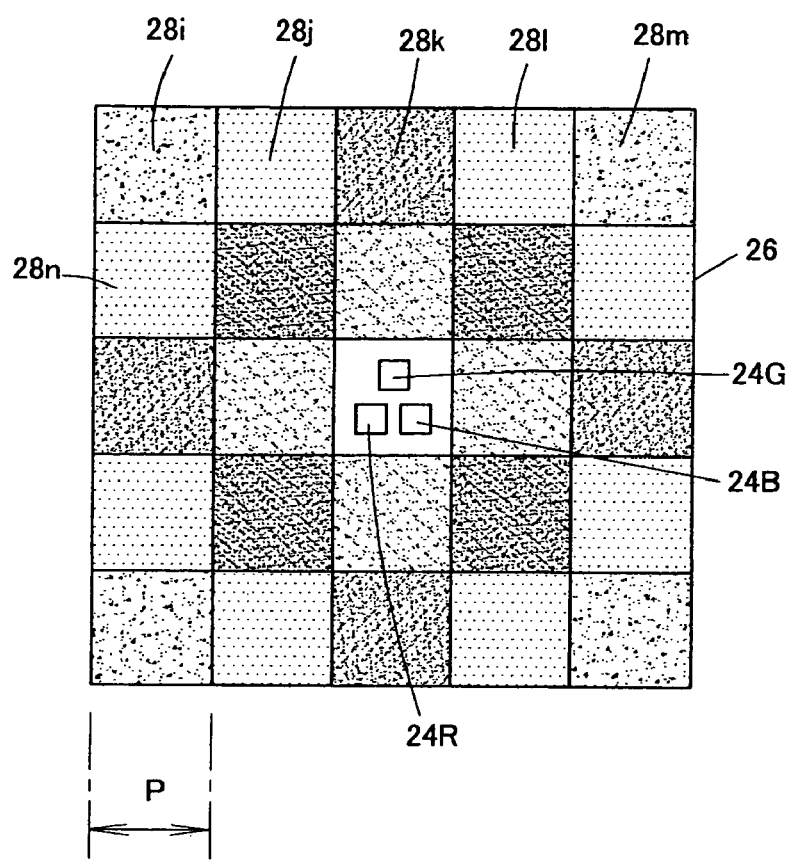
FIG. 13 shows a schematic front elevation of the reflecting mirror used in the luminescent light source of Embodiment 1.

FIG. 13 shows a schematic front elevation of the reflecting mirror 26. The opening is provided in the central area of the reflecting mirror 26, and the light emitting devices 24R, 24G, 24B are positioned in the opening. The light reflection surface of the reflecting mirror 26 are divided into a plurality of columns and a plurality of rows, and the reflection areas 28$i$, 28$j$, 28$k$ . . . are arranged like a grid. In FIG. 13, to make the description simple, the number of divisions of the reflecting mirror is small, and the reflecting mirror 26 is divided into 5 columns and 5 rows. Thus, except for the opening, the reflecting mirror 26 has the reflection areas 28$i$, 28$j$, 28$k$ . . . . The reflection area 28$i$, 28$j$, 28$k$ . . . comprise a concentric reflection surface. With the reflection mirror 28 formed concentrically as shown, the luminescent light source 21 can be further thinned. In addition, designing the plurality of the respective reflection areas 28$i$, 28$j$, 28$k$ . . . with parameters that are independent of each other allows the respective areas to be designed optimally and to emit light more uniformly.

It would be desirable to design a curved surface of the respective reflection areas 28i, 28j, 28k . . . to a shape that allows light to be outputted from the front face of the luminescent light source 21 as uniformly as possible. For instance, the respective reflection areas 28i, 28j, 28k . . . may be a conic surface, respectively, as shown in the following expression (1):

$$Z = \frac{CV\rho^2}{1 + \sqrt{1 - CV^2(CC+1)\rho^2}} + A + a\rho^4 + b\rho^6 + c\rho^8 + d\rho^{10} + \ldots \quad (1)$$

However, $$\rho = \sqrt{X^2 + Y^2}$$

wherein X, Y, Z are orthogonal coordinates with their origin at the center of the reflecting mirror 26, and the axis Z coincides with the optical axis of the reflecting mirror 26 and the central axis of the mold unit 22. p is a distance (radius) from the origin when viewed from the front face (namely, projection to the XY plane). Also, CV is a curvature (=1/radius of curvature) of the reflecting mirror 26 or the reflection areas 28i, 28j, 28k . . . , CC is a conic coefficient, A is an amount of displacement of the center of the reflecting mirror 26 to the axis Z, a, b, c, and d are quartic, sextic, octal, and decadal non-sphere coefficients, respectively. However, values of these coefficients are defined for every reflection area 28i, 28j, 28k . . . .

In the drawings attached to the specification of the present invention, reflection areas having same amount of characteristic that characterizes a shape of a curved surface of a reflecting surface (hereinafter referred to as a curve constant), for instance, reflection areas having an equal curvature CV or conic coefficient CC, non-sphere constant a, b, . . . , as described above, are expressed as an area having a same hatching pattern. In the reflecting mirror 26 as shown in FIG. 13, the reflection areas having an equal distance from the center thereof are designed to have a same curve constant. In addition, it is assumed in the reflecting mirror 26 of FIG. 13 that pitch interval P of the reflection areas 28i, 28j, 28k . . . is 6 mm.

Figure 5:
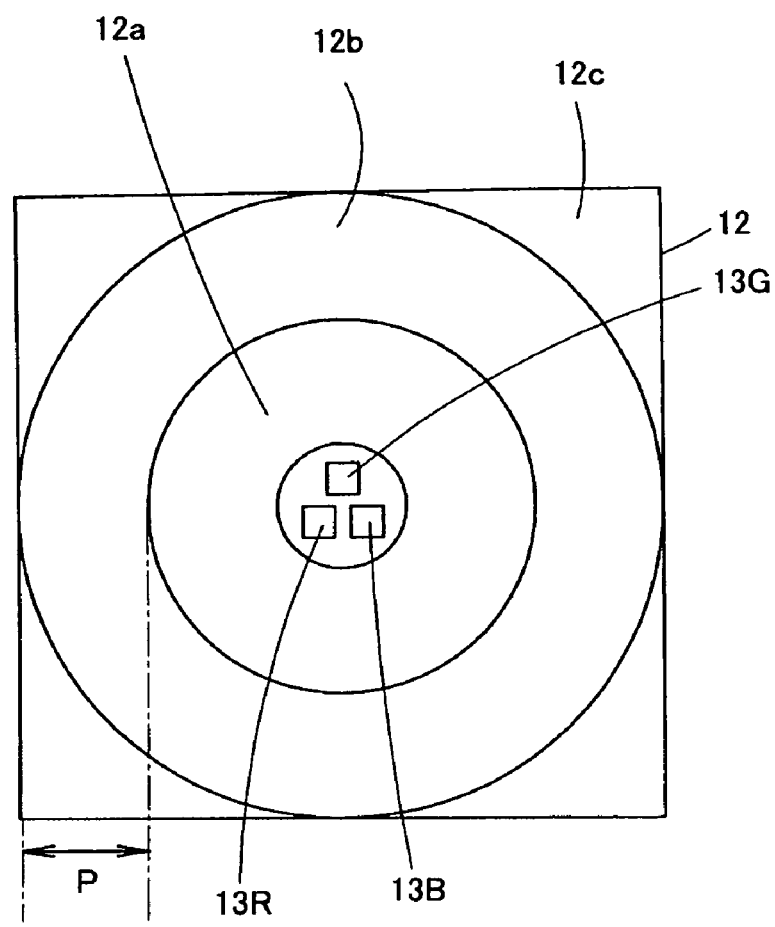
FIG. 5 shows a front elevation of the reflecting mirror of the conventional example in which the number of divisions is 3.

When the reflecting mirror 26 of FIG. 13 is compared with the reflecting mirror 12 of a conventional example as shown in FIG. 5, both of them have pitch interval of 6 mm, and the front size of the luminescent light sources is equal to each other. However, in the latter, the number of divisions of the reflection areas is 3, whereas in the former, the number of the divisions is 24. Then, when reflection areas having a same curve constant (reflection areas being equidistant from the center) are grouped, the reflecting mirror of the conventional example of FIG. 5 has 3 types of reflection areas, whereas the reflecting mirror 26 of FIG. 13 has 5 types. Thus, according to the luminescent light source 21 of the Embodiment 1, compared with the conventional example, the light traveling direction can be set more elaborately, the degree of freedom in designing a light path is greater, more detailed adjustment of the light output direction is enabled, and coloring of the luminescent light source 21 can be prevented by uniformly mixing respective colors. Yet, as the number of divisions can be increased without changing pitch interval P, neither manufacturing will be difficult nor cost will increase, even when the number of divisions is increased.

Figure 14:
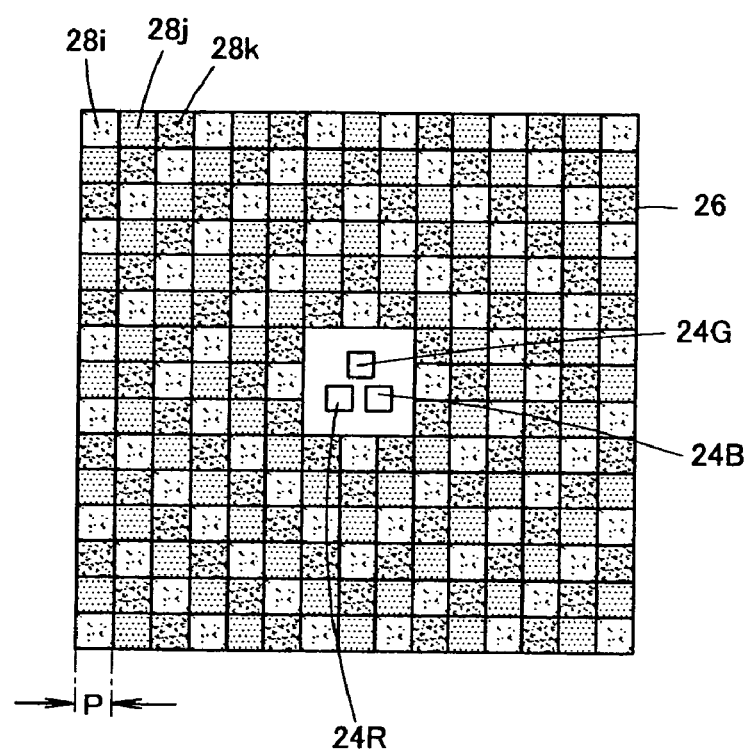
FIG. 14 shows a front elevation of the reflecting mirror of Embodiment 1 the number of divisions of which is made greater than that of the reflecting mirror same as above.

In addition, if the respective reflection areas 28i, 28j, 28k . . . are further trisected, the respective reflection areas will be smaller, as shown in FIG. 14. The pitch interval of the reflection areas 28i, 28j, 28k . . . will be 2 mm, and the number of divisions of the reflecting mirror 26 will be 216. For the reflection areas 17a, 17b, 17c, 18a, 18b, . . . of the reflecting mirror 12 of FIG. 6 that were obtained by trisecting the respective reflection areas 12a, 12b, 12c based on the reflecting mirror 12 of FIG. 5, the number of divisions of the reflecting mirror 12 is only 9, although the pitch interval P is 2 mm. Thus, the smaller the pitch interval P of the reflection areas is or the greater size of the luminescent light source is, superiority of the reflecting mirror 26 of the Embodiment 1 to the conventional reflecting mirrors divided into ring zones becomes remarkable, and the degree of freedom in light path designing or color uniformity further improves.

According to the luminescent light source 21 of the Embodiment 1, as light outputted from the light emitting devices 24R, 24G, 24B is outputted to the front after repeating reflections between the total reflection areas 30, etc. of the mold unit and the reflecting mirror 26, light path length can be obtained within the luminescent light source 21, thus consequently enabling equalization of optical strength of the light radiated from the light emitting devices 24R, 24G, 24B and outputted to the front from the luminescent light source 21. In addition, if the light emitting devices 24R, 24G, 24B of more than one color are used, degree of color mixture of the light to be outputted from the luminescent light source 21 can be enhanced.

In the luminescent light source 21 of the Embodiment 1, as the respective reflection areas 28i, 28j, 28k . . . of the reflecting mirror 26 can be divided smaller than the conventional case, the degree of freedom in light path design when designing the luminescent light source 21 increases, thereby enabling more detailed adjustment of the light output direction. In particular, in the luminescent light source 1 of the Embodiment 1, (1) the inside light path length can be obtained as described above. In addition, (2) the respective reflection areas 28i, 28j, 28k, . . . that are divided smaller than the conventional case allows the direction of light reflection or output to be designed elaborately. In addition, (3) the respective reflection areas 28i, 28j, 28k, . . . that are divided smaller than the conventional case allows spread of light to be designed more elaborately. As a result of (1) to (3) above, uniformity of optical strength at the luminescent light source 21 can be improved, or degree color mixing can be enhanced when the light emitting device of more than one color is used.

Figure 6:
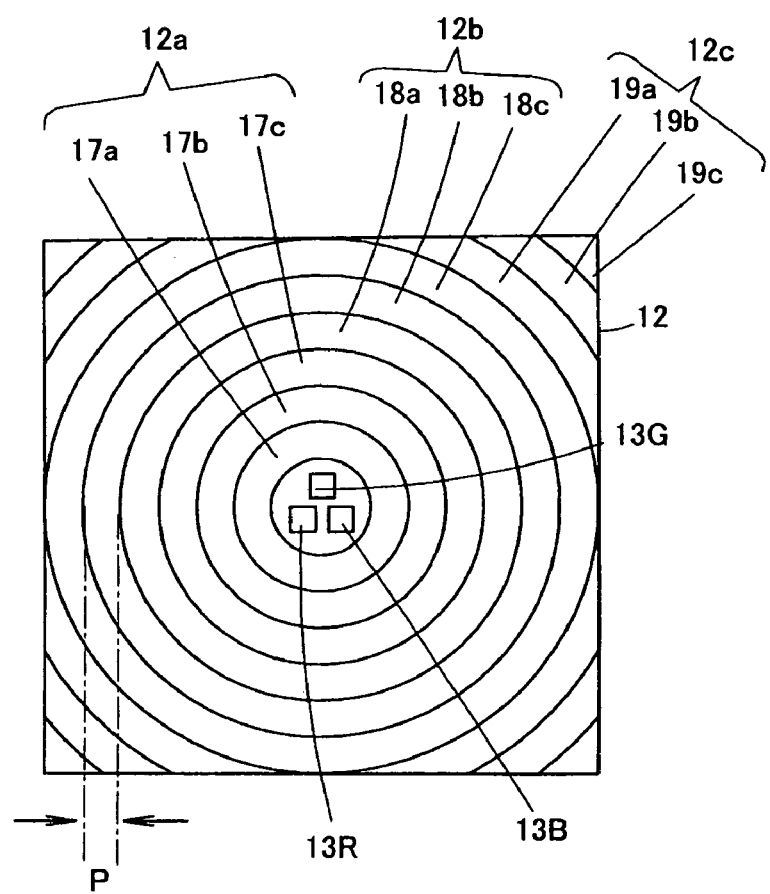
FIG. 6 shows a front elevation of the reflecting mirror of the conventional example in which the number of divisions is 9.
Figure 15:
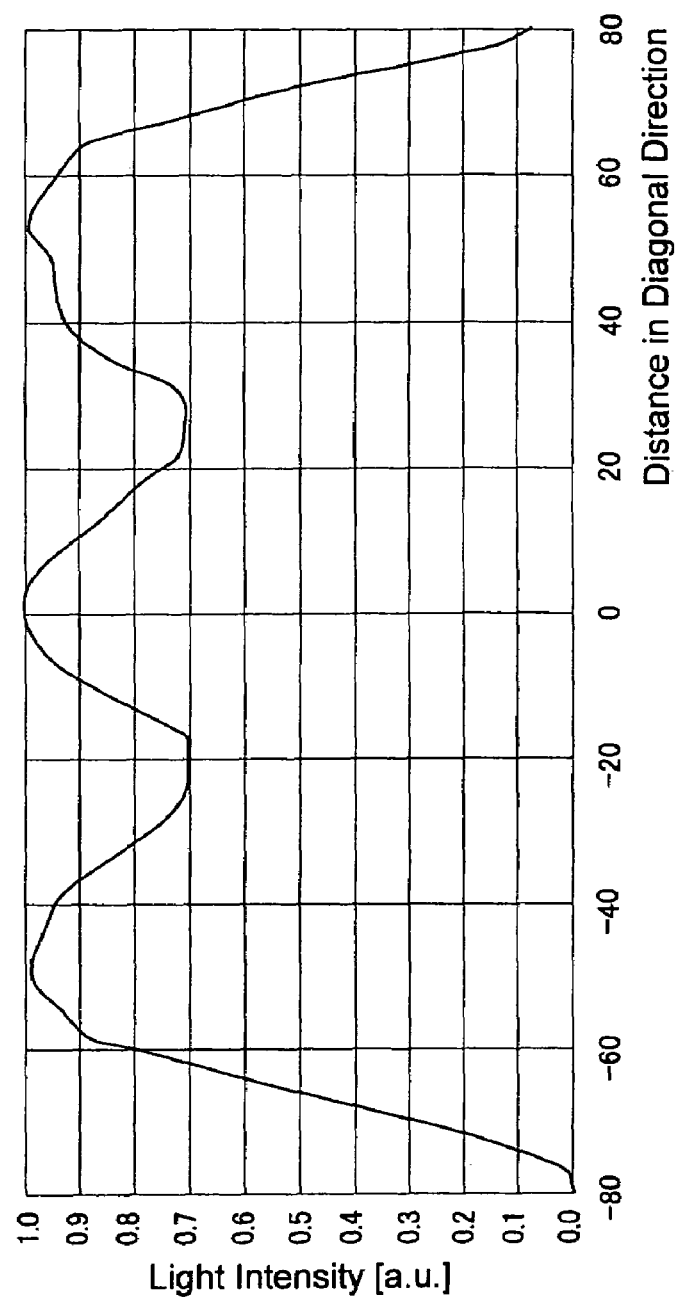
FIG. 15 shows distribution of optical distribution in the diagonal direction of the luminescent light source of the conventional example.
Figure 16:
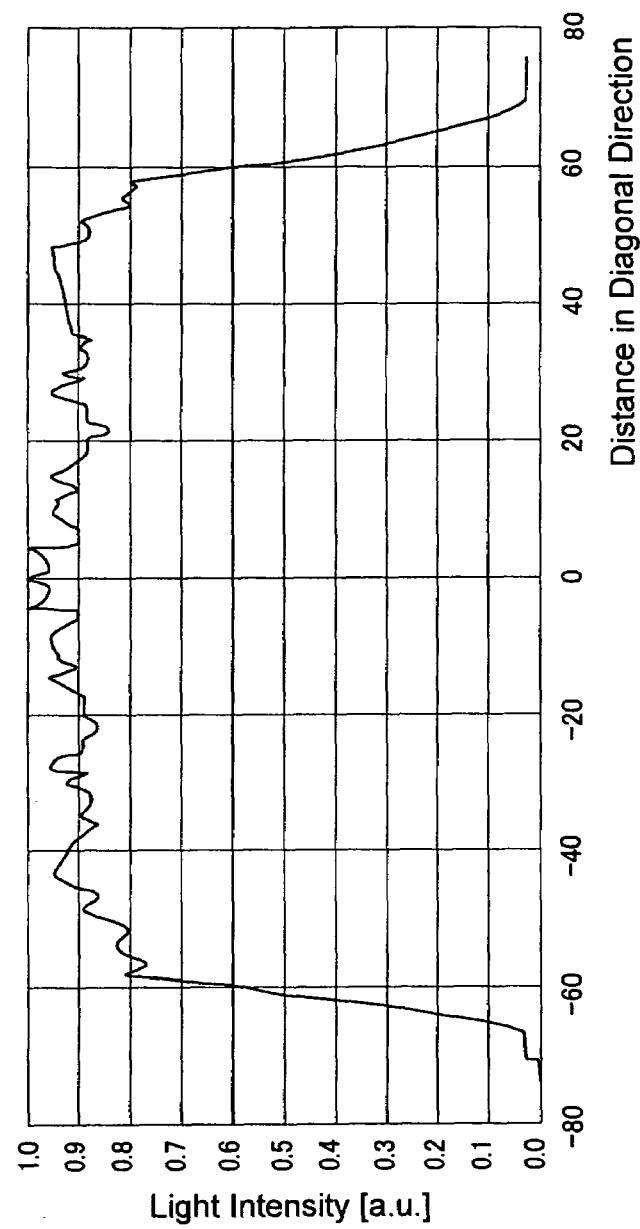
FIG. 16 shows distribution of optical intensity in the diagonal direction of the luminescent light source of Embodiment 1 of the present invention.

FIG. 15 shows optical intensity distribution in diagonal direction in the case of the concentric luminescent light source in which the reflecting mirror 12 is divided into the ring zones as shown in FIG. 5 or FIG. 6, and FIG. 16 shows optical intensity distribution in the case in which the reflecting mirror 26 is divided like a grid as shown in FIG. 13 or FIG. 14. The horizontal axis in FIG. 15 and FIG. 16 is a distance in diagonal direction, measured from the center of the reflecting mirror 26, and the vertical axis is optical intensity at each position. As can be seen when FIG. 15 and FIG. 16 are compared, while the optical intensity fluctuates ±15% with the convention method, fluctuation in the optical intensity in the embodiment is about ±8% and uniformity of the optical intensity has improved.

Figure 17:
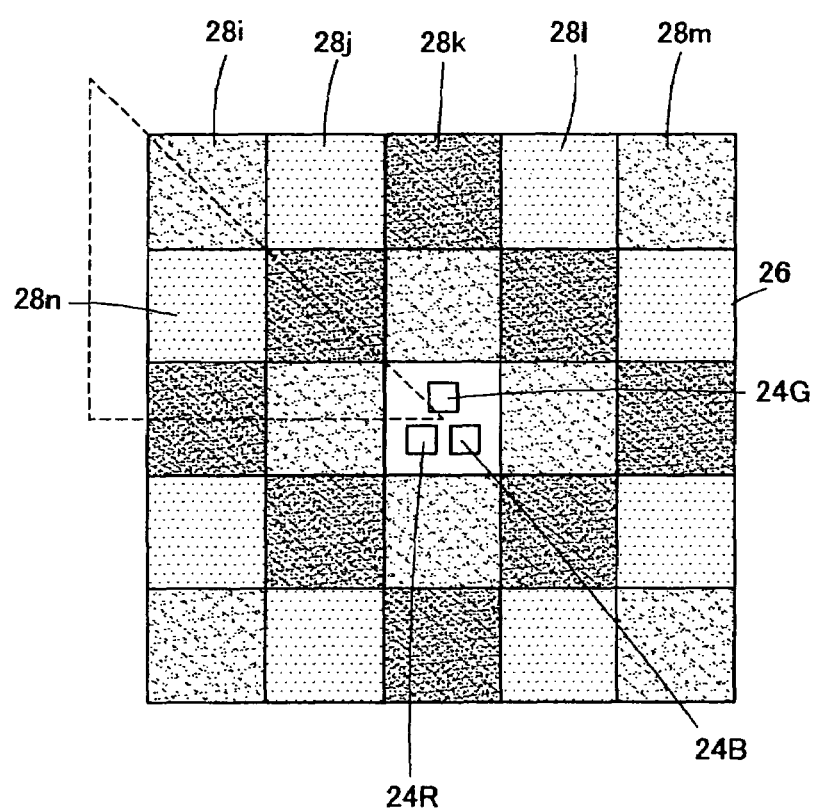
FIG. 17 shows a schematic front elevation of the reflecting mirror according to variant (variant 1) of Embodiment 1 of the present invention, illustrating one way of allocating curved shape of divided reflection areas.

Although in the embodiment, the curve constant was determined depending on the distance from the center of the reflecting mirror 26, the way of distribution of reflection areas having a same curve constant is arbitrary. For instance, in the variant 1 as shown in FIG. 17, distribution in the triangular area surrounded by the dashed line in the reflecting mirror 26 (⅛ area of the reflecting mirror 26) is determined, and then, by making this axisymmetric with respect to the two diagonal directions and two opposite side direction, distribution in other areas is determined.

Figure 1:
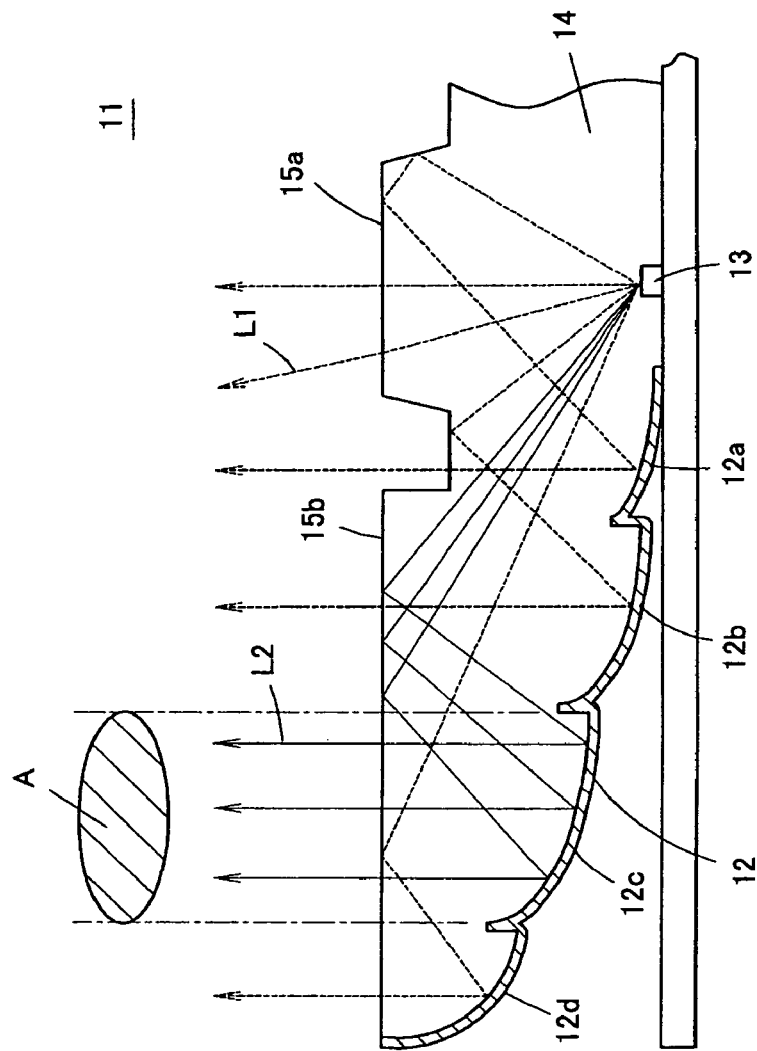
FIG. 1 shows a cross section showing a part of a conventional luminescent light source.
Figure 2:
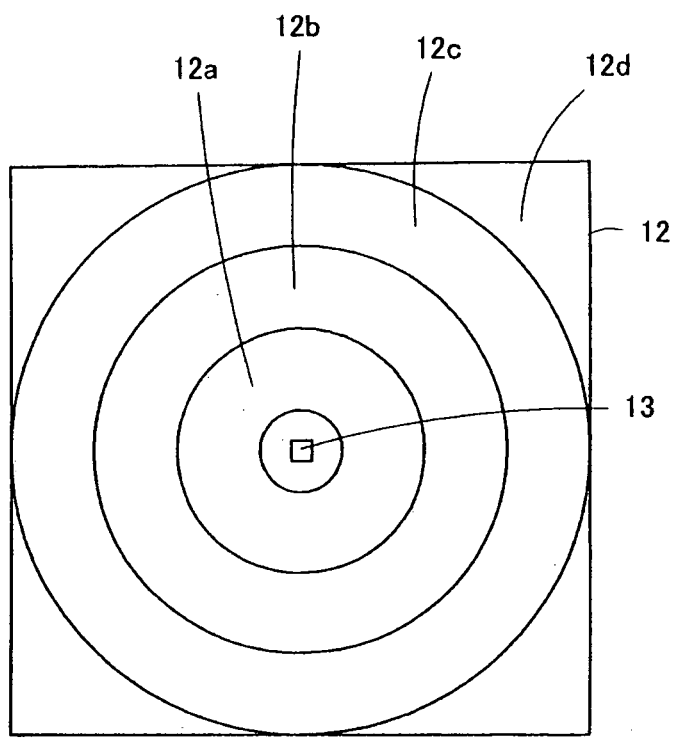
FIG. 2 shows a front elevation illustrating a light emitting device and a reflecting mirror, except for a mold unit, of the conventional luminescent light source.
Figure 3:
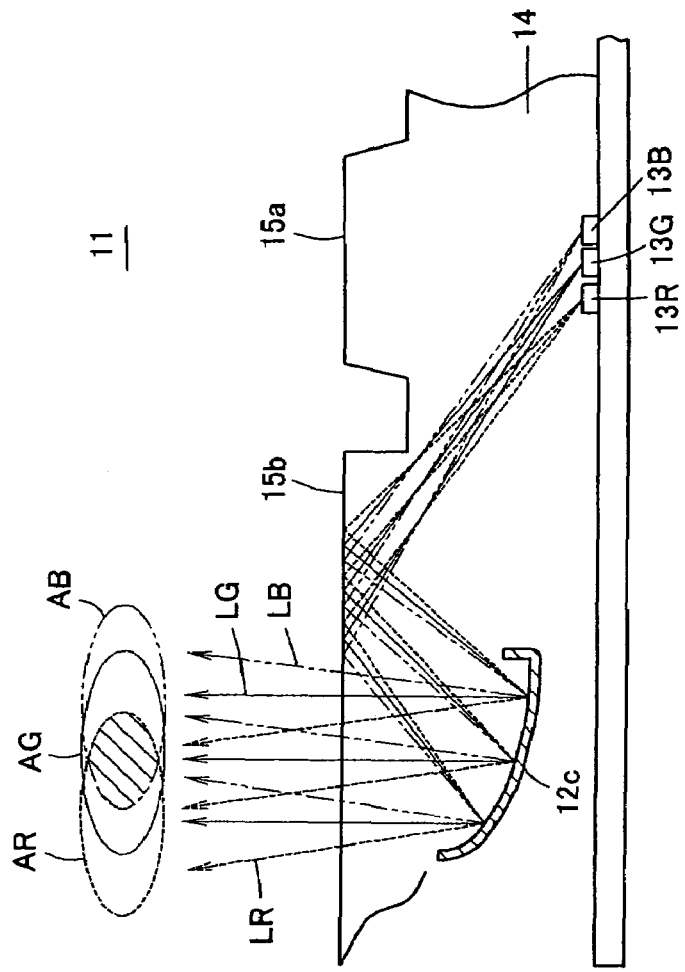
FIG. 3 shows a partial cross sectional view illustrating optical behavior of respective light in the conventional luminescent light source, with light emitting devices of three luminescent colors of red, green and blue arranged in the central area.
Figure 4:
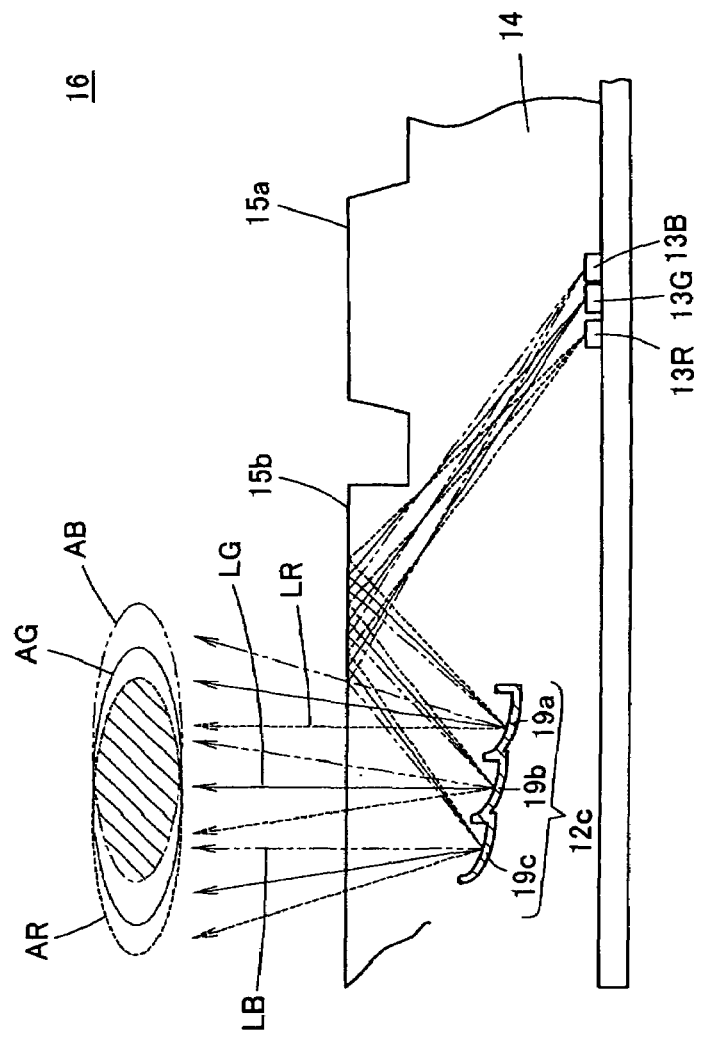
FIG. 4 shows a partial cross sectional view illuminating optical behavior of each light in the luminescent light source same as above, when reflection areas are divided smaller.
Figure 18:
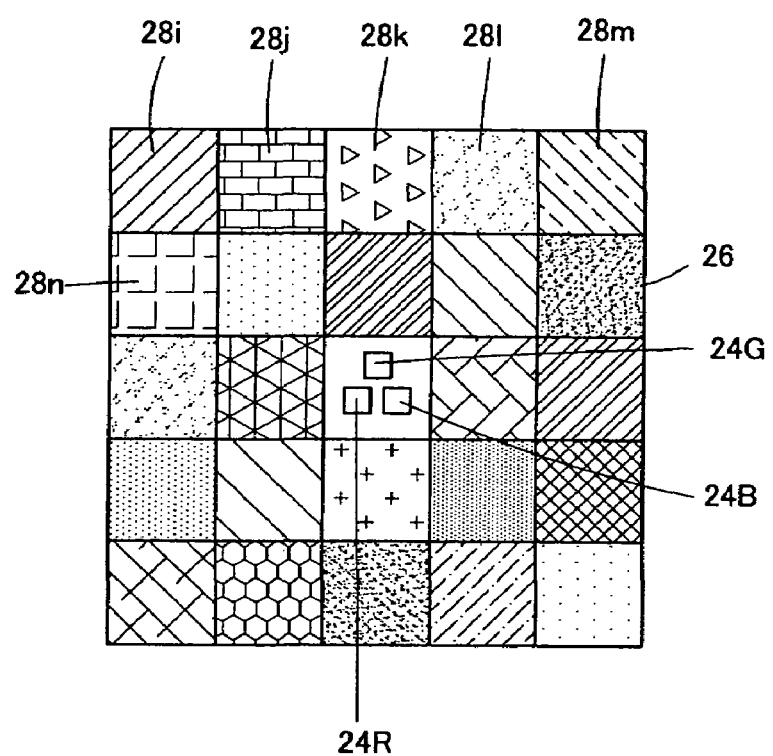
FIG. 18 shows a schematic front elevation of the reflecting mirror according to variant 2 of the present invention, illustrating another way of allocating curved shape of divided reflection areas.

In addition, if the reflecting mirror is designed so that the optical intensity distribution of the luminescent light source 21 is uniform and color uniformity can be improved, as in the reflecting mirror 26 of the variant 2 shown in FIG. 18, the divided respective reflection areas 28$i$, 28$j$, 28$k$, ... may be arranged in random manner, having curve constants that are different to each other. However, although the degree of freedom in designing increases if the respective reflection areas are randomly arranged, color irregularity at the luminescent light source 21 will be greater. In fact, as described in FIG. 4, in order to keep color irregularity at a luminescent light source small, it is necessary to dispose reflection areas that have light of respective colors to be vertically outputted in a predetermined sequence, considering the order in which light emitting devices are arranged. On the one hand, since the light emitting devices or the reflection areas are arranged in two dimensions, there will be an area among adjacent reflection areas that has light of a same color to be outputted vertically to the front face direction, even if the reflection areas are determined regularly in respective diagonal directions or opposite side directions. Hence, it is necessary to adjust the reflection areas so that such an area will not be generated.

Figure 19:
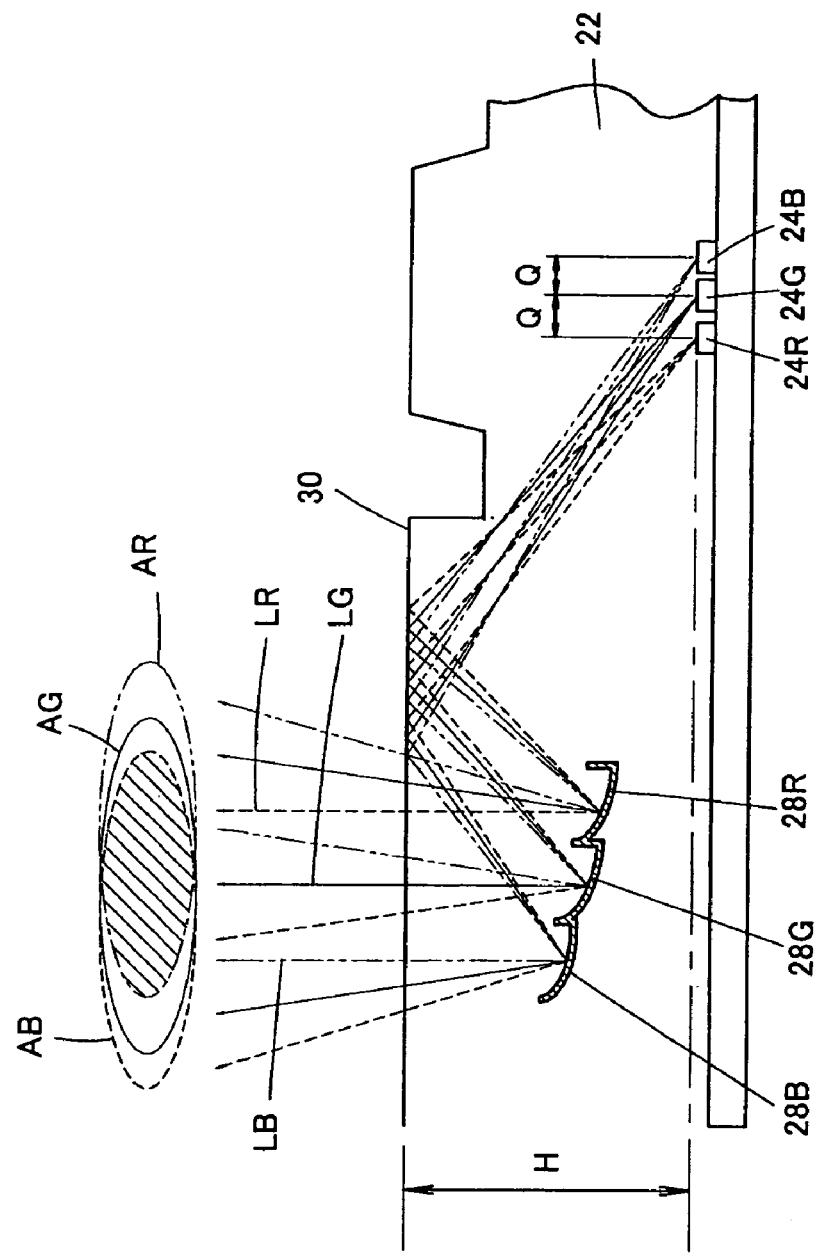
FIG. 19 shows a schematic view for illustrating how a curvature in a reflecting mirror in which each reflection area is a conic surface is determined.

In the following, we describe a method of designing each reflection area. First, with reference to FIG. 19, we describe a method of designing in the case in which, as a curve constant, a curvature CV of the expression (1) is changed for every reflection area. Now, as adjacent three areas in the diagonal direction or a direction parallel to the side are treated as one pair, FIG. 19 only shows the adjacent three reflection areas. The three reflection areas shall be 28R, 28G, 28B, and the curvature thereof shall be CVr, CVg, CVb, respectively. Now, the reflection area 28R is the reflection area designed to have red light outputted from the light emitting device 24R to exit vertically to the front face direction, the reflection area 28G is the reflection area designed to have green light outputted from the light emitting device 24G to exit vertically to the front face direction, and the reflection area 28B is the reflection area designed to have blue light exit vertically to the front face direction. As shown in FIG. 19, if the red light emitting device 24R, the green light emitting device 24G, and the blue light emitting device 24B are arranged in this order from the left on the figure, in order to reduce color irregularity of the luminescent light source 21, the reflection areas have to be arranged from the left as one faces, in the order of the reflection area 28B that has blue light to exit to the front face direction, the reflection area 28G that has green light to exit to the front face direction, and the reflection area 28R that has red light to exit to the front face direction (see FIG. 4). In addition, if color of the light to be reflected by the reflection area and to be outputted vertically to the front face direction is considered a control color of that reflection area, the reflection area 28R is the reflection area whose control color is red, the reflection area 28G is the reflection area whose control color is green, and the reflection area 28B is the reflection area whose control color is blue.

The curvature CV of the conic surface can change the traveling direction of light reflected by each reflection area, and decreasing the curvature CV tilts the light reflected by that reflection area outward, while increasing the curvature CV tilts the light reflected by that reflection area inward. Thus, the light output direction in the respective reflection areas 28R, 28G, 28B could be adjusted if the curvature CVr, CVg, CVb, etc., of the adjacent reflection areas 28R, 28G, 28B was designed, considering pitch interval Q among the respective light emitting devices 24R, 24G, 24B, a distance H between the light output surface of the light emitting devices 24R, 24G, 24B and the surface of the mold unit 22, positions of the respective reflection areas 28R, 28G, 28B, etc. Therefore, when priority of the control color of the adjacent reflection areas, etc. is determined depending on arrangement of the light emitting devices 24R, 24G, 24B, and the curvature CVr, CVg, CVb, etc. is designed in consideration of the priority, a white overlapped area (shaded portion in FIG. 19) of the area AR of red light LR, the area AG of green light LG and the area AB of blue light LB can be widened, thus obtaining uniform white light. For instance, in the configuration such as FIG. 19, red light LR is outputted vertically to the front side in the reflection area 28R, green light LG is outputted vertically to the front side in the reflection area 28G, and blue light LB is outputted vertically to the front side in the reflection area 28B. Based on the curvature CVg of the central reflection area 28G, the curvature CVr of the reflection area 28R closer to the center is greater than CVg, and the curvature CVb of the reflection area 28$b$ farther from the center is smaller than CVg.

In the mean time, when the curvature of the reflection area is determined as described above, the curvature varies depending on a position of the light emitting devices 24R, 24G, 24B. In practice, as the respective light emitting devices 24R, 24G, 24B are not arranged in a line, the position or pitch interval Q changes depending on a viewing direction. For instance, as shown in FIG. 20A, the arrangement of the light emitting devices 24R, 24G, 24B of when the curve constant of the reflection areas 28R, 28G, 28B in the opposite side direction K1 is defined needs to be handled as being different from that of the light emitting devices 24R, 24G, 24B of when the curve constant of the reflection areas 28R, 28G, 28B in the diagonal direction is defined.

For instance, when the reflection areas 28R, 28G, 28G on the opposite side direction K1 are considered, K1, as shown in FIG. 20B, the curve constants of the reflection area 28R, 28G, 28B are defined by using virtual light emitting devices 32R, 32G, 32B that project respective light emitting devices 24R, 24G, 24B onto the straight line of the opposite side direction K1. In other words, for the reflection area 28R on the opposite side direction K1, the curve constant is defined so that red light outputted from the virtual light emitting device 32R is vertically outputted to the front face, for the reflection area 28G on the opposite side direction K1, the curve constant is defined so that green light outputted from the virtual light emitting device 32G is vertically outputted to the front face, and for the reflection area 28B on the opposite side direction K1, the curve constant is defined so that blue light outputted from the virtual light emitting device 32B is vertically outputted to the front face. In addition, when the reflection areas 28R, 28G, 28B on the opposite side direction K2 of FIG. 20A are considered, as shown in FIG. 20B, as shown in FIG. 20B, the curve constants of the reflection area 28R, 28G, 28B are defined by using virtual light emitting devices 33R, 33G, 33B that project respective light emitting devices 24R, 24G, 24B onto the straight line of the diagonal direction K2. In other words, for the reflection area 28R on the diagonal direction K2, the curve constant is defined so that red light outputted from the virtual light emitting device 33R is vertically outputted to the front face, for the reflection area 28G on the diagonal direction K2, the curve constant is defined so that green light outputted from the virtual light emitting device 33G is vertically outputted to the front face, and for the reflection area 28B on the diagonal direction K2, the curve constant is defined so that blue light outputted from the virtual light emitting device 33B is vertically outputted to the front face.

Figure 20:
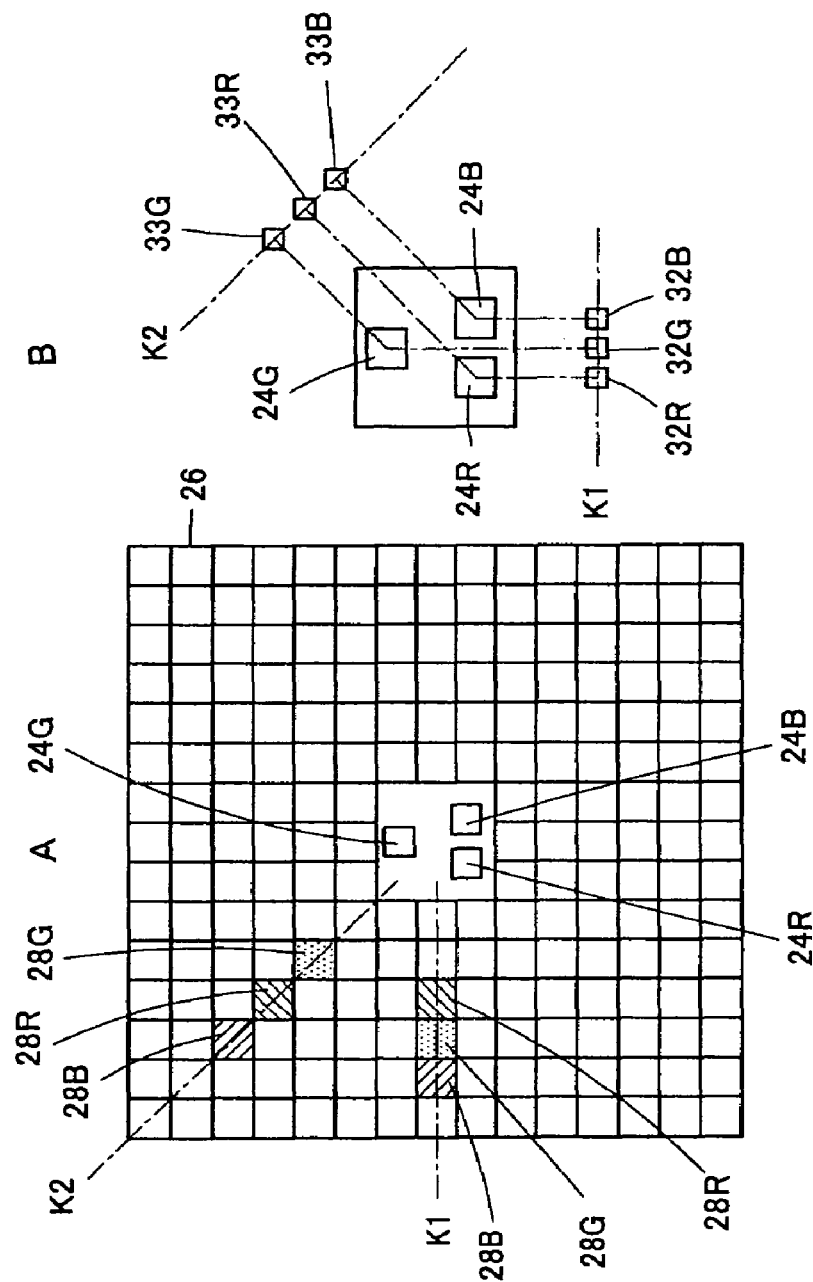
FIG. 20 shows a view illustrating how layout or pitch interval of virtual light emitting devices in each direction are determined.

In the example shown in FIG. 20, the virtual light emitting devices 32R, 32G, 32B projected onto the straight line of the opposite side direction K1 are equally spaced, thus facilitating designing of the respective reflection areas.

In addition, FIG. 21A, B show the case in which 5 light emitting devices are used. For instance, when the light emitting devices of red, green, and blue are used, the respective emitting devices may be combined at a certain proportion to uniformly balance luminance of respective colors because these light emitting devices have different luminance. For instance, in FIG. 21A, as luminance of the red light emitting device 24R is high, one red light emitting device 24R, and two each of green and blue light emitting devices 24G, 24B are used.

In this case, in the opposite side direction K1, as shown in FIG. 21B, as it can be considered that the green and blue light virtual light emitting devices 32G, 32B are arranged in same positions that mutually overlap on the both sides of the red light emitting device 32R, the control color and curvature CV of the respective reflection areas may be defined corresponding to the layout of such the virtual light emitting devices. In the opposite side direction K1, the reflection area 28R is designed to correspond to the red virtual light emitting device 32R, and the reflection area 28GB being adjacent to the reflection area 28R on the inner circumference side is designed to correspond to the green and blue virtual light emitting devices 33G, 33B located to the left as one faces in the opposite side direction K1, and the reflection area 28GB being adjacent to the reflection area 28R on the outer circumference side is designed to correspond to the green and blue virtual light emitting devices 33G, 33B located to the right as one faces in the opposite side direction K1.

In addition, in the diagonal direction K2, as shown in FIG. 21B, as it can be considered that intermediate the blue virtual light emitting devices 33B, one red virtual light emitting device 33R and two green virtual light emitting device 33G are arranged, overlapping in the same position, the control color and curvature CV are defined corresponding to the layout of such the virtual light emitting devices. For instance, the reflection area 28RG in the diagonal direction K2 is designed to correspond to the red and green virtual light emitting devices 33R, 33G, the reflection area 28B being adjacent to the reflection area 28RG on the inner circumference side is designed to correspond to the virtual light emitting device 24B located in the left top in the diagonal direction K2, and the reflection area 28B being adjacent to the reflection area 28RG on the outer circumference side is designed to correspond to the light emitting device 24B located in the right bottom in the diagonal direction K2.

Similarly, in the diagonal direction K3, as shown in FIG. 21B, as it can be considered that intermediate the green virtual light emitting devices 33G, one red virtual light emitting device 33R and two blue virtual light emitting device 33B are arranged, overlapping in the same position, the control color and curvature CV are defined corresponding to the layout of such the virtual light emitting devices. For instance, the reflection area 28RB in the diagonal direction K3 is designed to correspond to the red and blue virtual light emitting devices 33R, 33B, the reflection area 28G being adjacent to the reflection area 28RB on the inner circumference side is designed to correspond to the virtual light emitting device 33G located in the left bottom in the diagonal direction K3, and the reflection area 28G being adjacent to the reflection area 28RB on the outer circumference side is designed to correspond to the light emitting device 33G located in the right top in the diagonal direction K3.

In the following, we describe a method of designing in the case in which as a curve constant, the conic coefficient CC of the expression (1) is changed for every reflection area. The conic coefficient CC can change a degree of spread of the light reflected by that reflection area, and decreasing the conic coefficient CC expands the spread of the light reflected by the reflection area and increasing the conic coefficient CC shrinks the spread of the light reflected by the reflection area. Thus, when designing the conic coefficient CC, the conic coefficient CC may be determined based on a distance between the light output surface of the light emitting devices 24R, 24G, 24B and the surface of the mold unit 22, distance D1, D2 between the reflection area and the light emitting devices 24R, 24G, 24B, etc.

Figure 22:
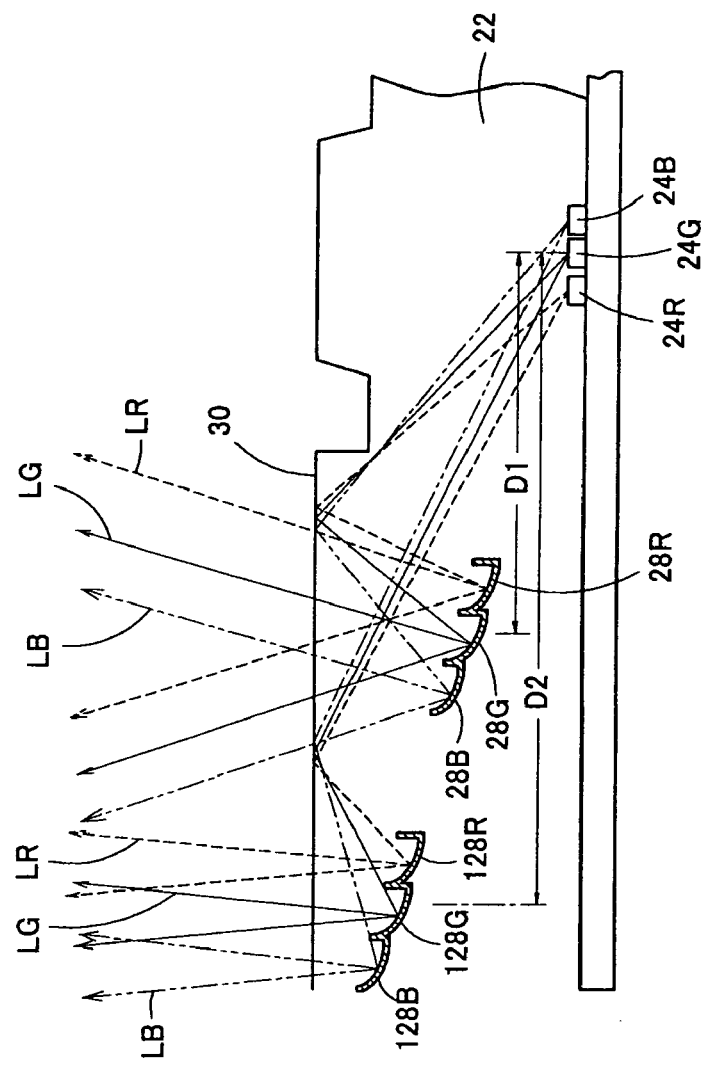
FIG. 22 shows a view for illustrating how a conic coefficient is determined in a reflecting mirror in which each reflection area is a conic surface.

Specifically, as shown in FIG. 22, in the reflection areas 28R, 28G, 28B having a short distance D1 to the light emitting devices 24R, 24G, 24B, the conic coefficient CC may be reduced, and in the reflection areas 128R, 128G, 128B having a long distance D2 to the light emitting devices 24R, 24G, 24B, the conic coefficient CC may be increased. Consequently, in the reflection areas 28R, 28G, 28B close to the light emitting devices 24R, 24G, 24B, the spread of the output light is great and directivity is wide. In the reflection areas 28R, 28G, 28B near the light emitting devices 24R, 24G, 24B, light of respective colors does not mix easily as the light path length is short although much light arrives. However, by reducing the conic constant to widen directivity of the reflected light, not only the optical intensity is suppressed by diffusing light, but also the degree of color mixture can be enhanced. In contrast to this, in the reflection areas 128R, 128G, 128B remote from the light emitting devices 24R, 24G, 24B, the spread of the output light is small and directivity is narrow. In the reflection areas 128R, 128G, 128G remote from the light emitting devices 24R, 24G, 24B, the amount of arriving light is small, while the light path length is long and color missing progresses well. However, by increasing the conic constant CC and narrowing directivity of the reflected light, light diffusion is reduced and the optical intensity is improved even at the expense of the color mixing degree to some extent. Thus, according to the method of designing, optical intensity can be equalized in the whole luminescent light source 21, and furthermore color uniformity can be achieved by balancing the color mixing degree across the luminescent light source 21. However, this does not mean that such the designing policy is given the highest priority, and as the object is to design so that the optical intensity and color mixing degree in the irradiated surface (target surface) defined to be ahead of the luminescent light source in the design will be optimal, there might be the case in which the reflection area near the light emitting device has narrower spread of light as a result of optimal designing of the optical intensity and color mixing degree on the target surface.

Figure 23:
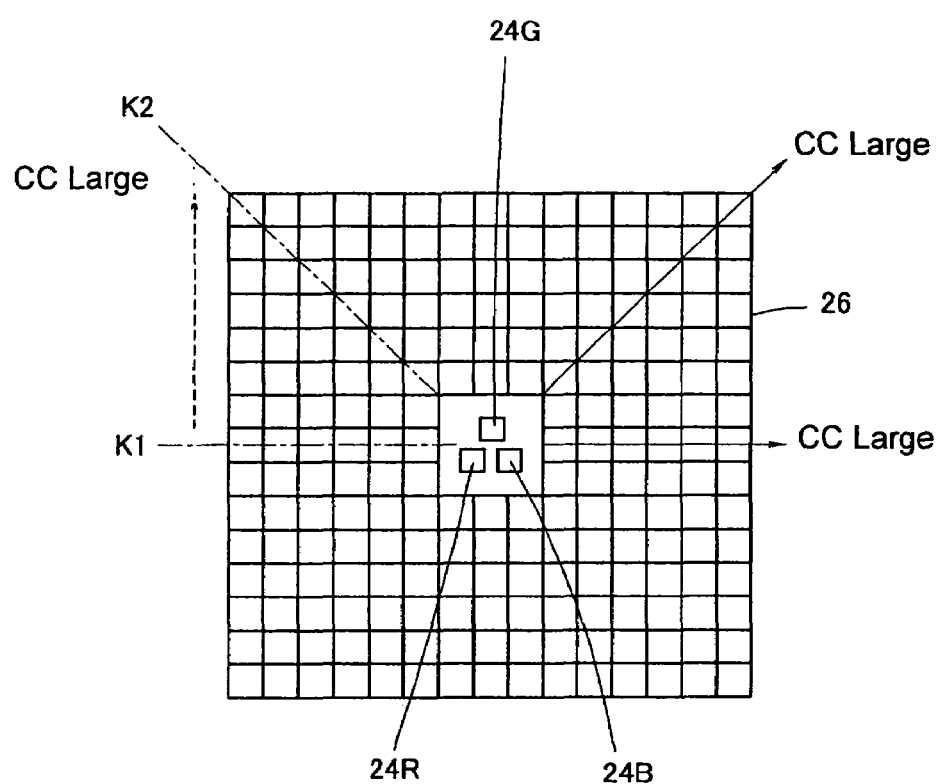
FIG. 23 shows a view illustrating how size of the conic coefficient is determined when each reflection area is a conic surface.

On the one hand, tracking or fine tuning of light would be easier if respective reflection areas 28*i*, 28*j*, 28*k*, . . . on the reflecting surface 26 were designed on a continuous axis (on the line). Thus, when the reflection areas 28*i*, 28*j*, 28*k*, . . . are designed, first, reflection areas positioned in the diagonal or opposite side direction are designed. After the conic coefficient CC of the reflection areas positioned in the diagonal direction K2 or the opposite side direction K1 is thus determined, as shown by the solid line arrow in FIG. 23, the conic coefficient CC in each reflection area is defined so that the farther from the center of the light emitting devices 24R, 24G, 24B the reflection area is, the greater the conic coefficient is.

Then a constant of a curved surface of the reflection area adjacent to the reflection area is designed. In this case, as shown by the dashed line arrow in FIG. 23, the conic coefficient CC may be set so that it increases from the opposite side direction to the diagonal direction.

Figure 24:
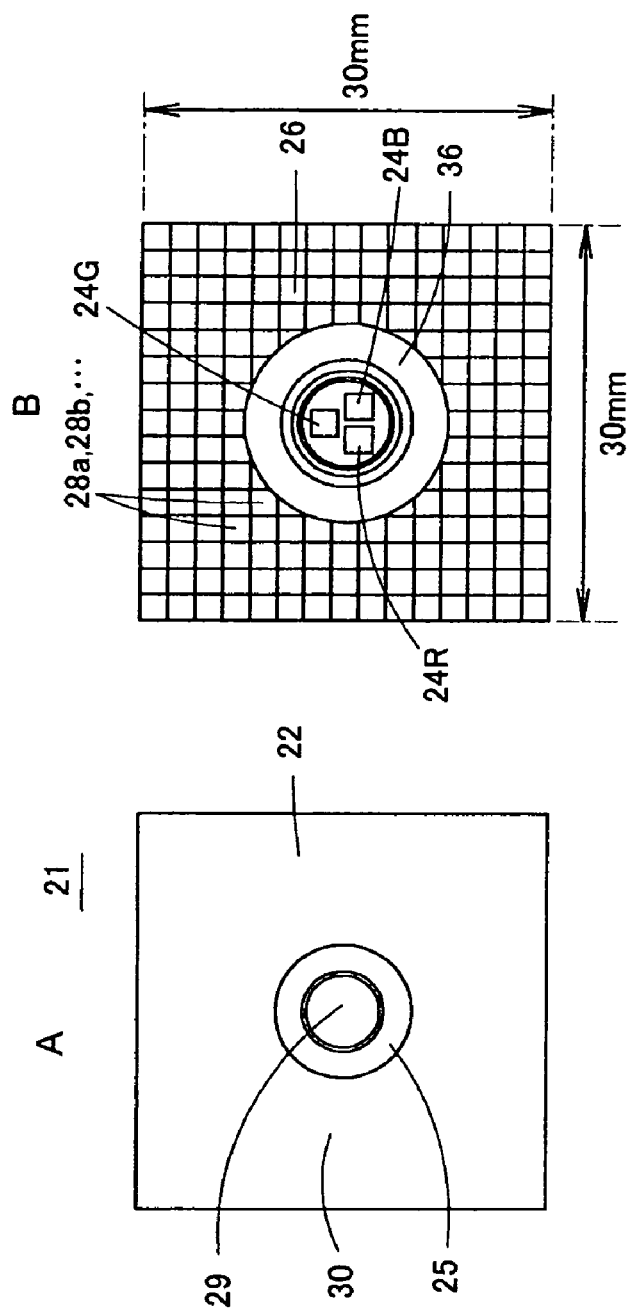
FIG. 24A shows a front elevation of a luminescent light source for illustrating a design case.
FIG. 24B shows a front elevation of the luminescent light source with a mold unit thereof removed.
Figure 25:
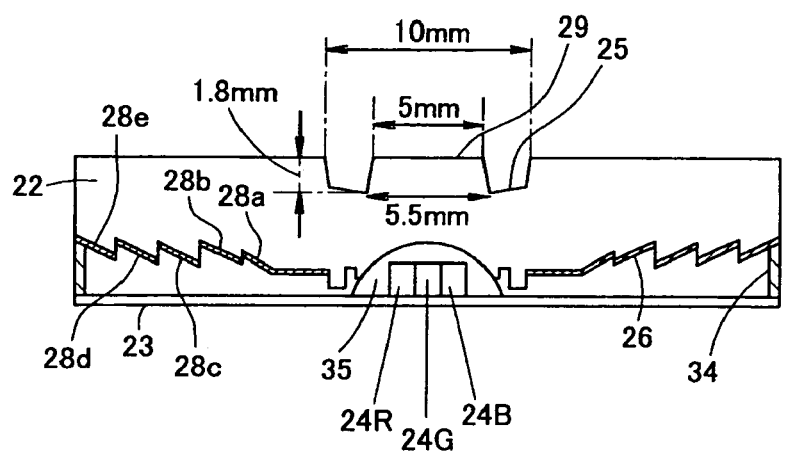
FIG. 25 shows a cross sectional view of the luminescent light source of FIG. 24.

In the following, we describe the method of specifically designing the reflecting mirror 26 according to the principle as discussed above. FIG. 24A and B show a front elevation of the luminescent light source 21 with one each of red light emitting device 24R, green light emitting device 24G, and blue light emitting device 24B arranged in the central area, and a front elevation with the mold unit 22 removed. FIG. 25 shows a cross section al view in the diagonal direction thereof. The outside dimension of the luminescent light source 21 when viewed from the front face is 30 mm×30 mm, respectively. The reflecting mirror 26 is vertically and horizontally divided into 15 areas, respectively, forming a mesh-like reflection areas 28a, 28b, ... and each reflection area is 2 mm×2 mm, respectively. The respective light emitting devices 24R, 24G, 24B are triangularly arranged, wherein the red light emitting device 24R and the blue light emitting device 24B are arranged side by side in a direction parallel to the upper and lower sides of the reflecting mirror 26, and the green light emitting device 24G is located above them. In addition, the diameter of the direct output area 29 is 5 mm, the bore (diameter) of the bottom face of the channel 25 is 5.5 mm, outside diameter (diameter) of the top surface of the channel 25 is 10 mm, and depth of the channel 25 is 1.8 mm.

First of all, we describe the procedure of determining control color of every reflection area 28a, 28b, .... First, array of control colors in the four diagonal directions K2, K3, K5, K6 and the four opposite side directions K1, K4, K7, K8 is determined. As the arrangement of the light emitting devices 24R, 24G, 24B is same as that as shown in FIG. 20, as seen from the description on FIG. 20, the virtual light emitting devices 33G, 33R, 33B are arranged from the left top to the right bottom in the diagonal directions K2, K6. Thus, in the diagonal direction K2 in the left top as one faces, the control colors are arranged in the order of green (G), red (R), blue (B), while those are arranged in the order of blue (B), red (R), blue (B) in the diagonal direction K6 in the right bottom.

In the diagonal directions K3, K5, as the virtual light emitting devices 33R, 33B, 33G are arranged from the left bottom to right top. Thus, in the diagonal direction K3 in the left bottom as one faces, the control colors are arranged in the order of red (R), blue (B), green (G), while in the right horizontal opposite side direction K4, in the diagonal direction K5 in the right top as one faces, the control colors are arranged in the order of green (G), blue (B), red (R).

In addition, as the virtual light emitting devices 32R, 32G, 32B are arranged from left to right in the horizontal direction, the control colors in the left horizontal opposite side direction K1 as one faces arranged in the order of red (R), green (G), blue (B) from the inner side to the outer side, while the control colors are arranged in the order of blue (B), green (G), red (R), from the inner side to the outer side.

Figure 26:
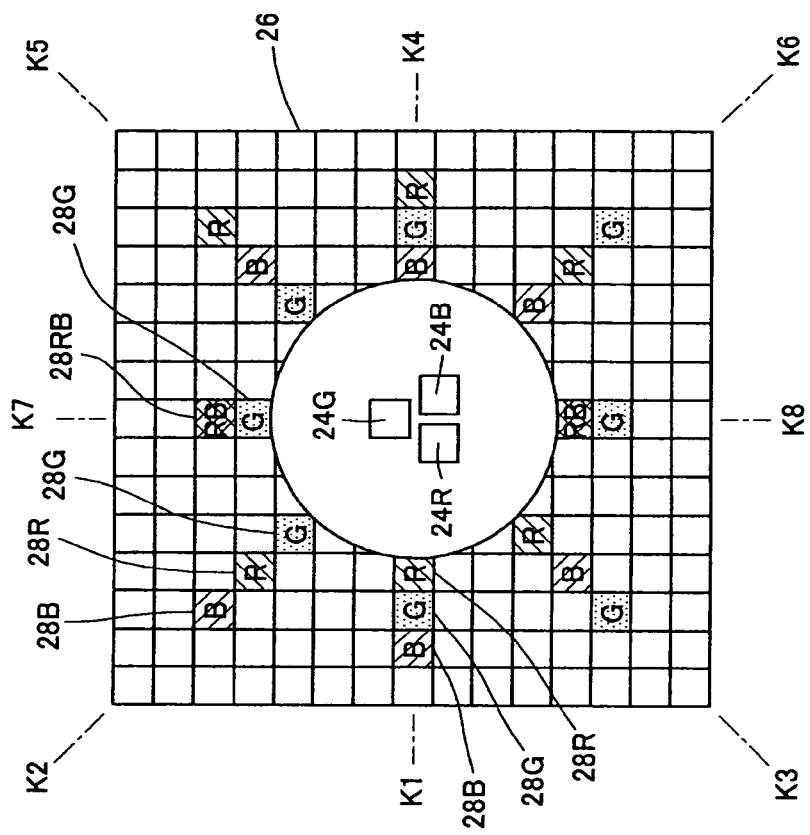
FIG. 26 shows a view illustrating how control colors of reflection areas are determined.

In addition, as it can be considered that in the vertical direction, one red virtual light emitting device 32R and one blue virtual light emitting device 32B overlap and are arranged in the same position, and one green virtual light emitting device 32G is arranged adjacent to them, in the upper vertical opposite side direction K7, the control colors are arranged in the order of green (G), red and blue (RB) from the inner side to the outer side, while in the lower vertical opposite side direction K8, the control colors are arranged in the order of red and blue (RB), green (G) from the inner side to the outer side. FIG. 26 shows the state in which the order of control colors in the respective directions K1 to K8 has been thus determined.

When the order of the control colors in the respective directions K1 to K8 is determined as described above, as shown in FIG. 27, the control color of each reflection area, for instance, one in the left top diagonal direction K2 is first determined. For instance, if the control color of the reflection area at the upper left corner is arbitrarily determined, the control color in the diagonal direction K2 is arbitrarily determined.

Figure 27:
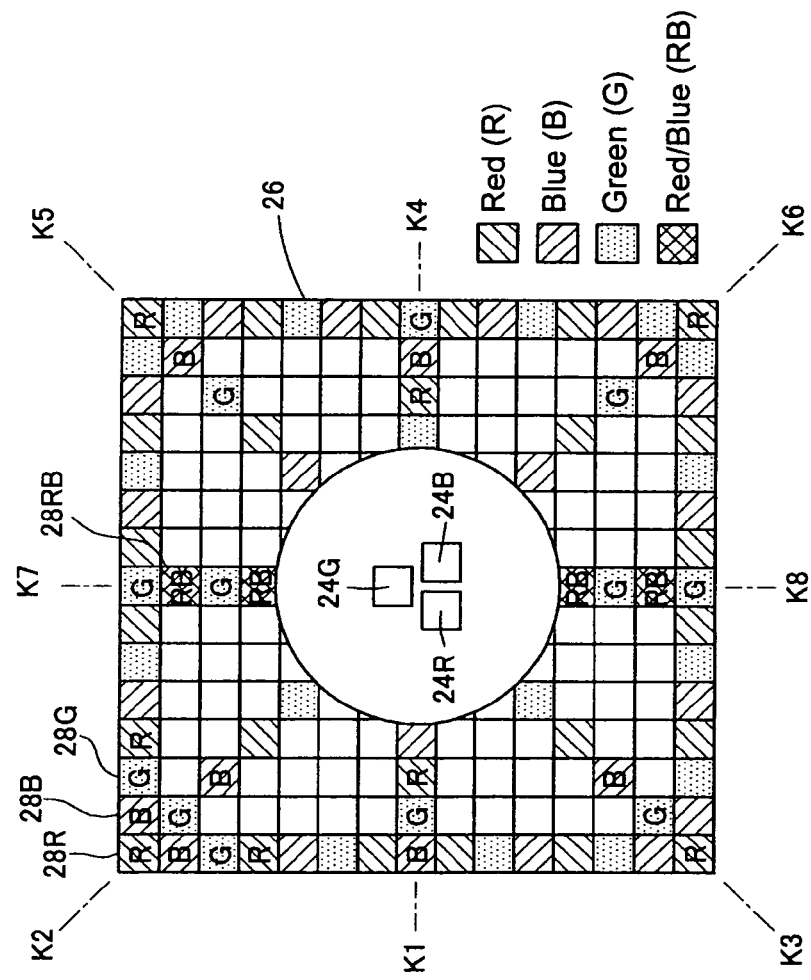
FIG. 27 shows a view illustrating how control colors of reflection areas are determined, following steps of FIG. 26.

Then, with the order of the control colors in the diagonal direction K2 as a starting point, the control colors of the reflection areas located in the outer circumferential area of the reflecting mirror 26 are determined so that the control colors in the reflection areas that are adjacent on the left, right, top and bottom are not in a same color. Then, in the respective directions K1, K3 to K8 except for K2, the order of control colors thus determined remains unchanged, and the position is just shifted in the respective directions of K1, K3 to K8. FIG. 27 shows the control colors thus determined in the outer circumferential area.

Figure 28:
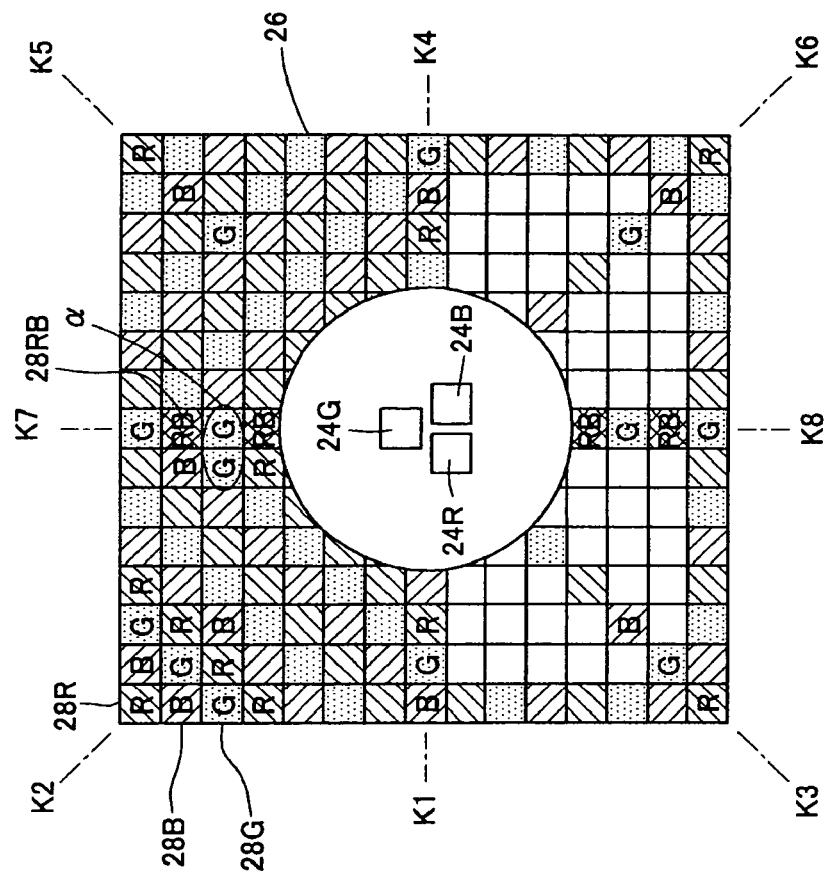
FIG. 28 shows a view illustrating how control colors of reflection areas are determined, following steps of FIG. 27.

Furthermore, as shown in FIG. 28, based on the control colors of the respective reflection areas in the directions K1, K2, K4, K5, K7 and those of the respective reflection areas in the outer circumferential area, in the upper half area of the reflecting mirror 26, the control colors of empty reflection areas area determined so that the control colors in the reflection areas that are adjacent on the left, right, top and bottom are not in a same color.

Figure 29:
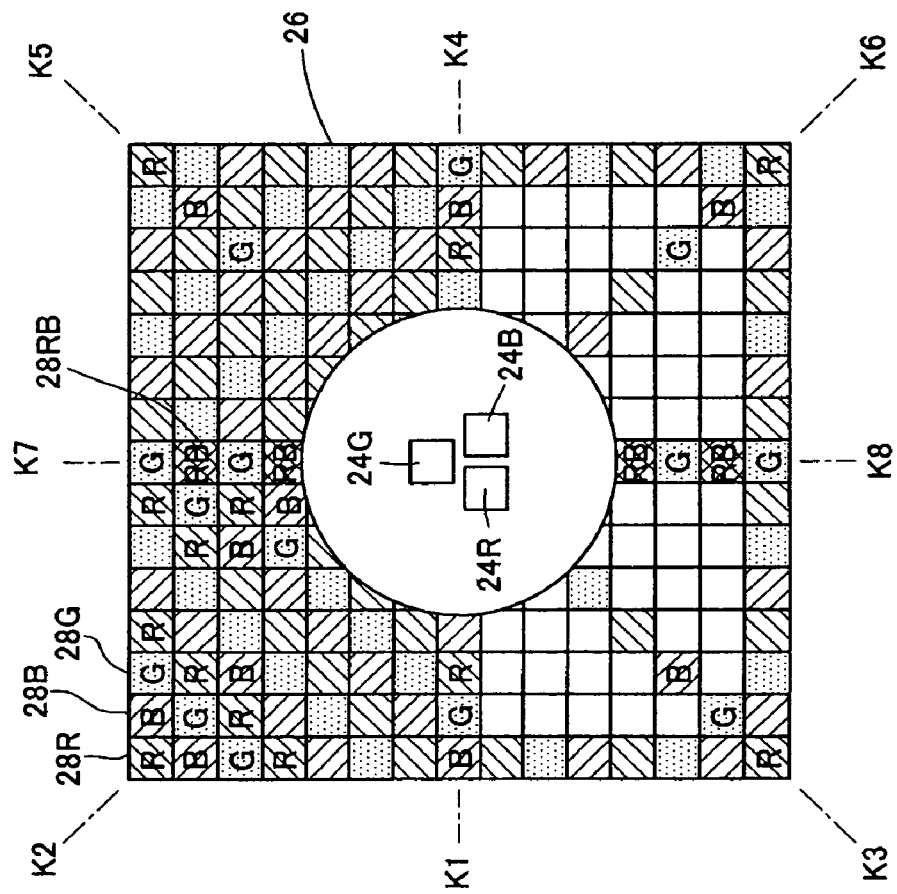
FIG. 29 shows a view illustrating how control colors of reflection areas are determined, following steps of FIG. 28.

Then, in the distribution state of the control colors shown in FIG. 28, the green control color are adjacent side by side in α portion. If a same control color is contiguous on the left, right, top and bottom like this, the control colors will be adjusted by shifting them in trial and error manner so that control colors in adjacent reflection areas will not be same. In FIG. 29, the control colors of red, green, and blue are shifted one by one in the α portion of FIG. 28 and in the vicinity thereto.

Figure 30:
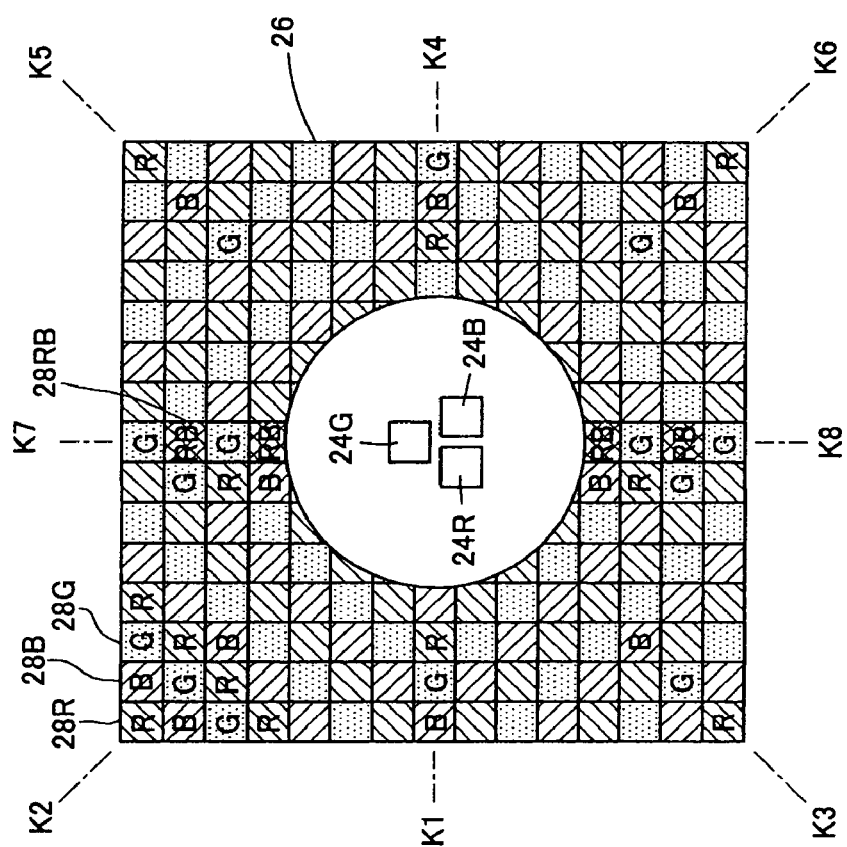
FIG. 30 shows a view illustrating how control colors of reflection areas are determined, following steps of FIG. 29.

Then, as shown in FIG. 30, the control colors in the lower half of the reflection areas are determined so that they can be symmetrical about a line with the control colors of the upper half of the reflection areas, with respect to the horizontal direction K1 to K4. The control colors of the lower half of the reflection areas thus determined by axisymmetric manipulation correspond to the order of the originally determined control colors. Then, if the number of the longitudinally arranged reflection areas is odd, there will be no problem. However, if the number of the longitudinally arranged reflection areas is even, the control colors of vertically adjacent reflection areas will be same along the horizontal direction in the upper and lower central areas. Thus, in such a case, it is necessary to shift the control colors therein in the in trial and error manner so that the control colors in adjacent reflection areas will not be same. Thus, it would be desirable if an odd number of the reflection areas is arranged.

Alternatively, if the symmetric manipulation as described above is not desirable, similar to determination of the control colors of the upper half of the reflection areas, the control colors of the lower half of the reflection areas are independently determined. If a same control color is contiguous on the left, right, top and bottom of the upper and lower half of the reflection areas, they may be adjusted. When the control colors in the whole reflecting mirror 26 have been thus determined, assignment of the control colors completes.

In addition, depending on the number of divisions or a shape of reflection areas, there are some cases in which a control color of reflection areas being adjacent on the left, right, top, and right will be same even after the assignment of the control colors is adjusted. In such a case, it shall be ensured that reflection areas remote from light emitting devices are preferentially adjusted so that same control colors will not overlap, and they will be contiguous in reflection areas closer to the light emitting devices. As described above, as reflection areas close to light emitting devices are controlled so that reflected light can be spread, thus being hard to affect color mixing performance of the luminescent light source 21, it is only necessary to shift them onto the vicinity of the light emitting devices.

When the control colors of the respective reflection areas have been thus determined, a constant of each reflection area, in particular, curvature CV, may be designed so that light of that color is outputted vertically to the front face direction. However, a reflection area whose control colors are red and blue (RB) is the reflection area such designed that red light and blue light outputted from the red and blue virtual light emitting devices 32R, 32B located in a same position in a certain direction will be outputted vertically to the front face direction.

When the control colors of each reflection area have been thus determined, a curvature or shape of each reflection area is determined so that the light is outputted to the front face direction, depending on the control color. Specifically, if a conic surface comprises a reflection area, a conic coefficient CC or curvature CV being parameters thereof may be determined.

First, we should consider determining the conic coefficient CC of each reflection area so that light exits uniformly from the whole luminescent light source 21. The light to be outputted from the luminescent light source 21 can be divided into light to be outputted directly from the light emitting devices 24R, 24G, 24B and the light to be outputted after being reflected by the reflecting mirror 26. Thus, it is necessary to know distribution of amount of light to be outputted directly from the light emitting devices 24R, 24G, 24G. As shown in FIG. 12, this is the light to be outputted from the direct output area 29.

Figure 31:
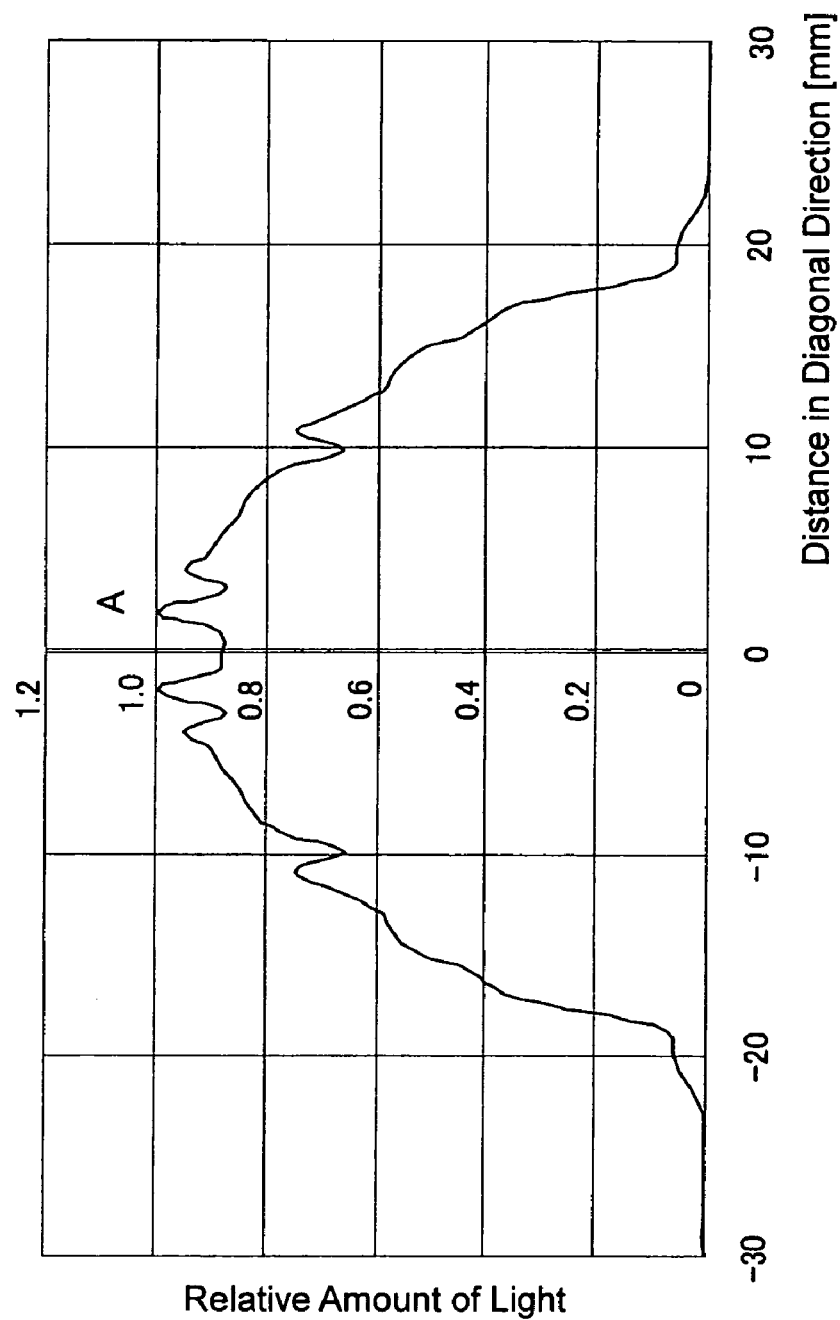
FIG. 31 shows distribution of irradiation light amounts in an irradiated surface of light outputted from the direct output area.
Figure 32:
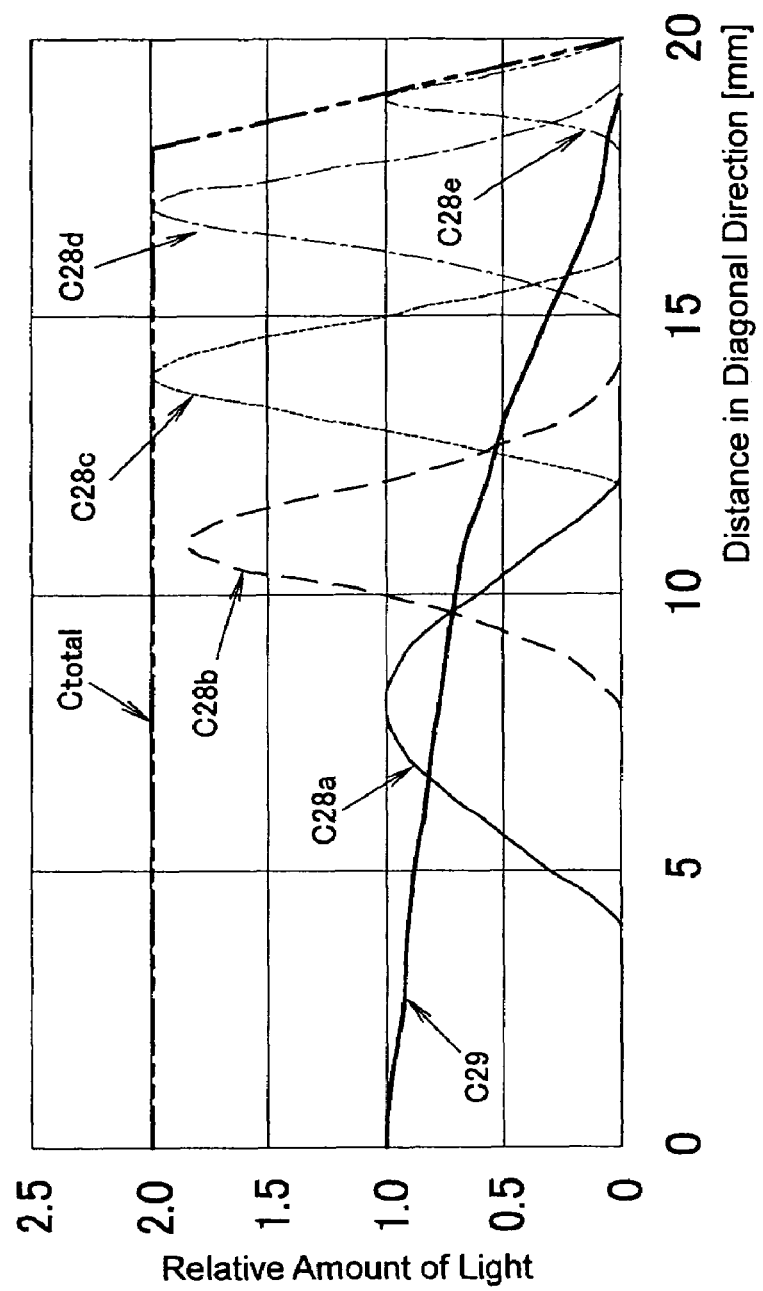
FIG. 32 shows distribution of irradiation light amounts in an irradiated surface of light outputted from the direct output area, distribution of irradiation light amounts in the irradiate surface of light reflected by each reflection area, and distribution of whole light amounts.

FIG. 31 shows distribution of irradiation light amounts of light to be outputted from the direct output area 29 of the luminescent light source 21. The irradiation light amounts are those on the irradiated surface (target surface) 20 mm distant from the front face of the luminescent light source 21. The horizontal axis of FIG. 31 designates a distance in the diagonal direction from the center of the luminescent light source 21, and the vertical axis designates relative values of the irradiation light amounts that are normalized so that the maximum value of the light amounts will be 1. In addition, the curved line C29 in FIG. 32 represents a partly expanded distribution of light amounts of FIG. 31. Thus, given the diagonal directions of the luminescent light source 21 as shown in FIG. 24 or FIG. 25, as on the cross section, the five reflection areas 28a, 28b, 28c, 28d, 28e are arranged in this order from the inner side, it would be good if the irradiation light amounts to be outputted from the front face direction from the reflection regions 28a, 28b, 28c, 28d, 28e made up for distribution of the irradiation light amounts on the target surface of the light to be outputted from the direct output area 29, and substantially uniform amount of light as a whole could be obtained.

For instance, to distribution of irradiation light amounts of light to e outputted from the direct output area 29 as shown in FIG. 31, if distribution of irradiation light amounts to be outputted after being reflected by the respective reflection areas 28a, 28b, 28c, 28d, 28e is the distribution as shown by C28a, C28b, C28c, C28d, C28e in FIG. 32, the total irradiation light amount distribution Ctotal will be substantially uniform light amount distribution. However, at the end of the luminescent light source 21, if a plurality of luminescent light sources 21 are arranged, light from adjacent four luminescent light sources 21 overlap, and thus light amounts at the end may be small in a single luminescent light source 21.

Thus, if the distribution of light amounts of light to be outputted from the direct output area 29 is as shown in FIG. 31, peak values of the irradiation light amounts of light to be reflected by the respective reflection areas 28a, 28b, 28c, 28d, 28e may be 1.0 time, 1.8 times, 2 times, 2 times, 1 time higher than the peak values of the light to be outputted from the direct output area 29, as shown in FIG. 32. The amount of light to be incident on the reflection areas 28a, 28b, 28c, 28d, 28e rapidly decreases as it moves farther from the center. Thus, if given this, the conic coefficient CC of the reflection areas 28a, 28b, 28c, 28d, 28e is determined, the respective conic coefficient CC shall be −5, −2, −1.5, −1, −1 in this order.

Then, after the conic coefficient CC of the respective reflection areas 28a, 28b, 28c, 28d, 28e is determined, the curvature CV of the respective reflection areas 28a, 28b, 28c, 28d, 28e is determined depending on the control colors as determined above, adjustment should be made so that light of each control color is outputted to the front face direction from the respective reflection areas, 28a, 28b, 28c, 28d, 28e, and color uniformity is ensured by improving color mixing performance on the target surface of the luminescent light source 21. Specifically, the curvature of the respective reflection areas 28a, 28b, 28c, 28d, 28e shall be 1/5, 1/29, 1/28, 1/31, 1/31 in this order. Thus, if the conic coefficient CC or the curvature CV of the respective reflection areas 28a, 28b, 28c, 28d, 28e in the diagonal direction is determined, the conic coefficient CC or the curvature CV is determined for other remaining reflection areas, and a shape of each reflection area is determined. Distribution of optical intensity shown in FIG. 16 represents the distribution of irradiated light amounts on the target surface of the luminescent light source 21 for which the curve constant is thus determined.

Figure 21:
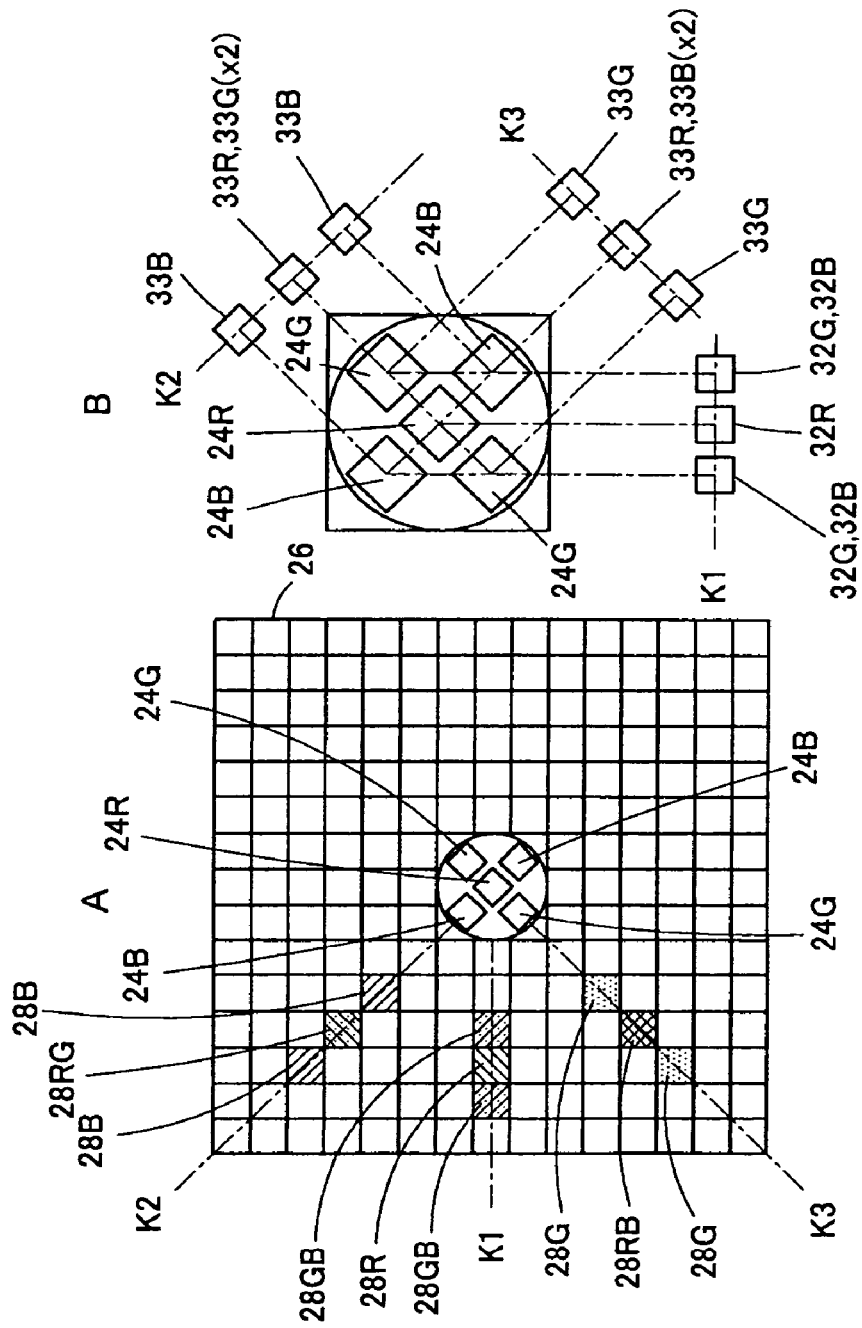
FIG. 21 shows a view illustrating how layout or pitch interval of virtual light emitting devices in each direction are determined when the number of the light emitting devices is 5.
Figure 33:
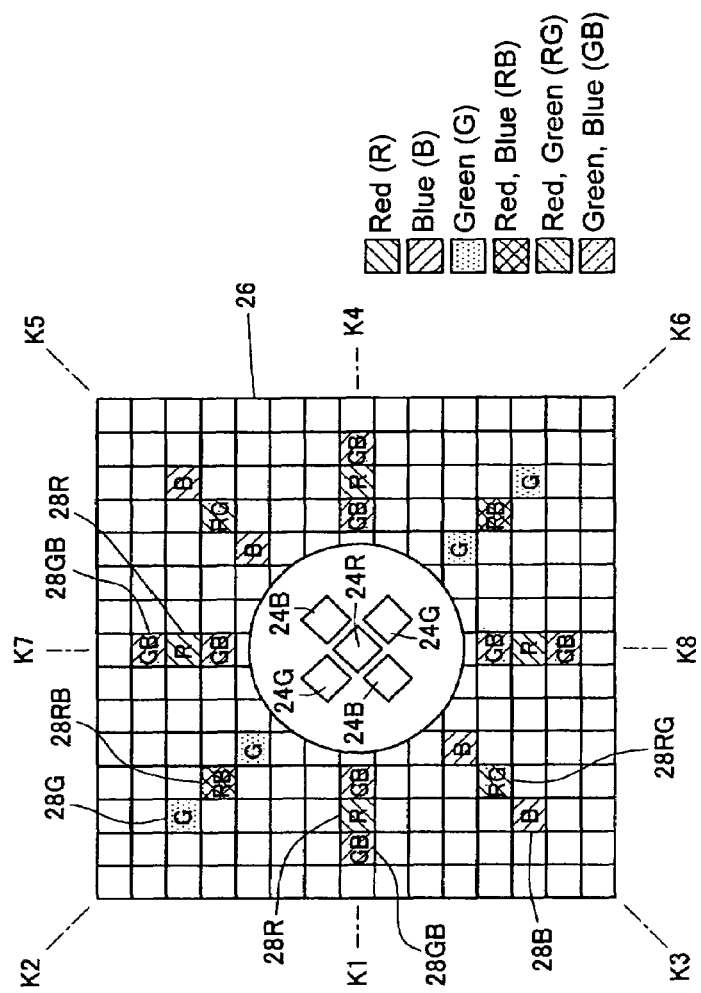
FIG. 33 shows a view illustrating another example of how control colors of reflection areas are determined.

Alternatively, as another example, the luminescent light source such as FIG. 33 in which the red light emitting device 24R is placed in the center, the green light emitting devices 24G are arranged on both sides in one diagonal direction K2 or K6, and the blue light emitting devices 24B are arranged on both sides in other diagonal direction K3 and K5 is considered. This arrangement of the light emitting devices is basically same as that as shown in FIG. 21, and the number of vertical and horizontal arrays in the reflection areas 28R, 28G, 28B is also same, being 15. In this case, also as can be seen from the description on FIG. 21, the control colors in the upper left diagonal direction K2 and in the lower right diagonal directions K6 shall be green (G) and a mixed color of red/blue (RB), the control colors in the lower left diagonal direction K3 and in the upper right diagonal direction K5 shall be blue (B) and a mixed color of red/green (RG), the control colors in the horizontal directions K1, K4 shall be red (R) and a mixed color of green/blue (GB), and the control colors in the vertical directions K7, K8 shall also be red (R) and a mixed color of green/blue (GB).

Thus, in this case, as shown in FIG. 33, in the upper left diagonal direction K2 and the lower right diagonal direction K6, with green (G) and the mixed color of red/blue (RB) are mutually assigned as control colors. In the lower left diagonal direction K3 and the upper right diagonal direction K5, blue (B) and the mixed color of red/green (RG) are mutually assigned as control colors. In the horizontal directions K1, K4, red (R) and the mixed color of green/blue (GB) are mutually assigned as control colors. In addition even in the vertical directions K7, K8, red (R) and the mixed color of green/blue (GB) are mutually assigned as control colors.

Figure 37:
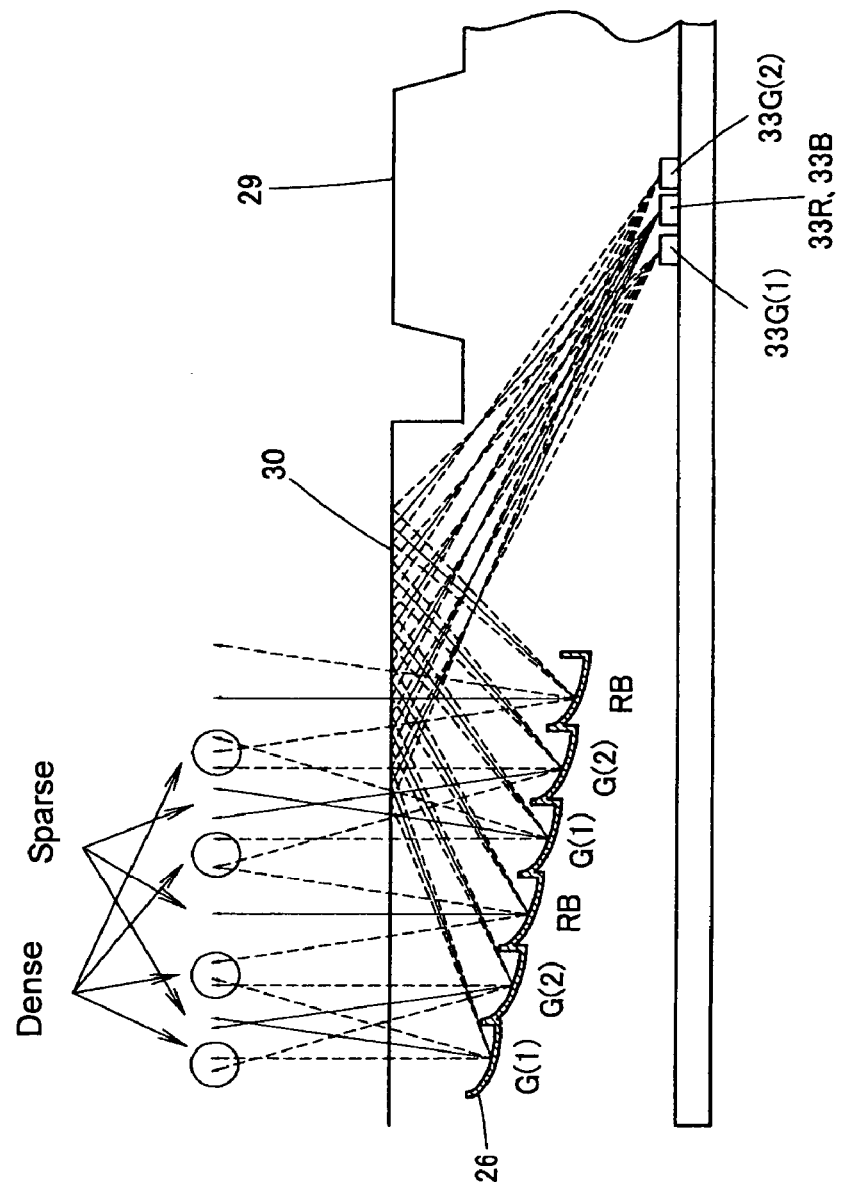
FIG. 37 shows a view illustrating problems resulting from arrangement of the control colors of FIG. 33.

However, also in any of diagonal directions, horizontal directions, or vertical directions, the control colors at both ends of a set of three control colors are same. If this is repeatedly arranged, a same control color will be contiguous in the diagonal direction, horizontal direction and the vertical direction, thus leading to color irregularity. For instance, when the diagonal direction K2 is considered, the two green light emitting devices 33G are discriminated to be the virtual light emitting device 33G (1) and the virtual light emitting device 33G (2). In addition, if control colors by the virtual light emitting devices 33G (1) is made to be G (1) and control colors by the virtual light emitting device 33G (2) is made up to be G (2), the arrangement of the control colors in the diagonal direction K2 will be as shown in FIG. 37. In this case, as seen from the outputted light from the virtual light emitting devices 33G (1), 33R, 33B, and 33G (2) as shown in FIG. 37, the green light partly converges to be dense, while they partly become scarce, thus leading to color irregularity.

Figure 38:
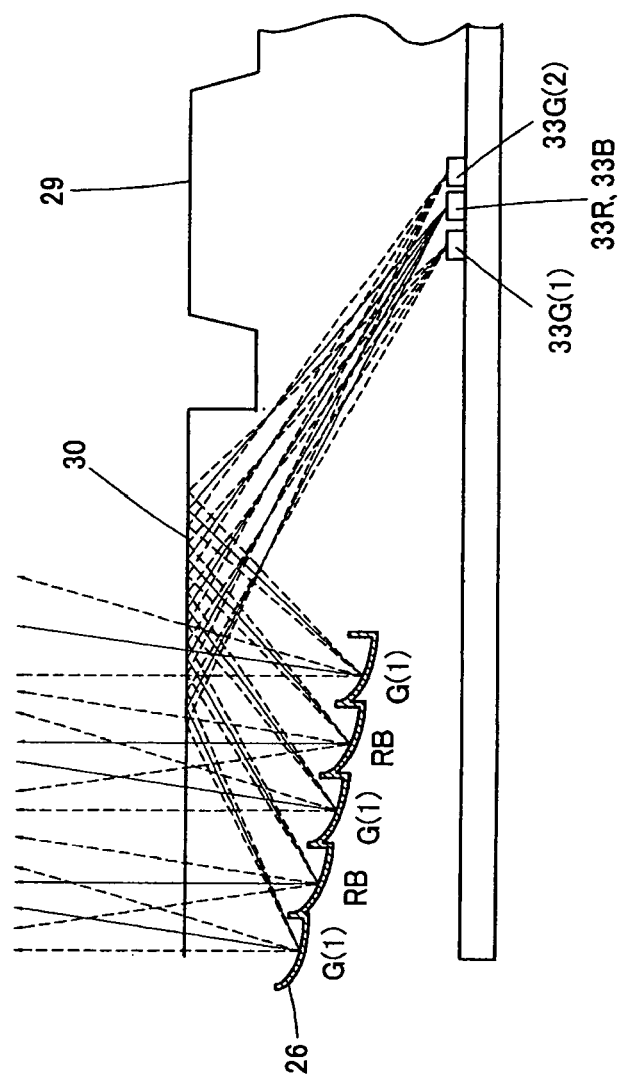
FIG. 38 shows a view illustrating a method of solving the problems as shown in FIG. 37.

Thus, in such a case, as shown in FIG. 38, it would be desirable to have only the light from the virtual light emitting devices (virtual light emitting devices close to the reflection areas) on one side to be outputted to the front face. For instance, in the diagonal direction K2, the control colors by the green virtual light emitting device 33G (1) close to the reflection areas in the diagonal direction K2 and those by the red/blue virtual light emitting devices 33R, 33B are alternately arranged, and the control colors by the virtual light emitting device 33G (2) are not used. With this, as can be seen from the light diagram of FIG. 38, uniform light distribution free from color irregularity can be obtained.

Figure 34:
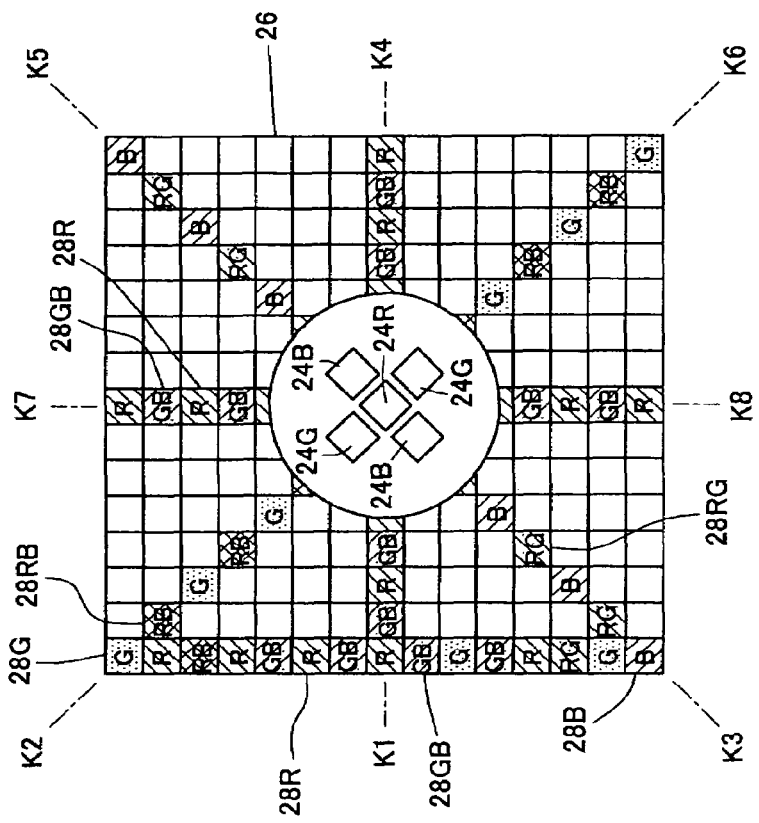
FIG. 34 shows a view illustrating how control colors of reflection areas are determined, following steps in FIG. 33.

Thus, after the control colors are determined in respective directions, only overlapping control colors by the virtual light emitting devices close to the reflection areas are considered so that a same control color will not be contiguous. Thus, as shown in FIG. 34, in the upper left and lower right diagonal directions K2, K6, green control color (G) and red/blue control color (RB) are alternately arranged, and in the lower left and upper right diagonal directions K3, K5, green control color (B) and red/green control color (RG) are alternately arranged. In addition, in the horizontal directions K1, K4 and the vertical directions K7, K8, red control color (R) and green/blue control color (GB) are alternately arranged. However, the control color G in the diagonal direction K2 is by the virtual light emitting device 33G (24G) located in the left top, and the control color G in the diagonal direction K6 is by the virtual light emitting device 33G (24G) located in the right bottom. This applies to the other direction as well.

If the respective control colors in the diagonal direction, horizontal direction and vertical direction are thus determined, as shown in FIG. 34, control colors along at least one side located in the periphery of the reflecting mirror 26 are determined. When the control colors are determined, a control color of each reflection area is determined in trial and error manner by assigning six types of the control colors, so that a same control color will not be contiguous on left, right, top and bottom.

Figure 35:
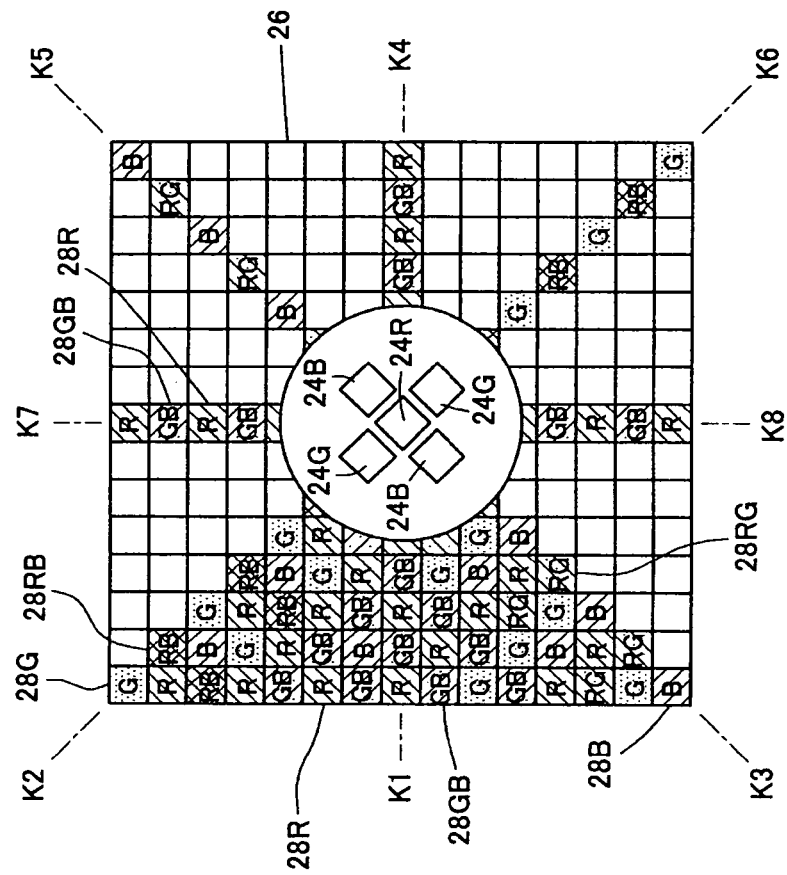
FIG. 35 shows a view illustrating how control colors of reflection areas are determined, following steps in FIG. 34.
Figure 36:
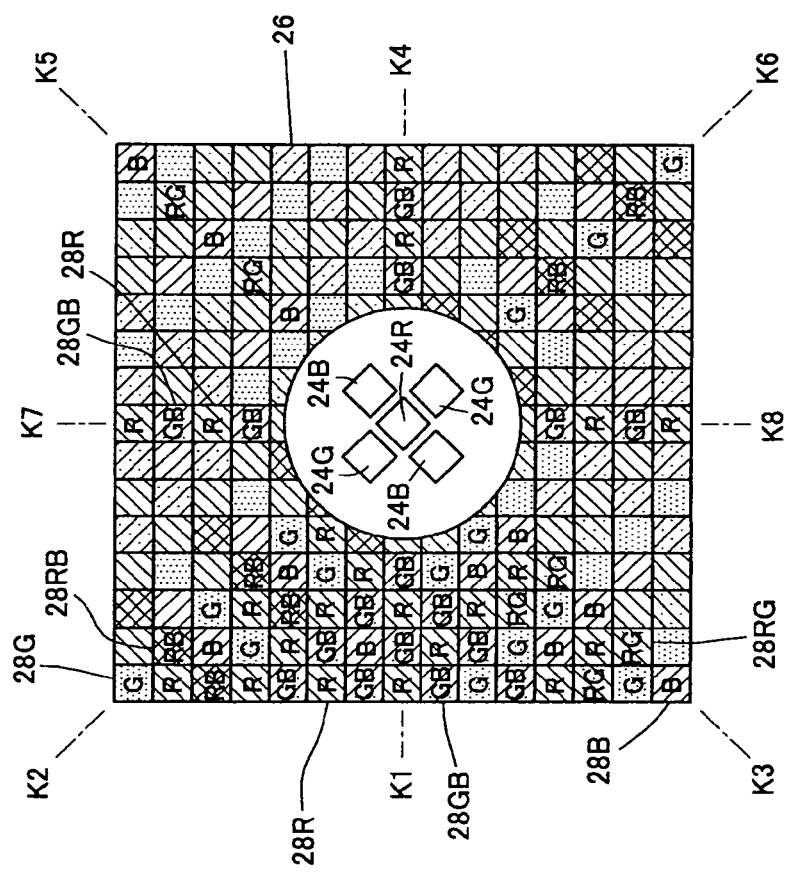
FIG. 36 shows a view illustrating how control colors of reflection areas are determined, following steps in FIG. 35.

Furthermore, control colors are assigned to blank reflection areas in the area (e.g., the area between the diagonal directions K2 and K3) for which peripheral control colors are determined, so that a same control color will not be contiguous on left, right, top and bottom, and as shown in FIG. 35, control colors in about ¼ area, for instance, are determined. Then, the control colors that have been already determined are transferred to the remaining areas so that they will be symmetric about a line, and as shown in FIG. 36, the control colors are assigned to the whole.

When the control colors of the respective reflection areas are thus determined, as with the case of the three light emitting devices, the conic coefficient CC or curvature CV, etc. may be determined so that uniform light will be outputted to the front face direction.

Figure 39:
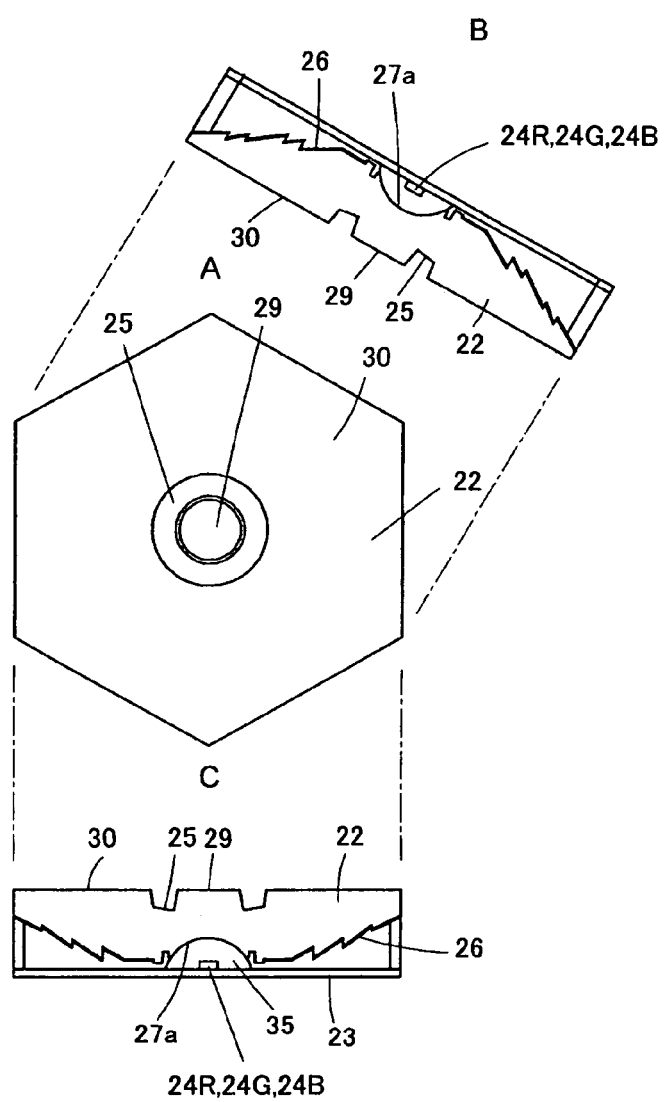
FIG. 39A shows a front elevation of the luminescent light source according to variant 3 of the present invention, B shows a cross sectional view of the luminescent light source in the diagonal direction, and C shows a cross sectional view of the luminescent light source in the opposite side direction.
Figure 40:
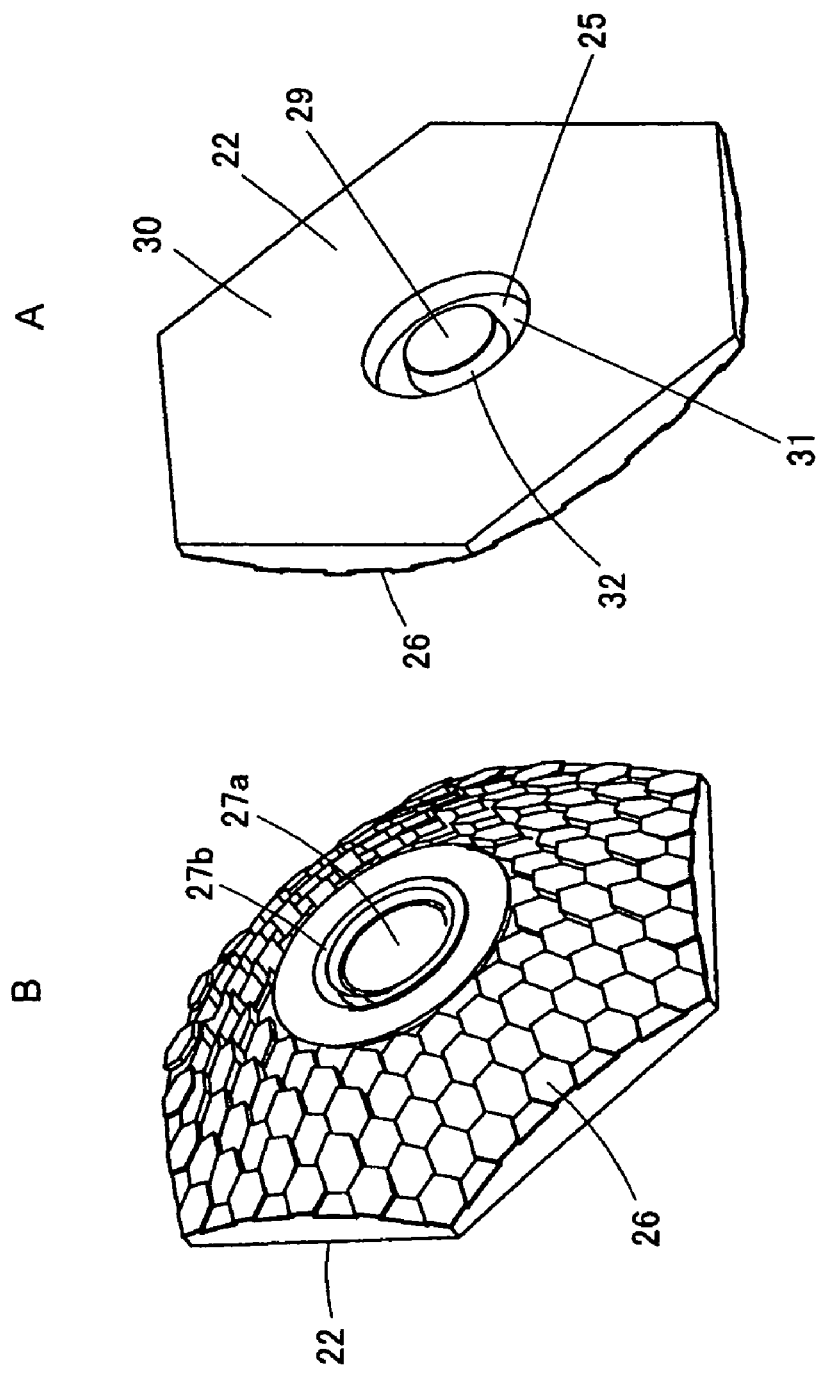
FIG. 40A shows a perspective view from the front face of the mold unit and the reflecting right used in the variant 3.
FIG. 40B shows a back side view thereof.
Figure 41:
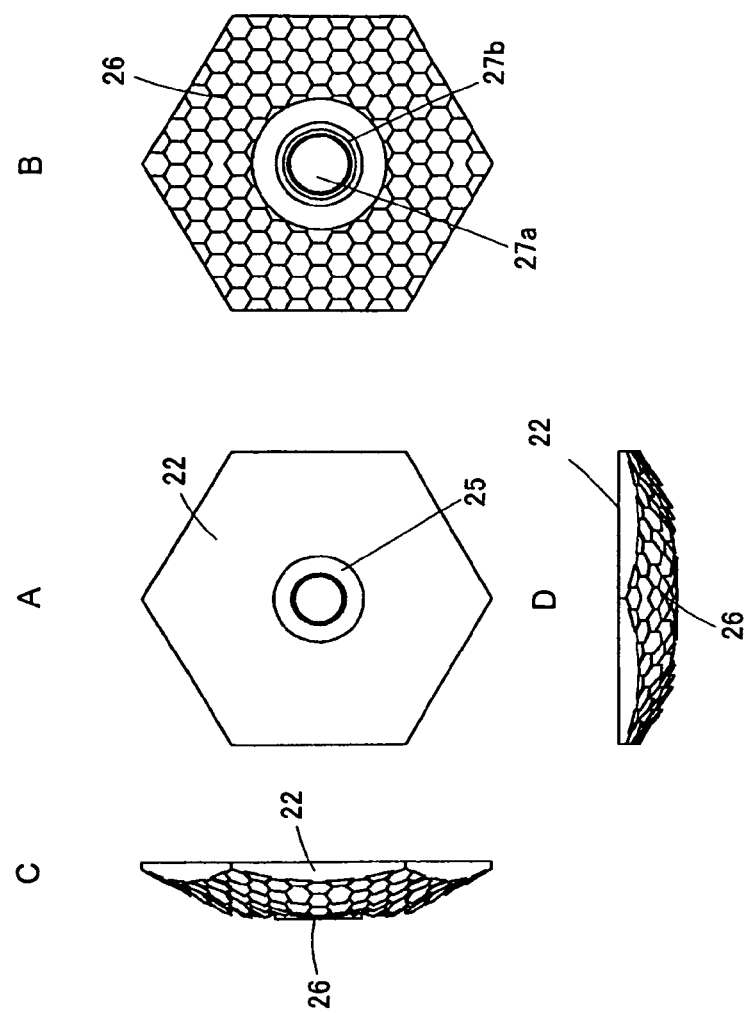
FIG. 41A shows a front elevation of the mold unit and the reflecting mirror used in the variant 3, B shows a back side view thereof, C shows a right side view thereof, and D shows a bottom view thereof.
Figure 42:
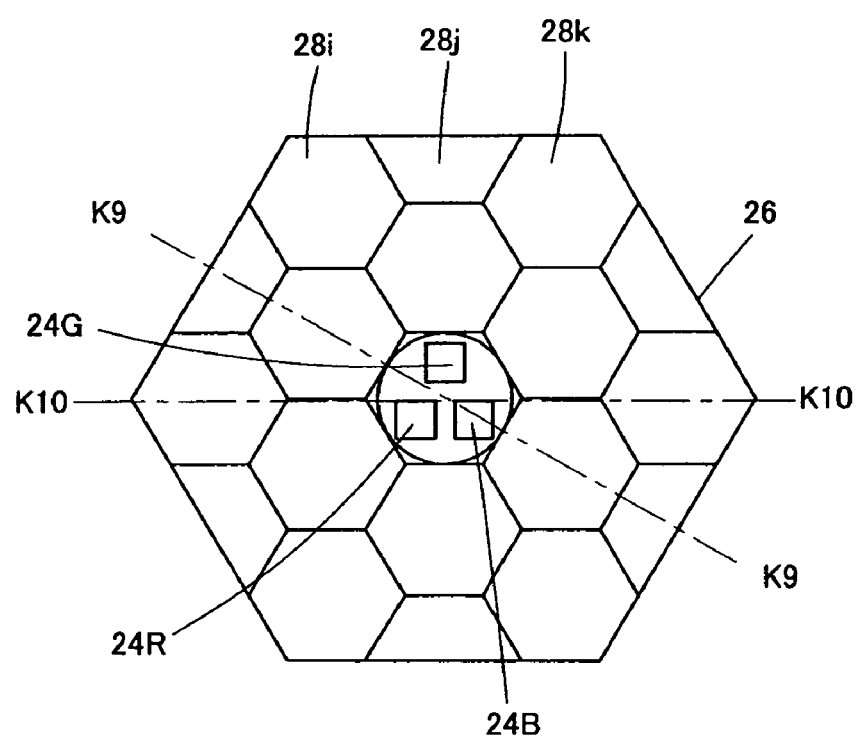
FIG. 42 shows a schematic front elevation of the structure of the reflecting mirror in the variant 3.

In the above embodiment, although the square reflecting mirror 26 has been divided into a plurality of square reflection areas 28i, 28j, 28k, . . . , various forms other than this are also possible. Those as shown in FIG. 39 to FIG. 42 are variant 3 of the luminescent light source 21, wherein the reflecting mirror 26 being hexagonal when viewed from the front is divided into the reflection areas 28i, 28j, 28k, . . . also having a same hexagonal shape as the contour thereof. FIG. 39A is a front elevation of the luminescent light source in the variant 3, and FIG. 39B, C are a cross sectional view of the luminescent light source in the diagonal direction and a cross sectional view in the opposite side direction, respectively. FIG. 40A, B are a perspective view viewed from the front of the mold unit 22 having the reflecting mirror 26 on the back side and a perspective view viewed from the rear, respectively. In addition, FIG. 41A is a front elevation of the mold unit, FIG. 41B is a back side view thereof, FIG. 41C is a right side view thereof, and FIG. 41D is a bottom view thereof. In addition, FIG. 42 is a schematic front elevation of the reflecting mirror 26 used in the luminescent light source. The luminescent light source 21 is formed like a hexagon when viewed from the front, and its reflecting mirror 26 is also formed like a hexagon. Then, the hexagonal reflecting mirror 26 is divided into a plurality of hexagonal reflection areas 28i, 28j, 28k, . . . without a space therebetween.

In the case of the reflection areas 28i, 28j, 28k, . . . shaped like the variant 3, while the reflection areas are contiguous in the opposite side direction K9-K9 as shown in FIG. 42, the reflection areas in the opposite side direction K10-K10 as shown in FIG. 42 are discrete (partly, passing through the boundary between the reflection areas). In such a case, first, respective curve constants such as the curvature CV or the conic coefficient CC, are first designed for the reflection areas arranged along the opposite side direction, and then, the curve constants may be sequentially determined for adjacent reflection areas being adjacent to the reflection areas. In addition, reflection areas located at the edge of the reflecting mirror 26 are partly notched trapezoids, the effective area thereof is reduced. In the reflection areas of such void-edged trapezoids, first designing takes place on the assumption that reflection shape of the edge is hexagonal, and then a value greater than the conic coefficient determined as a hexagon may be assigned to the reflection area of void hexagons. If the contour of the reflecting mirror 26 is same as the shape of each reflection area 28i, 28j, 28k, . . . designing can take place as described above, thus facilitating adjustment of the curve constants such as the curvature CV or conic coefficient CC.

Figure 43:
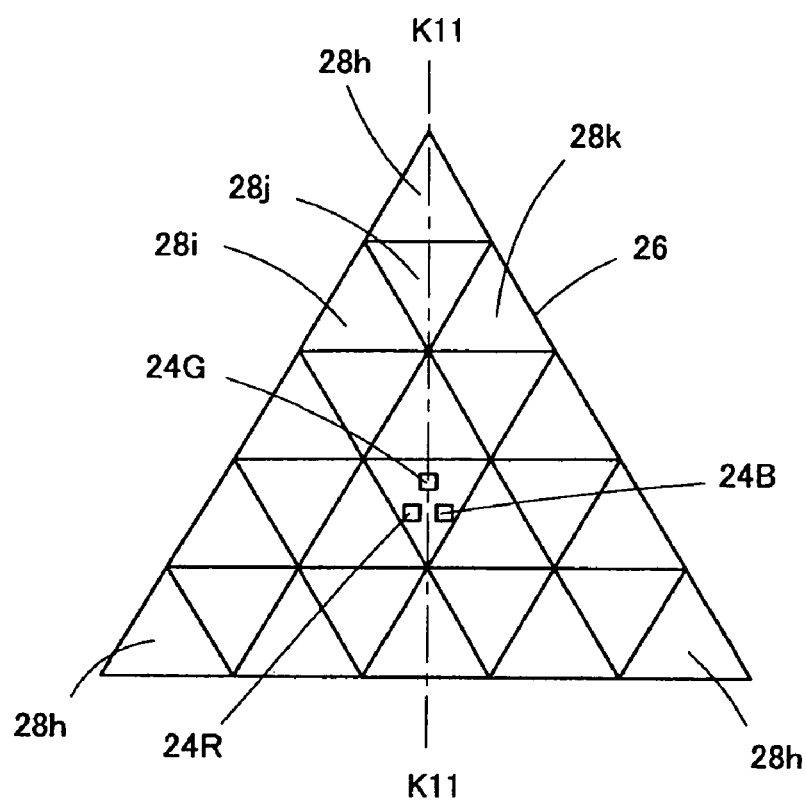
FIG. 43 shows a front elevation of the structure of the reflecting mirror in the variant 4 of the present invention.

FIG. 43 is a front elevation showing the structure of the reflecting mirror 26 in the variant 4. In the reflecting mirror 26, the triangle-shaped reflecting mirror 26 is divided into a plurality of triangular reflection areas 28i, 28j, 28k, . . . . In this case, when the reflection area on the line segment K11-K11 connecting the vertex with the center of the side as shown in FIG. 43 is considered, the outermost reflection areas (the reflection area positioned at the vertex and that position at the center of the side) have a different distance from the center. Thus, in the variant, rather than designing the reflection areas on the line segment K11-K11 sequentially, designing may start with the reflection area 28h located on the vertex. In other words, first, the conic coefficient, etc. is designed for the reflection areas 28*h* positioned at the three vertices, then, if with the reflection areas 28*h* positioned at the vertices a starting point, adjacent reflection areas are sequentially designed inward, and the curve constants such as the curvature CV or conic coefficient CC can be easily adjusted.

Figure 44:
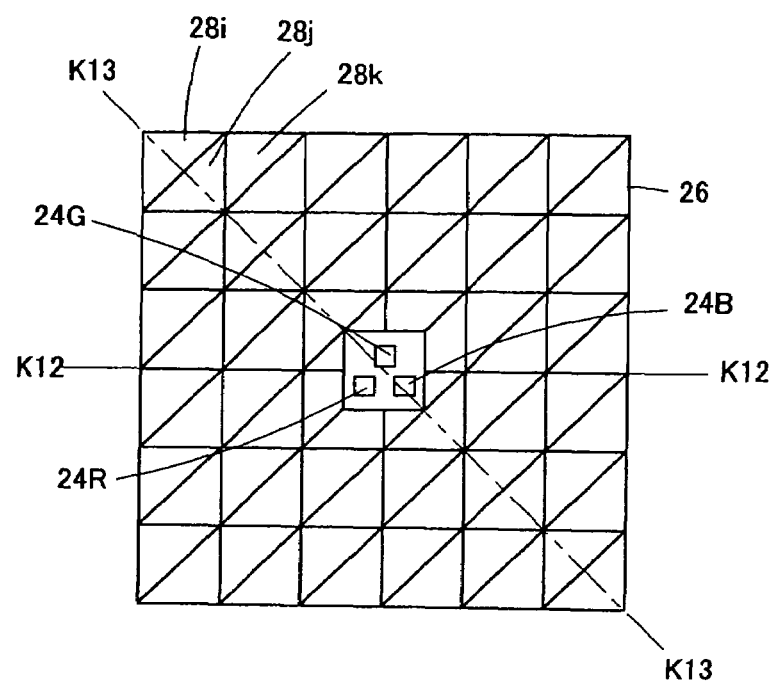
FIG. 44 shows a front elevation of the structure of the reflecting mirror in the variant 5 of the present invention.
Figure 45:
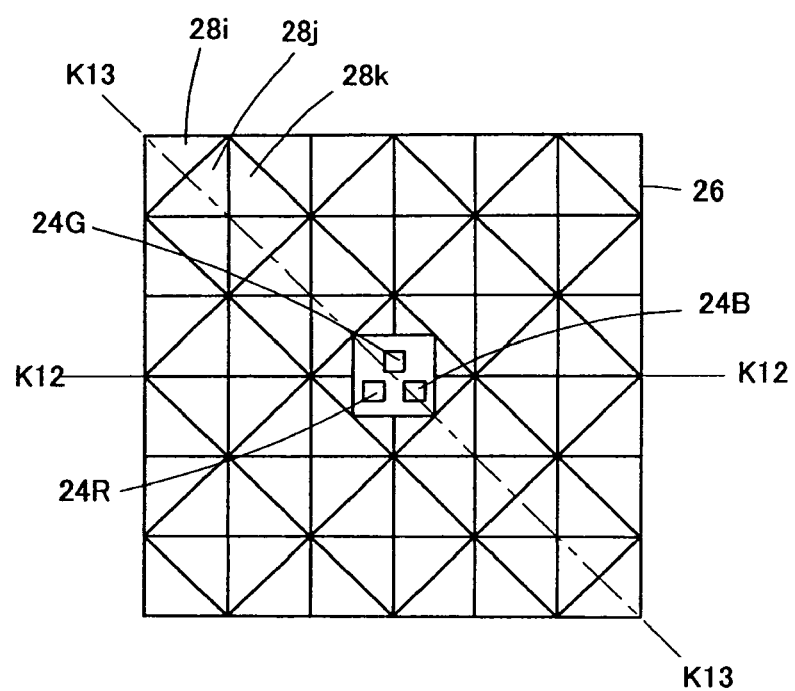
FIG. 45 shows a front elevation of the structure of the reflecting mirror in the variant 6 of the present invention.
Figure 46:
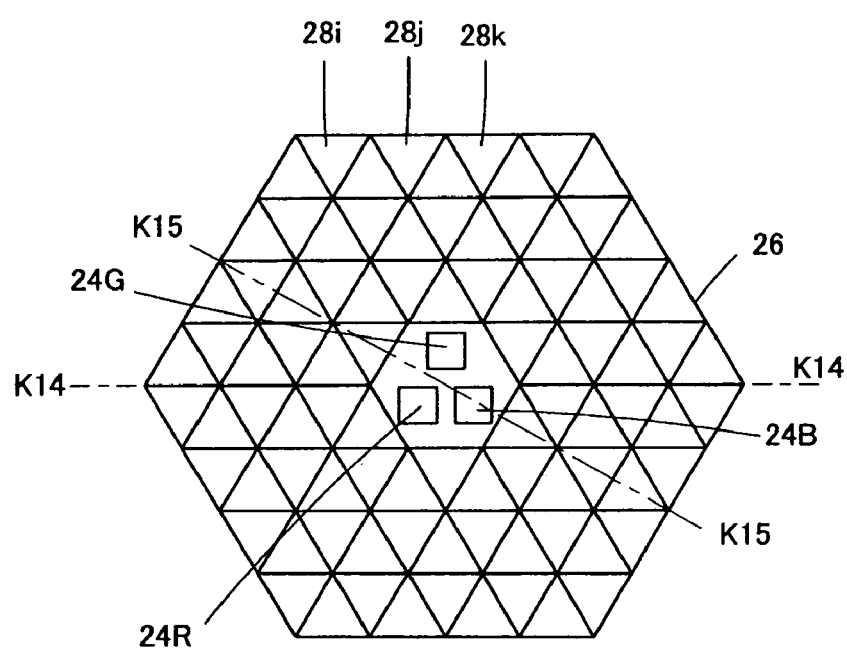
FIG. 46 shows a front elevation of the structure of the reflecting mirror in the variant 7 of the present invention.

In addition, FIG. 44, FIG. 45, and FIG. 46 shows variants in which the reflecting mirror 26 is divided into the reflection areas 28*i*, 28*j*, 28*k*, . . . whose shape is different from the contour of the reflecting mirror. In the variant 5 as shown in FIG. 44 and the variant 6 as shown in FIG. 45, the rectangular shaped reflecting mirror 26 is divided into a plurality of triangular reflecting areas 28*i*, 28*j*, 28*k*, . . . , and in the variant 7 as shown in FIG. 46, the hexagonal reflecting mirror 26 is divided into a plurality of triangular reflecting areas 28*i*, 28*j*, 28*k*, . . . . According to these variants 5 to 7, the reflection areas 28*i*, 28*j*, 28*k*, . . . can be subdivided. At the same time, since directions of the reflection areas are disparate to light to be radially outputted from the reflection areas 28*i*, 28*j*, 28*k*, . . . , it becomes difficult to design each reflection area. Thus, in these variants, it would be desirable if designing could take place as described below.

In the variants 5 and 6 as shown in FIG. 45 and FIG. 46 in which the square reflecting mirror 26 is divided into triangular reflection areas, the opposite side direction K12-K12 is a boundary among the reflection areas, however, the reflection areas are arranged continuously in the diagonal direction K13-K13. Thus, in this case, for the reflection areas arranged in the diagonal direction K12-K12, the curve constants such as the conic coefficient, etc. are first designed, and then the reflection areas adjacent to the reflection area may be sequentially designed.

Also, in the variant 7 in which the hexagonal reflecting mirror 26 is divided into triangular reflection areas 28*i*, 28*j*, 28*k*, . . . , the diagonal direction K14-K14 is a boundary among the reflection areas, however, the reflection areas are arranged continuously in the opposite side direction K15-K15. Thus, in this case, for the reflection areas arranged in the opposite side direction K15-K15, the curve constants such as the conic coefficient, etc. are first designed, and then the reflection areas adjacent to the reflection area may be sequentially designed.

Figure 47:
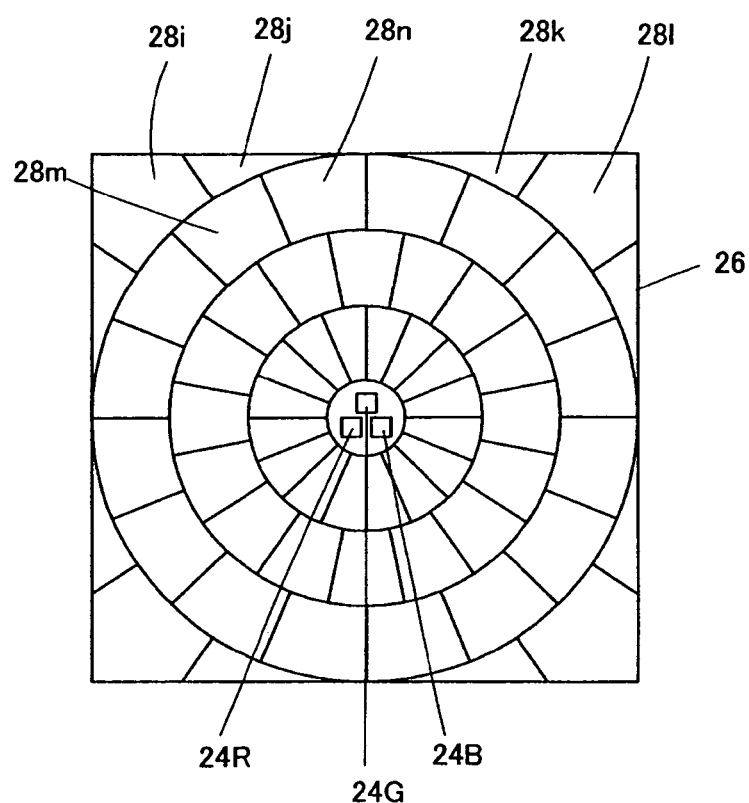
FIG. 47 shows a front elevation of the structure of the reflecting mirror in the variant 8 of the present invention.
Figure 48:
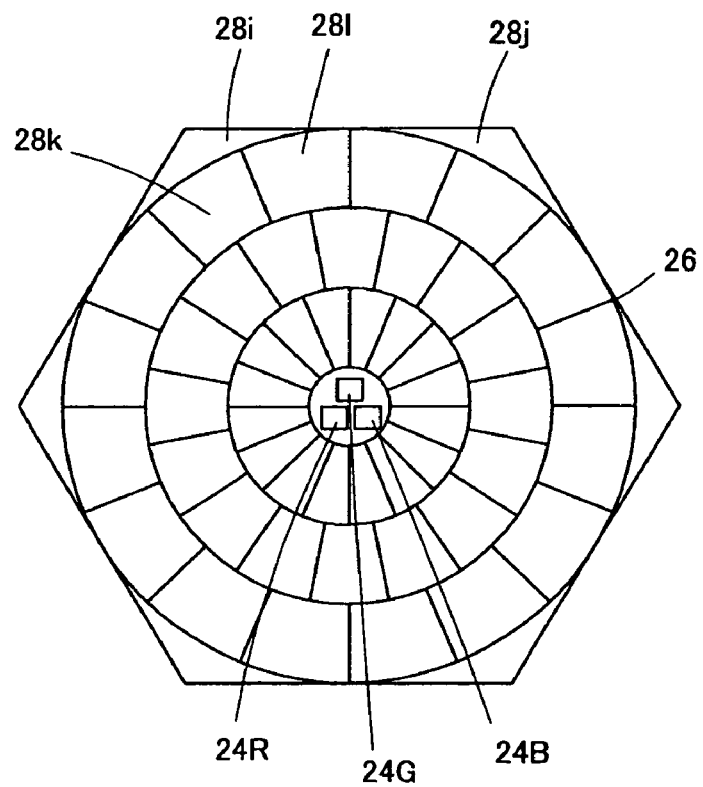
FIG. 48 shows a front elevation of the structure of the reflecting mirror in the variant 9 of the present invention.
Figure 49:
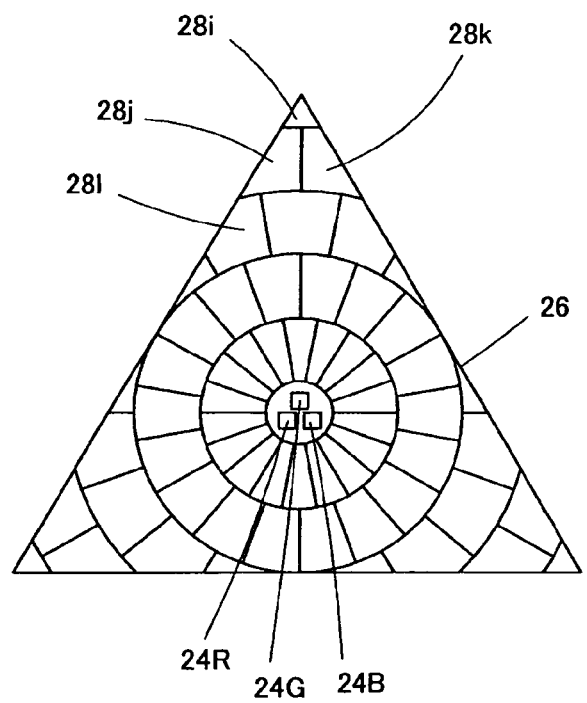
FIG. 49 shows a front elevation of the structure of the reflecting mirror in the variant 10 of the present invention.
Figure 50:
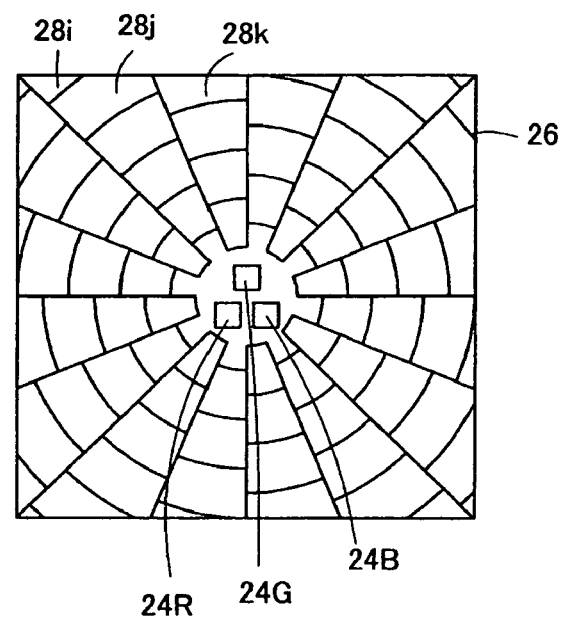
FIG. 50 shows a front elevation of the structure of the reflecting mirror in the variant 11 of the present invention.

In addition, in FIG. 47 to FIG. 49 are variants, wherein with the light emitting devices 24R, 24G, 24B as a center, the reflecting mirror 26 is divided into concentric ring zones, and the ring zone shaped areas are further divided circumferentially. In fact, in the reflecting mirror 26 of the variant 8 as shown in FIG. 47, the square reflecting mirror 26 is divided into ring zones and radially, comprising the plurality of reflection areas 28*i*, 28*j*, 28*k*, . . . . In the reflecting mirror 26 of the variant 9 in FIG. 48, the hexagonal reflecting mirror 26 is concentrically and radially divided, comprising the plurality of reflection areas 28*i*, 28*j*, 28*k*, . . . . In the reflecting mirror 26 of the variant 10 as shown in FIG. 49, the triangular reflecting mirror 26 is divided concentrically and radially, comprising the plurality of the reflecting areas 28*i*, 28*j*, 28*k*, . . . . In addition, like the variant 11 as shown in FIG. 50, the reflection areas of each bearing may be offset radially.

In these variants 8 to 11, as size of the reflection areas closer to the central area is smaller, manufacturing of the reflection areas near the central area is difficult. Thus, in the outer ring zone shaped area, the number of divisions may be increased, and that in the reflection areas near the central area may be reduced. In these variants, it is possible to assume same radial arrangement at each bearing to light to be radially outputted from the light emitting devices 24R, 24G, 24B, thus facilitating designing of the reflecting mirror 26 or adjustment of the curve constants.

Figure 51:
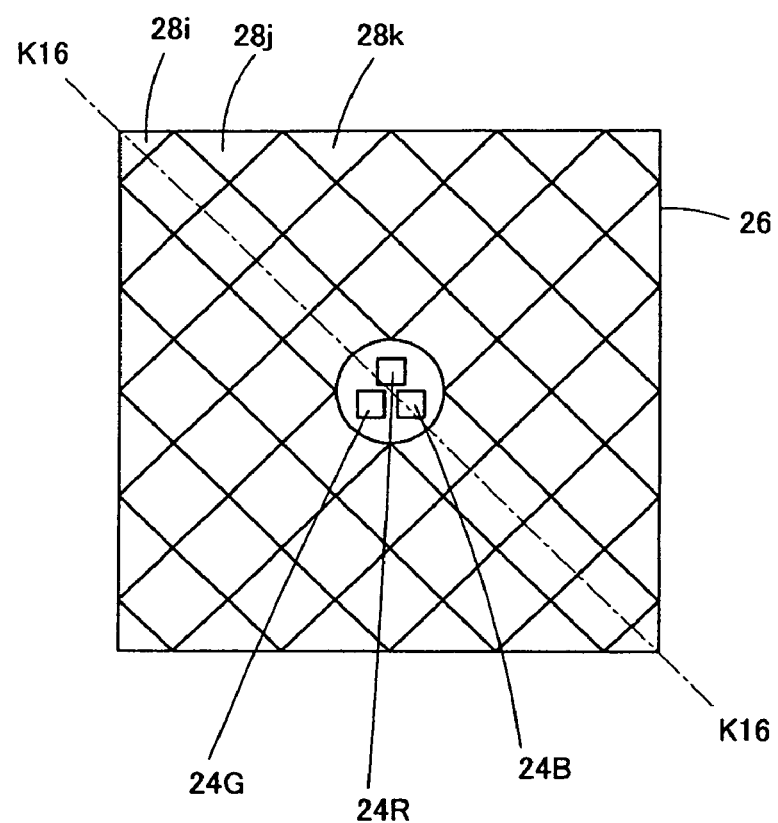
FIG. 51 shows a front elevation of the structure of the reflecting mirror in the variant 12 of the present invention.
Figure 52:
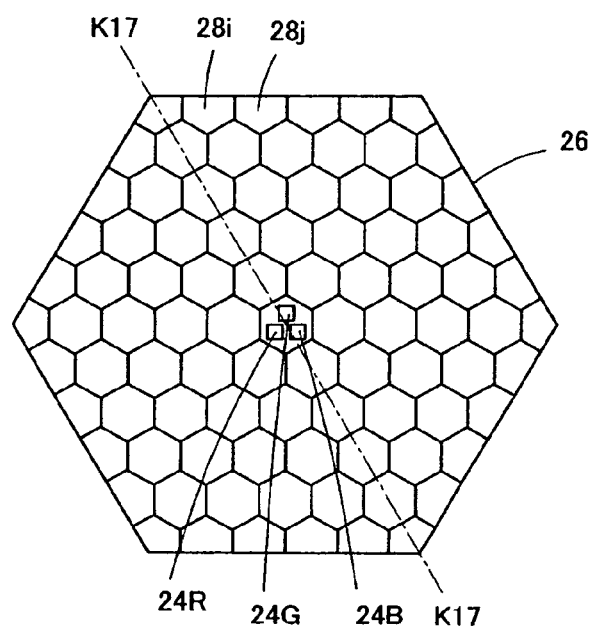
FIG. 52 shows a front elevation of the structure of the reflecting mirror in the variant 13 of the present invention.

In addition, FIG. 52 is the variant in which the reflection areas 28*i*, 28*j*, 28*k*, . . . , having the same shape as the contour of the reflecting mirror 26 are rotated, and the reflecting mirror 26 is divided by the reflection areas 28*i*, 28*j*, 28*k* . . . . In the variant 12 as shown in FIG. 51, the square reflecting mirror 26 is divided by the square reflection areas 28*i*, 28*j*, 28*k*, . . . , that are rotated by 45° (i.e., rhombus). In the variant 13 as shown in FIG. 52, the hexagonal reflecting mirror 26 is divided by hexagonal reflection areas 28*i*, 28*j*, 28*k* . . . , that are rotated by 30° or 90°. In these variants 12, 13, the reflection areas are continuous in the diagonal direction in which light amounts tend to be short, thus facilitating designing of the reflection areas. However, since many partially void shaped reflection areas tend to take place in the periphery, light loss is easy to occur. In these variants, as the reflection areas are continuous in the diagonal direction, the reflection areas arranged along the diagonal direction can be easily designed. Then, by sequentially designing the reflection areas from those adjacent to the reflection areas in the diagonal direction, designing of the reflecting mirror 26 or adjustment of the curve constants can be easily done.

Figure 53:
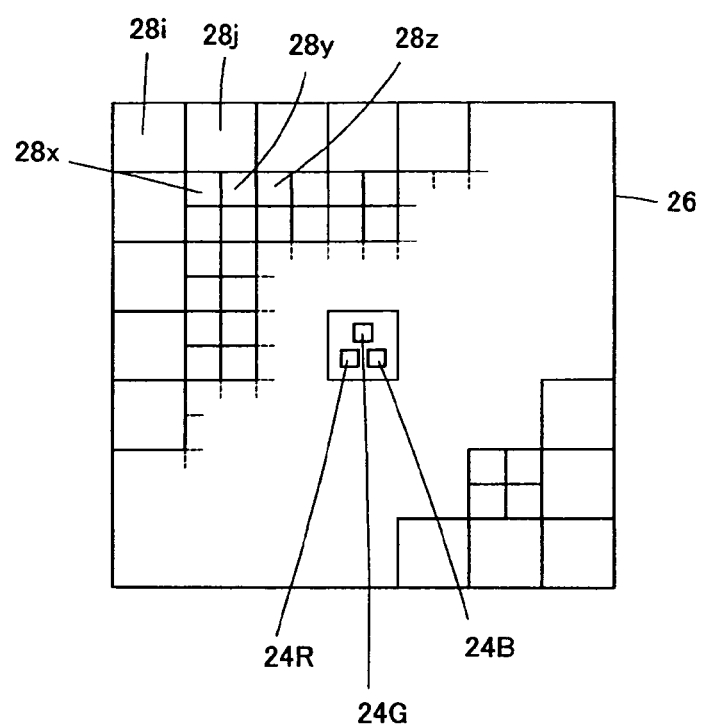
FIG. 53 shows a front elevation of the structure of the reflecting mirror in the variant 14 of the present invention.
Figure 54:
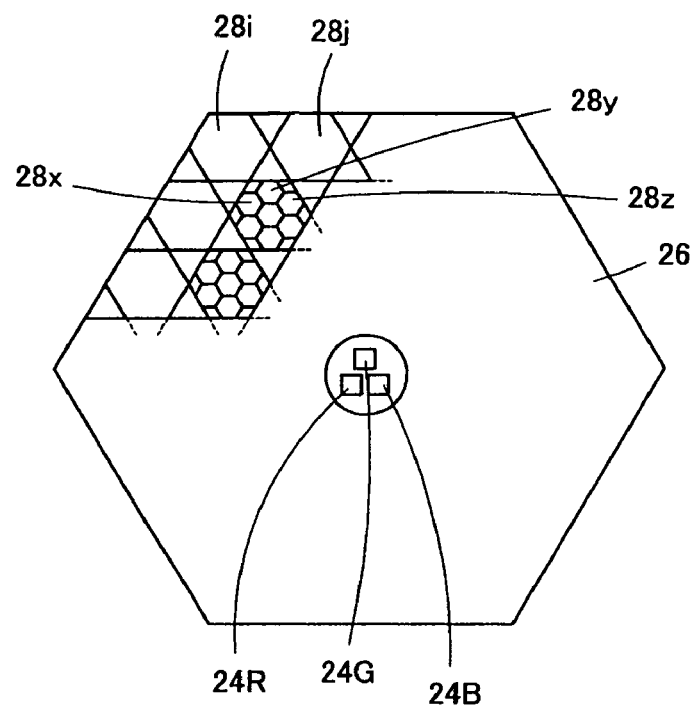
FIG. 54 shows a front elevation of the structure of the reflecting mirror in the variant 15 of the present invention.
Figure 55:
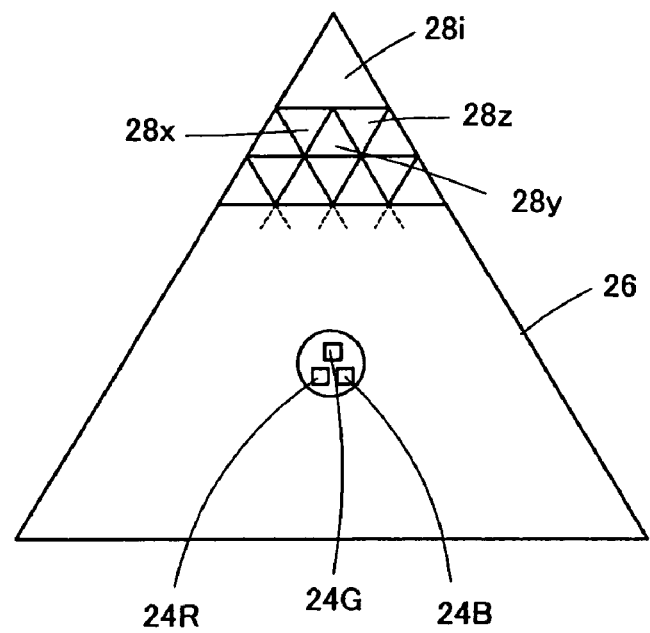
FIG. 55 shows a front elevation of the structure of the reflecting mirror in the variant 16 of the present invention.

FIG. 53 to FIG. 55 are variants in which the reflection areas 28*i*, 28*j*, 28*k*, . . . 28*x*, 28*y*, 28*z*, . . . having a different shape or size depending on a distance from the light emitting devices 24R, 24G, 24B are arranged. In fact, in the variant 14 as shown in FIG. 53, the square reflection areas 28*i*, 28*j*, 28*k*, . . . 28*x*, 28*y*, 28*z*, . . . are formed in the square reflecting mirror 26, and the greater the size of the reflection area is, the farther it is from the center. When an attempt to design such the reflecting mirror is made, the whole reflecting mirror 26 is divided in the largest reflection area, then, the reflection areas are sequentially divided vertically and horizontally by 1 division (i.e., no division), 2 divisions, 3 divisions, . . . starting with the outermost reflection area.

In addition, in the variant 15 as shown in FIG. 54, the hexagonal reflection areas 28*i*, 28*j*, 28*k*, . . . 28*x*, 28*y*, 28*z*, . . . are formed in the hexagonal reflecting mirror 26, and the farther it is from the center, the greater the size of the reflection area 28*i*, 28*j*, 28*k*, . . . 28*x*, 28*y*, 28*z*, . . . is. Also in this case, first, the whole hexagonal reflecting mirror 26 is equally divided in the hexagonal reflection area having the largest size, and then, the reflection area having the largest size may be subdivided.

In the variant 16 as shown in FIG. 55, the triangular reflection areas 28*i*, 28*j*, 28*k*, . . . 28*x*, 28*y*, 28*z*, . . . are formed in the triangular reflecting mirror 26, and the farther it is from the center, the greater the size of the reflection area 28*i*, 28*j*, 28*k*, . . . 28*x*, 28*y*, 28*z*, . . . is. According to the variant, the degree of freedom in designing increases and optical intensity or color uniformity improves. Also in this case, first, the whole triangular reflecting mirror 26 is equally divided in the triangular reflection area having the largest size, then the reflection area having the large size may be subdivided.

In the variants 14 to 16 as shown in FIG. 53 to FIG. 55, the reflecting mirror 26 can be first divided into the reflection areas having same size, each curve constant can be designed, then each reflection area can be further divided, and the curved shape of the divided reflection areas can be fine adjusted, thus facilitating designing of the reflecting mirror 26. In addition, in such the variants, as amount of light to be outputted from the light emitting devices 24R, 24G, 24B is great, the degree of freedom in designing increases, and uniformity of optical intensity improves. However, on the one hand, luminescent area near the central area is small, manufacturing of the luminescent area near the central area is difficult.

Figure 56:
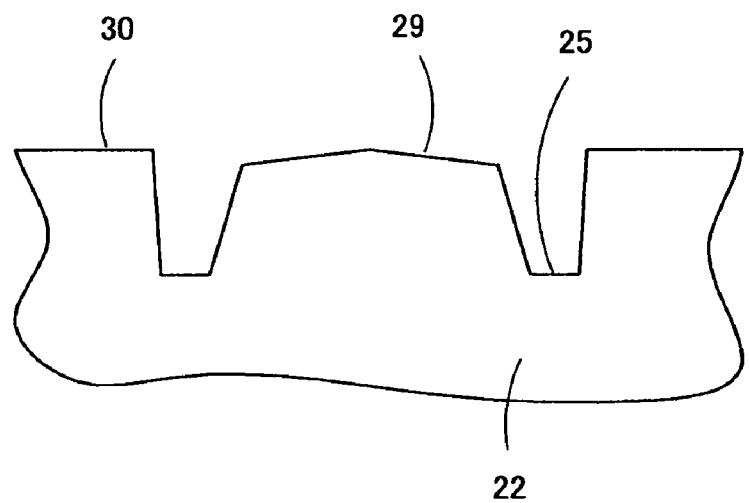
FIG. 56 shows a partial cross sectional view of a shape of the cross section of the direct output area in the variant 17 of the present invention.

In addition, various design changes may be added to a shape of the mold unit 22. For instance, in the variant 17 as shown in FIG. 56, the direct output area 29 is formed as a conical curve, a truncated cone shaped curve, spherical curve, etc. With the direct output area 29 formed as such the curved surface, the reflection direction of light being totally reflected by the in total reflection area 32 and entering the direct output area 29 can be adjusted by the tilt angle or curvature, etc., thus improving the degree of freedom in designing the reflecting mirror 26.

Figure 57:
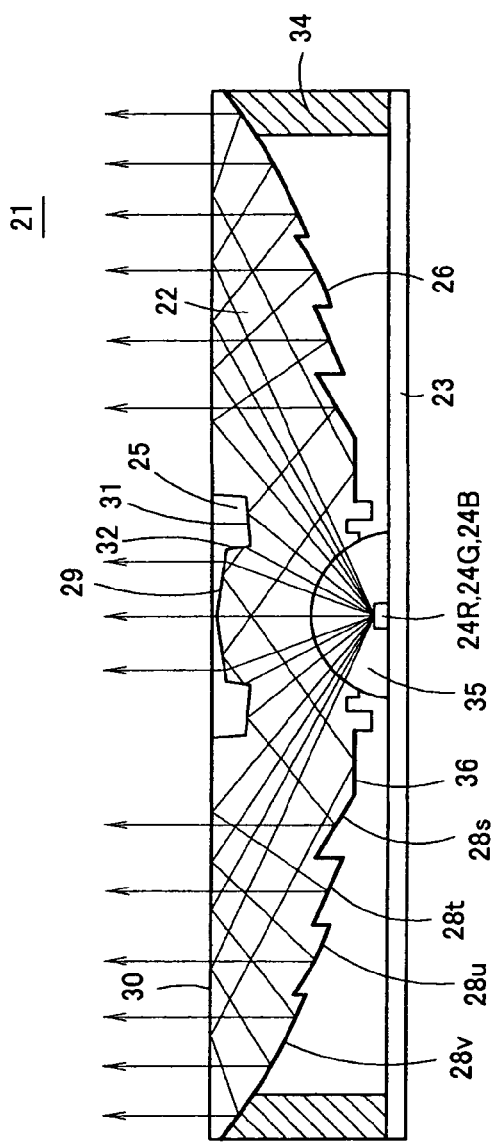
FIG. 57 shows a cross sectional view of optical behavior of light in the luminescent light source in the variant 17 of the present invention.

FIG. 57 shows a cross sectional view in the diagonal direction for describing behavior of light in the variant 17 in which the direct output area 29 is formed conically. If the direct output area 29 is thus formed conically and the direct output area 29 is caused to have an appropriate tile angle, as shown in FIG. 57, light to be outputted from the direct output area 29 can be oriented substantially parallel to each other.

Figure 58:
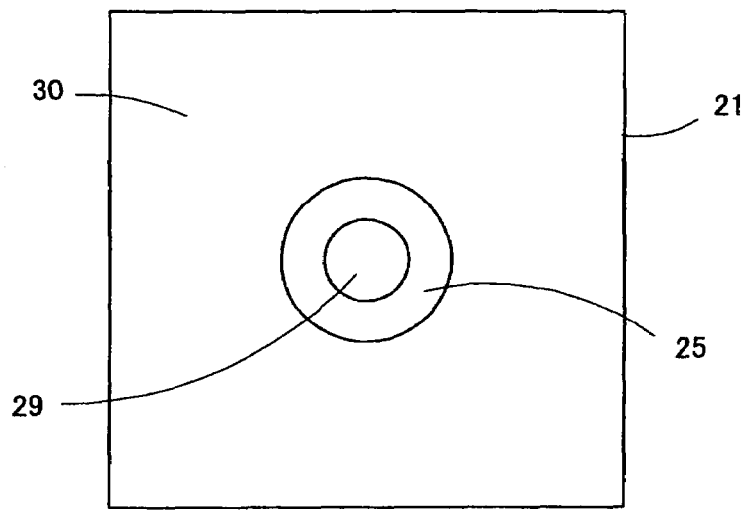
FIG. 58 shows a front elevation of the luminescent light source of the variant 18 of the present invention.
Figure 59:
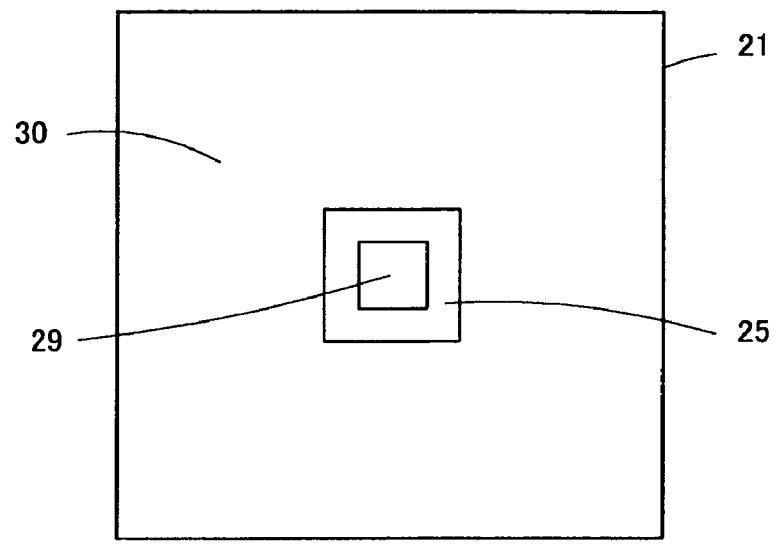
FIG. 59 shows a front elevation of the luminescent light source of the variant 19 of the present invention.
Figure 60:
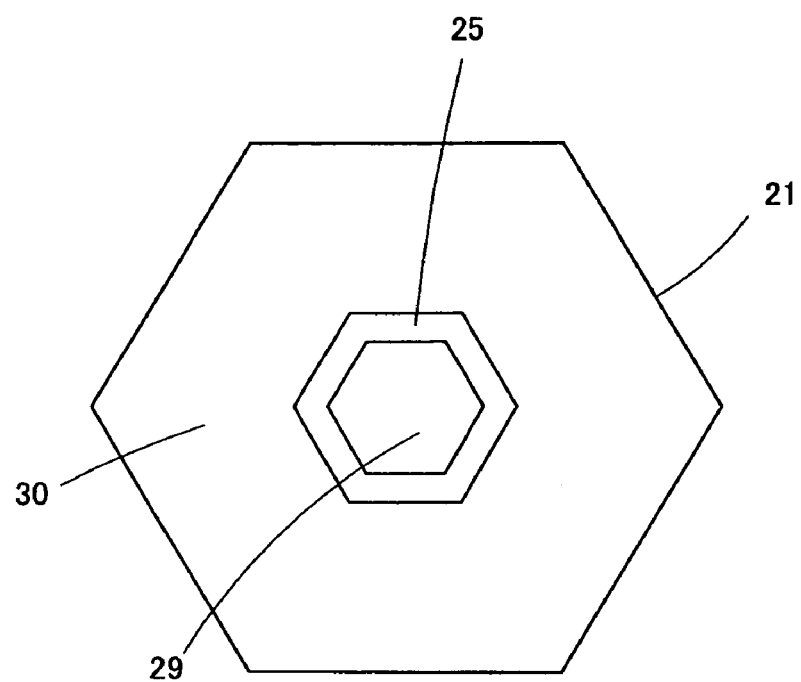
FIG. 60 shows a front elevation of the luminescent light source of the variant 20 of the present invention.
Figure 61:
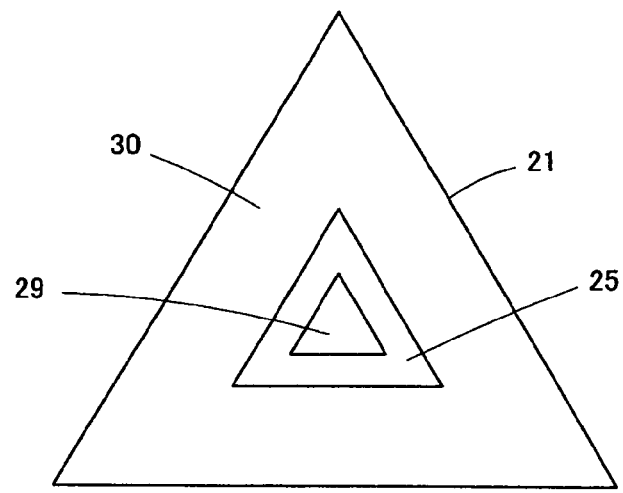
FIG. 61 shows a front elevation of the luminescent light source of the variant 21 of the present invention.

Various design changes may also e added to the front shape of the mold unit 22 or the channel 25. For instance, in the variant 18 as shown in FIG. 58, the toric channel 25 and the circular direct output area 29 are formed in the luminescent light source 21 the contour of which is square. In addition, in the variant 19 as shown in FIG. 59, the square annular channel 25 and the square direct output area 29 are formed in the luminescent light source the contour of which is square. In the variant 20 as shown in FIG. 60, the hexagonal channel and the hexagonal direct output area 29 are formed in the luminescent light source the contour of which is hexagonal. In the variant 21 as shown in FIG. 61, the triangular channel 25 and the triangular direct output area 29 are formed in the triangular light source.

In the variant 18 as shown in FIG. 58, as the direct output area 29 can be designed in accordance with beam to be radially outputted from the luminescent light source 21 positioned in the central area, the direct output area 29 can be designed easily. In addition, in the variants 19 to 21 as shown in FIG. 59 to FIG. 61, the degree of freedom in designing increases and optical intensity or color uniformity improves.

Figure 62:
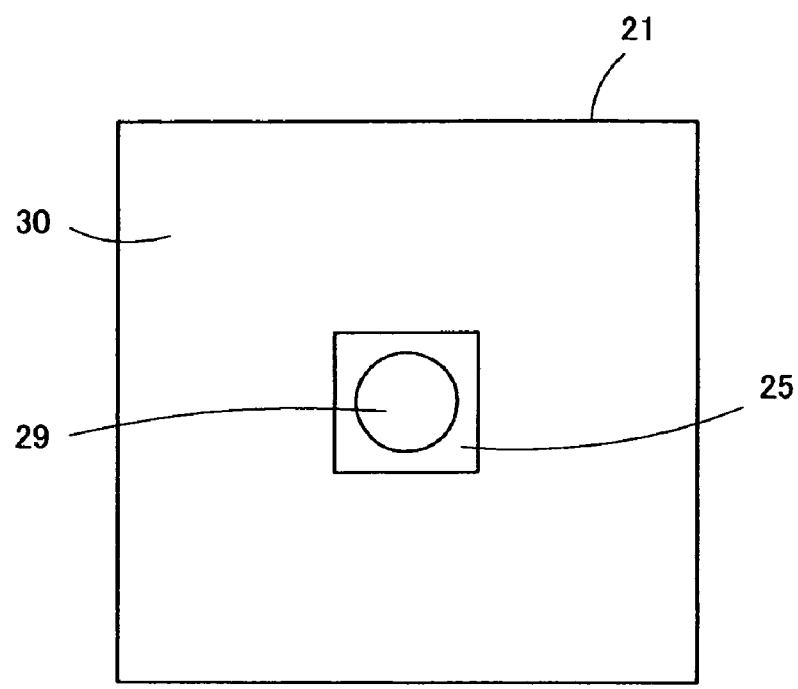
FIG. 62 shows a front elevation of the luminescent light source of the variant 22 of the present invention.

In addition, in the variant 22 as shown in FIG. 62, in the luminescent light source 21 the contour of which is square, the channel 25 the contour of which is square is formed and the circular direct output area 29 is provided at the center thereof. In addition, in the variant 23 of FIG. 63, in the luminescent light source the contour of which is hexagonal, the hexagonal channel 25 is provided and the circular direct output area 29 is provided at the center thereof. In the variant 24 of FIG. 64, in the luminescent light source 21 the contour of which is triangular, the triangular channel 25 is provided and the circular direct output area 29 is provided at the center thereof.

Figure 63:
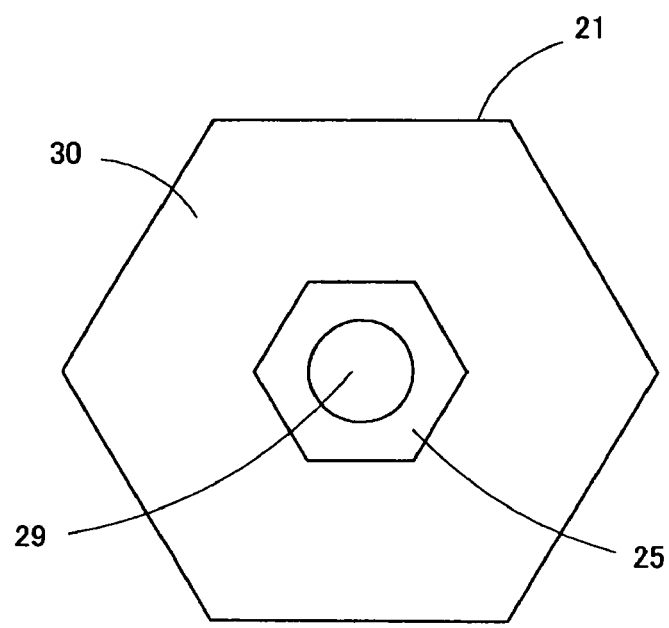
FIG. 63 shows a front elevation of the luminescent light source of the variant 23 of the present invention.
Figure 64:
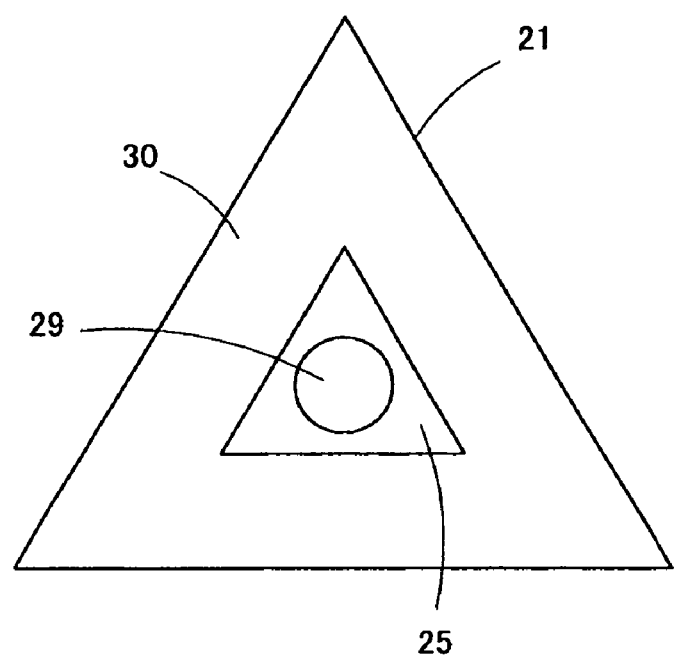
FIG. 64 shows a front elevation of the luminescent light source of the variant 24 of the present invention.
Figure 65:
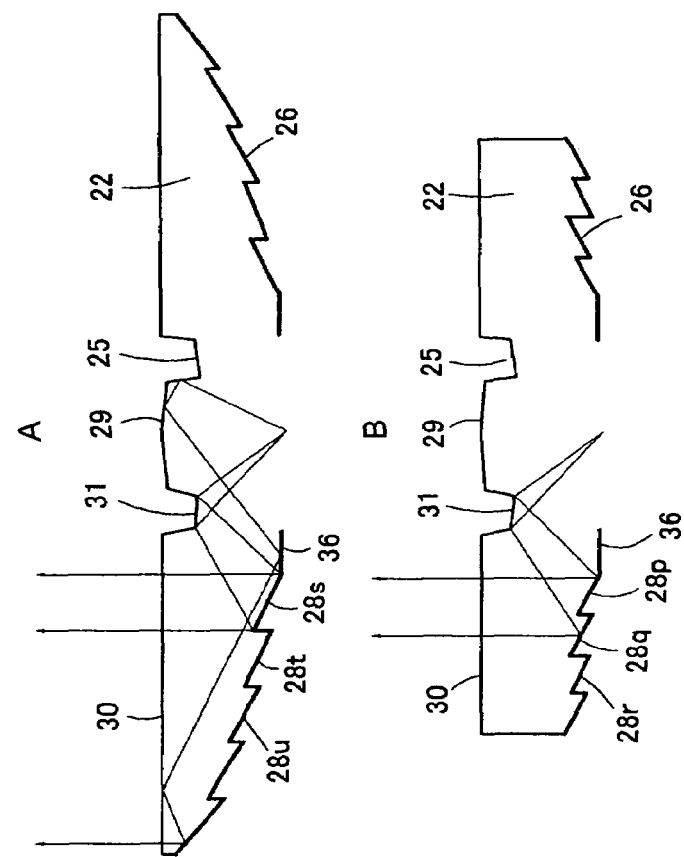
FIG. 65A shows a view of optical behavior of light in the cross section in the diagonal direction of the luminescent light source in the variant 18 as shown in FIG. 58, and B shows a view of optical behavior in the cross section in the opposite side direction.

Now we describe advantages of the variants 22 to 24 in which the outer circumferential shape of the channel 25 corresponds with the contour of the luminescent light source, as shown in FIG. 62 to FIG. 64, by comparing them with the variants 18, 19 of FIG. 58 and FIG. 59. FIG. 65A, B represent the variant 18 of FIG. 58 in which the toric channel 25 having constant width is provided. FIG. 65A shows a cross sectional view thereof in the diagonal direction, and FIG. 65B shows a cross sectional view thereof in the opposite side direction. As shown in FIG. 65A, B, length of the respective reflection areas 28p, 28q, 28r, . . . is shorter than length of the respective reflection areas 28s, 28t, 28u, . . . in the cross section in the diagonal direction, and in the opposite side direction, the respective reflection areas 28p, 28q, 28r, . . . are more offset to the center than in the diagonal direction. Thus, as shown in FIG. 65A, for instance, in the cross section in the diagonal direction, even if it is such designed that light is outputted from the light emitting devices 24R, 24G, 24B and the light reflected by the total reflection area 31 at the bottom of the channel 25 enters the whole second innermost reflection area 28s, in the cross section in the opposite side direction as shown in FIG. 65B, the light reflected by the total reflection area 31 enters not only the second innermost reflection area 28p, but also the third innermost reflection area 28q. Thus, even the reflection area 28q receives the light reflected by the total reflection area 31, thus complicating designing of the reflection area 28q.

Figure 66:
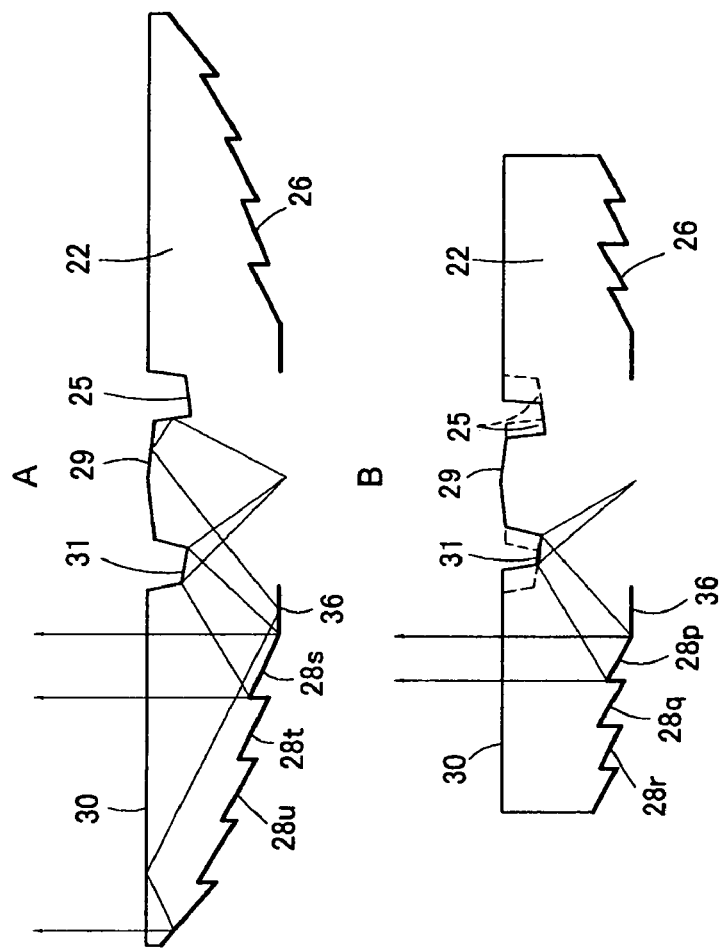
FIG. 66A shows a view of optical behavior of light in the cross section in the diagonal direction of the luminescent light source in the variant 19 as shown in FIG. 59, and B shows a view of optical behavior in the cross section in the opposite side direction.

On the one hand, FIG. 66A, B shows the variant 19 of FIG. 59 in which the channel 25 being square annular corresponding with the contour of the luminescent light source 22 and having constant width is provided. FIG. 66A shows a cross sectional view thereof in the diagonal direction, and FIG. 66B shows a cross sectional view thereof in the opposite side direction. Also in this case, length of each reflection area 28p, 28q, 28r, . . . in the cross section in the opposite side direction is shorter than length of each reflection area 28s, 28t, 28u, . . . in the diagonal direction, and in the opposite side direction, the respective reflection areas 28p, 28q, 28r, . . . are more offset to the center than in the diagonal direction. However, in the case of variant 18 of FIG. 58 and FIG. 65A, B, the position of the channel 25 is constant independent of the cross sectional direction, whereas in the case of variant 19 of FIG. 59 and FIG. 66A, B, in the cross section in the opposite side direction, the position of the channel 25 is more offset to the center than in the cross section in the diagonal direction. Thus, it can be such designed that in the cross section in the diagonal direction as shown in FIG. 66A, light outputted from the light emitting devices 24R, 24G, 24B, and reflected by the total reflection area 31 at the bottom of the channel 25 enters the whole second innermost reflection area 28s, and it can be further designed that even in the cross section in the opposite side direction as shown in FIG. 66B, the light reflected by the total reflection area 31 can enter the whole second innermost reflection area 28p. Thus, according to such the variant 19, the reflection areas can be easily designed. However, such the variant 19 has the disadvantage that stray light increases, as the direct output area 29 is square shaped, the light radially outputted from the light emitting devices 24R, 24G, 24B is reflected by the square direct output area 29 or transmits the square direct output area 29. Such the disadvantage can also be seen in the variants 20, 21 of FIG. 60 and FIG. 61.

At the same time, according to the variant 22 of FIG. 62 in which the contour of the channel 25 is formed to be square corresponding with the contour of the luminescent light source 21, and the circular direct output area 29 is provided in the center thereof, the light reflected by the total reflection area 31 in both the diagonal and the opposite side directions, similar to FIG. 66A, B, can enter the specific reflection areas 28s, 28p. In addition, according to the variant 22, as the direct output area 29 is circular, light radially outputted from the light emitting devices 24R, 24G, 24B can be reflected or transmit in each direction, which can thus restrain occurrence of stray light. The effect can also be seen in the variants 23, 24 of FIG. 63 and FIG. 64.

Figure 67:
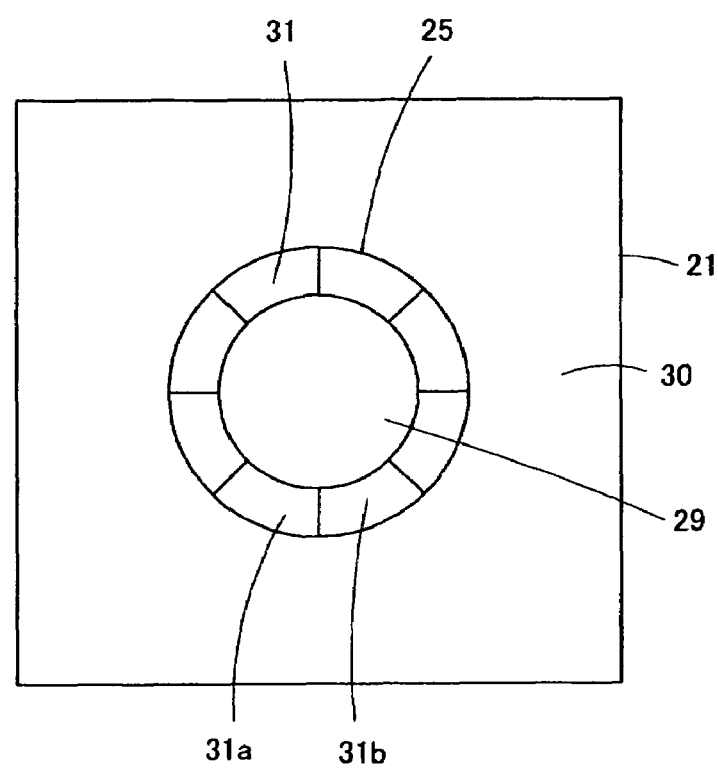
FIG. 67 shows a front elevation of the luminescent light source of the variant 25 of the present invention.
Figure 68:
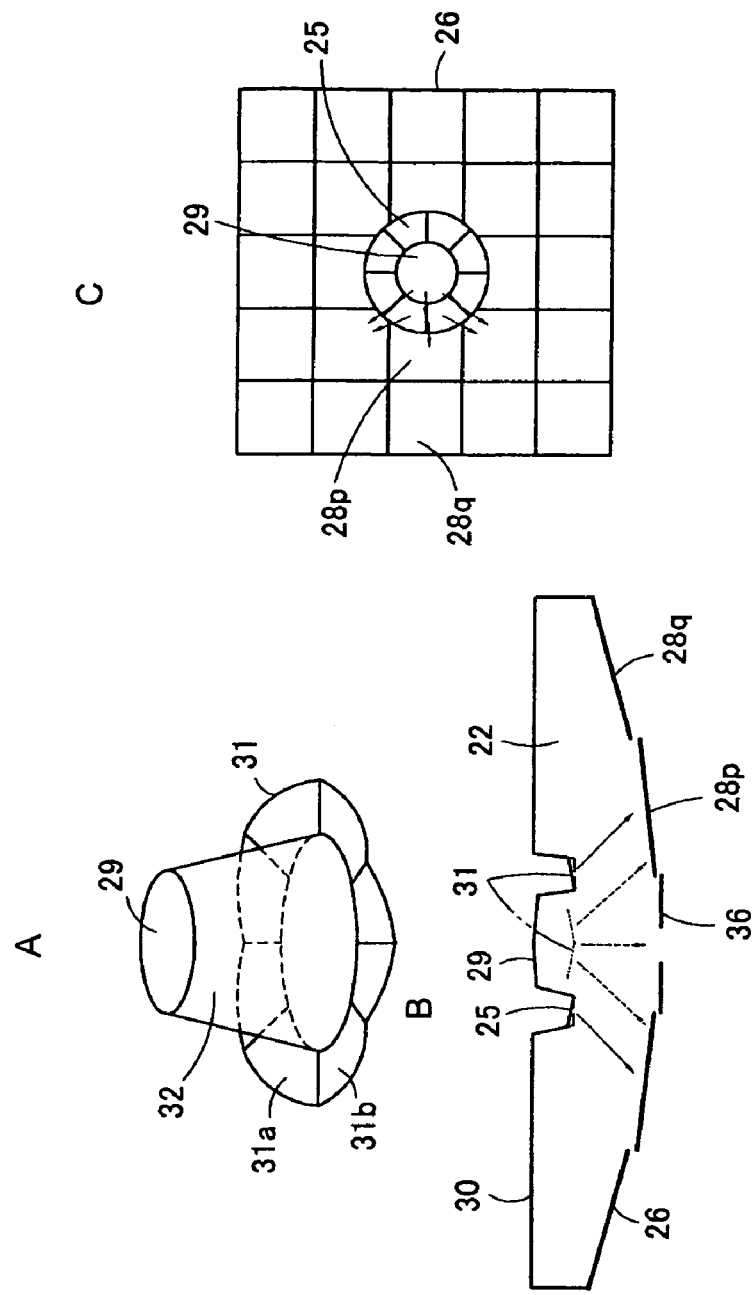
FIG. 68A shows a perspective view of the structure of the direct output area and the total reflection area in the luminescent light source in the variant 25, B shows a cross sectional view in the opposite side direction of the luminescent light source, and C shows a schematic view of how light is distributed to each reflection area of the luminescent light source.

The variant 25 as shown in FIG. 67 is the luminescent light source 21 having the total reflection area 31 at the bottom of the channel 25 divided into a plurality of segment areas 31a, 31b, . . . . In addition, FIG. 68A shows a perspective view illustrating the structure of the direct output area 29 and the total reflection area 31 of the luminescent light source 21. FIG. 68B, C shows the optical behavior in the luminescent light source 21. FIG. 68B shows a schematic cross sectional view of the luminescent light source 21 in the opposite side direction and FIG. 68C is a front elevation thereof. In addition, the total reflection area 31 shown by the chain line in FIG. 68B represents a part of the total reflection area 31 located before the cross section of the same figure. According to the variant 25, the degree of freedom in designing increases and the optical intensity or color uniformity can be improved. In the variant 25, the total reflection area 31 is divided into eight equal parts, and the segment area 331*a* and the segment area 31*b* are alternately arranged along the circumferential direction. The segment area 31*a* and the segment are 31*b* are reversely inclined along the circumferential direction, and are arranged so that light outputted in the opposite side direction can be spread in both sides, and light outputted in the diagonal direction can converge in the diagonal direction.

Figure 69:
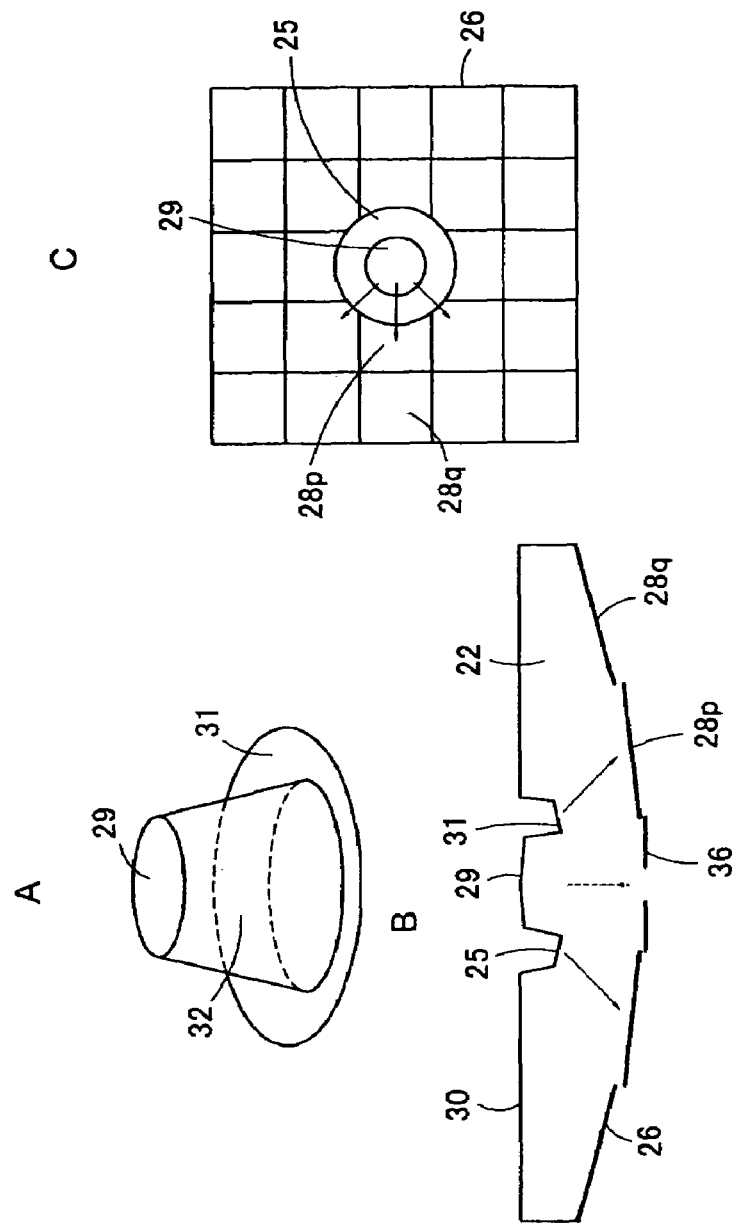
FIG. 69A shows a perspective view showing the structure of the direct output area and the total reflection area in the luminescent light source in the comparable example, B shows a cross sectional view in the opposite side direction of the luminescent light source, and C shows a schematic view of how light is distributed to each reflection area of the luminescent light source.

FIG. 69A shows a perspective view of the total reflection area 31 having uniform tilt angle around the center of the axis of the direct output area 29. FIG. 69B, C shows optical behavior in the luminescent light source. FIG. 69B shows a schematic sectional view of the luminescent light source 21 in the opposite side direction, and FIG. 69C shows a front elevation thereof. In the comparative example having such the total reflection area 31, as shown in FIG. 69B, C, light outputted from the light emitting devices 24R, 24G, 24B is spread radially after being reflected by the total reflection area 31, and thus as the result of the light being equally distributed in each direction, the amount of light in the diagonal direction is short. At the same time, in the variant 25 as shown in FIG. 67, since, as shown in FIG. 68B, C, the segment area 31*a* and the segment area 31*b* are arranged to spread the light outputted in the opposite side direction in both sides, and converge the light outputted in the diagonal direction to the diagonal direction, more light can be collected in the diagonal direction than in the opposite side direction, and great amount of light can be distributed in the diagonal direction, which can thus improve optical intensity or color uniformity in the front face of the luminescent light source 21.

Figure 70:
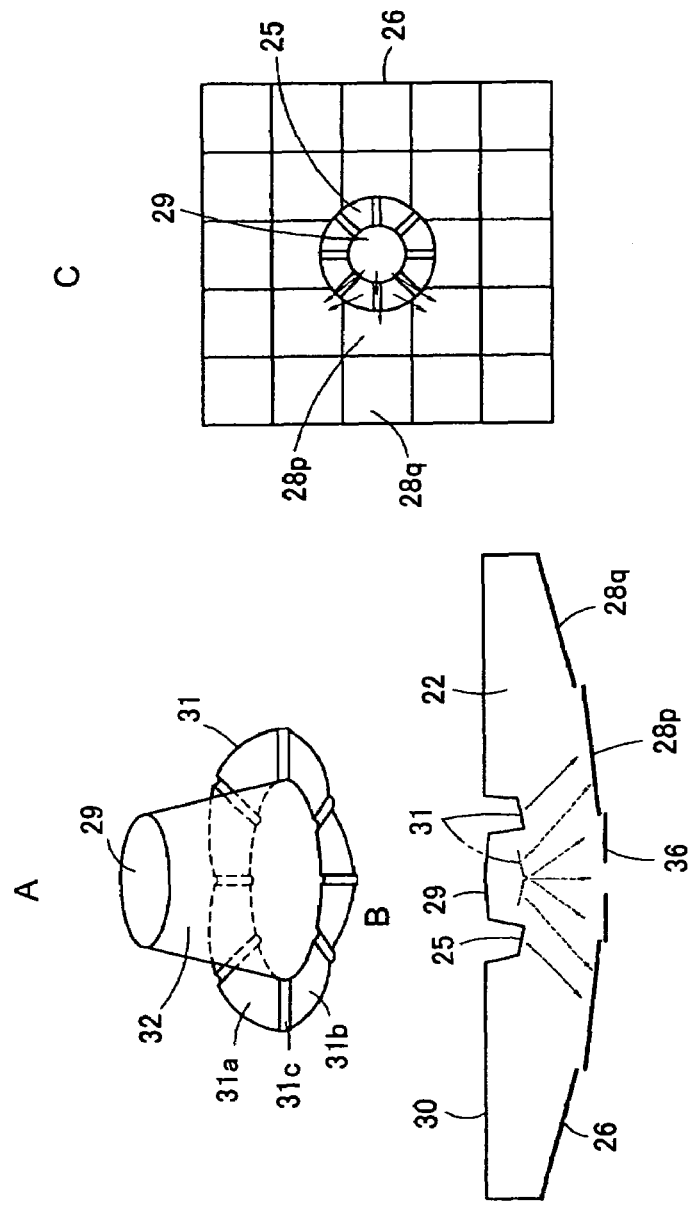
FIG. 70A shows a perspective view of the structure of the direct output area and the total reflection area in the luminescent light source in the variant 26 of the present invention, B shows a cross sectional view in the opposite side direction of the luminescent light source, and C shows a schematic view of how light is distributed to each reflection area of the luminescent light source.

FIG. 70A shows a perspective view of the structure of the direct output area 29 and the total reflection area 31 of the luminescent light source 21 according to the variant 26. FIG. 70B, C shows the optical behavior in the luminescent light source 21. FIG. 70B shows a schematic cross sectional view of the luminescent light source 21 in the opposite side direction, and FIG. 70C is a front elevation thereof. In addition, the total reflection area 31 shown by the chain line in FIG. 68B represents a part of the total reflection area 31 located before the cross section of the same figure. In the variant 26, in the luminescent light source 21 of FIG. 67, a chamfer shaped segment area 31*c* is further formed between the segment area 31*a* and the segment area 31*b* of the total reflection area 31. According to the variant 26, since light outputted from the light emitting devices 24R, 24G, 24B can be further diffused in the chamfer shaped segment area 31*c*, optical strength or color uniformity in the front side of the luminescent light source 21 can be improved.

Figure 71:
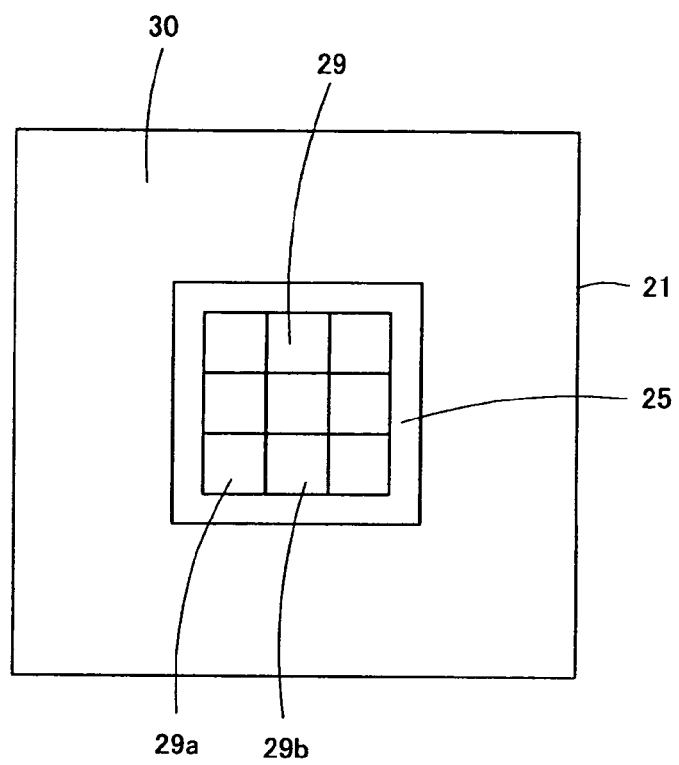
FIG. 71 shows a front elevation of the luminescent light source of the variant 27 of the present invention.
Figure 72:
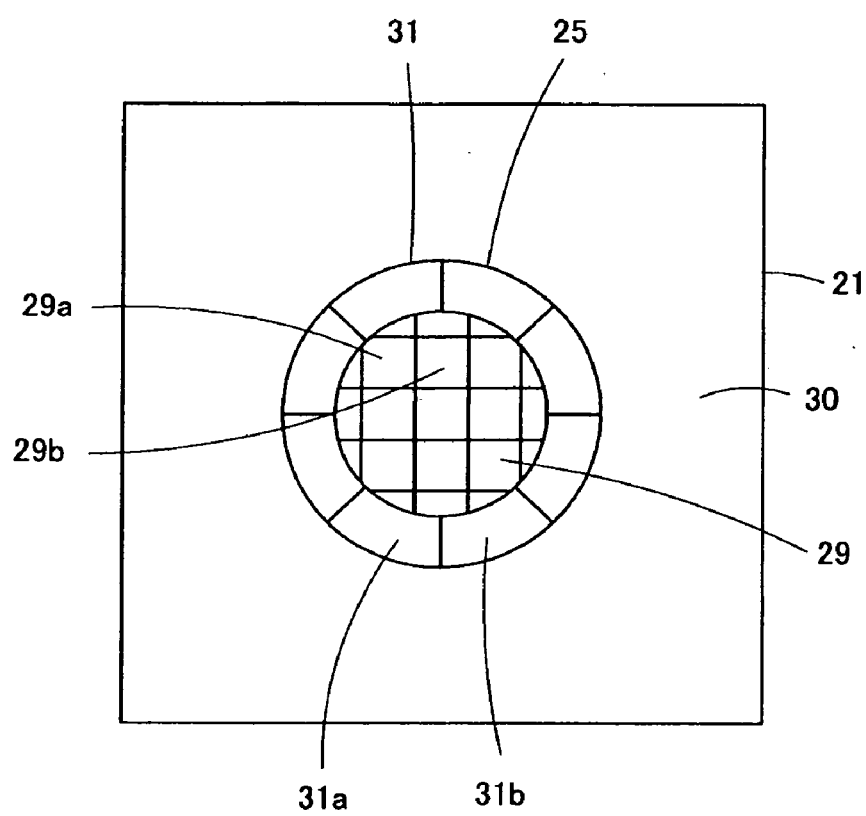
FIG. 72 shows a front elevation of the luminescent light source of the variant 28 of the present invention.

In addition, in the variant 27 of FIG. 71, the surface of the direct output area 29 is divided into a plurality of segment areas 29*a*, 29*b*, . . . , and each segment area 29*a*, 29*b*, . . . has a different inclination direction or tilt angle. Since amount of light to be distributed to each reflection area 28*i*, 28*j*, 28*k* can be adjusted by dividing the direct output area 29 and adjusting the inclination direction or tilt angle of each segment area 29*a*, 29*b*, . . . , optical intensity or color uniformity in the front face of the luminescent light source 21 can be improved. In addition, as with the variant 28 of FIG. 72, the total reflection area 31 at the bottom of the channel 25 is divided, and the surface of the direct output area 29 may be further divided into the plurality of segment areas 29*a*, 29*b*, . . . .

Figure 73:
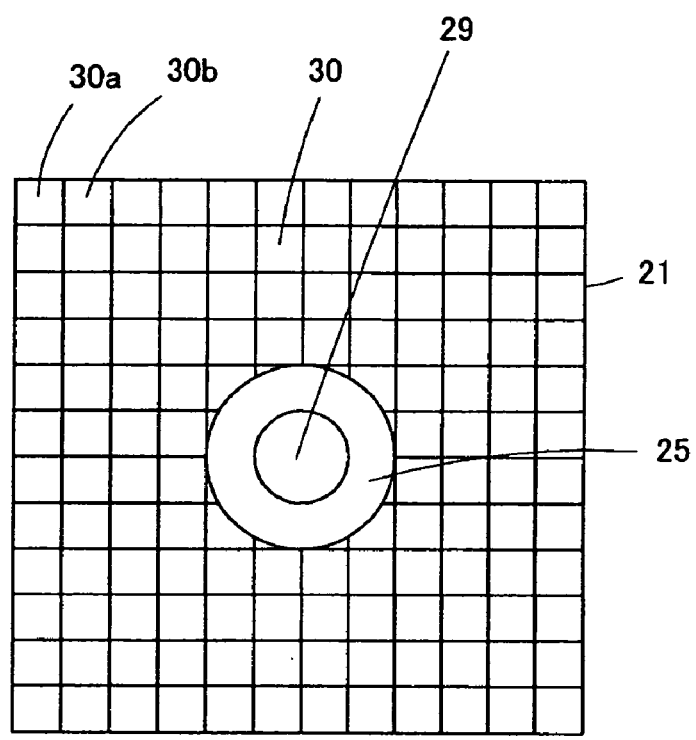
FIG. 73 shows a front elevation of the luminescent light source of the variant 29 of the present invention.
Figure 74:
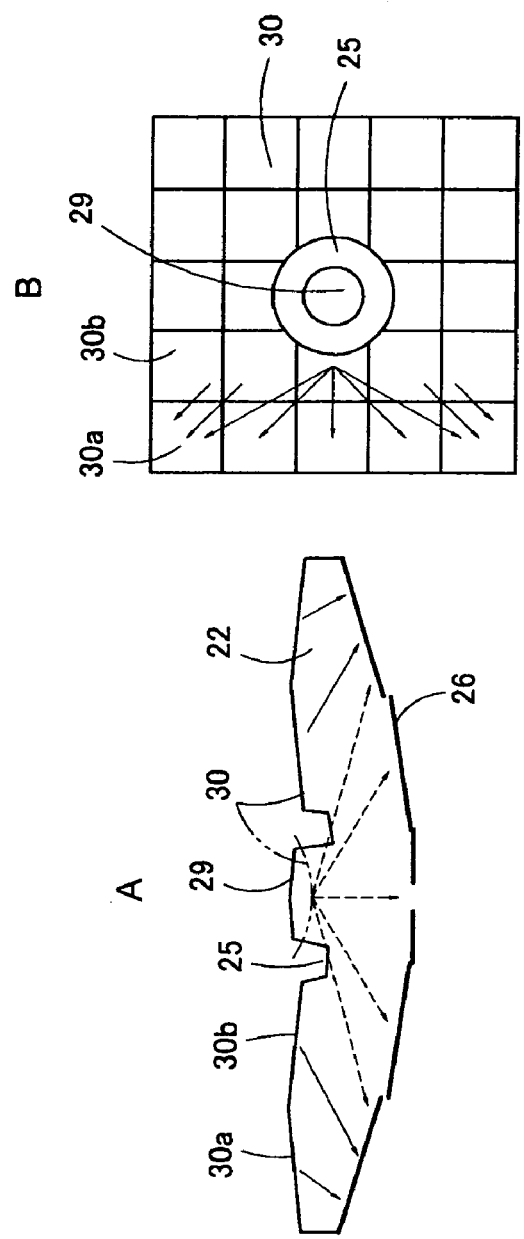
FIG. 74A shows a cross sectional view in the opposite side direction, illustrating optical behavior in the luminescent light source according to the variant 29, and B shows a front elevation thereof.
Figure 75:
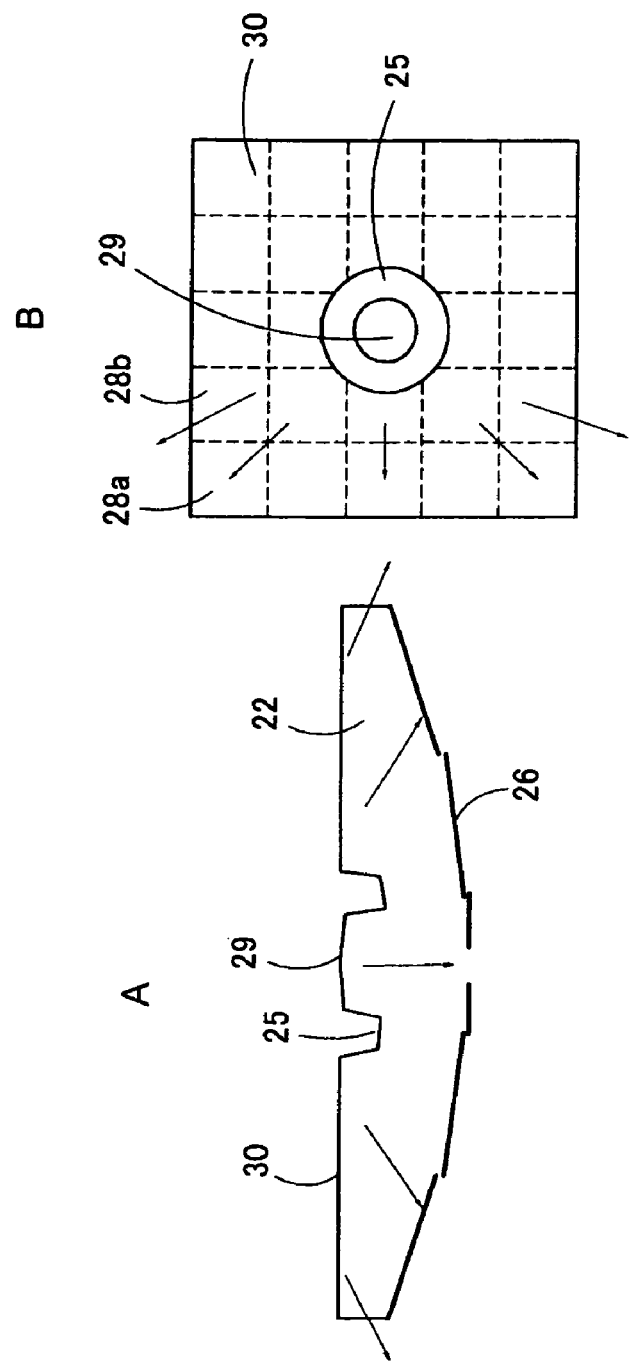
FIG. 75A shows a cross sectional view in the opposite side direction, illustrating optical behavior in the luminescent light source of the comparable example, and B shows a front elevation thereof.

FIG. 73 shows a front elevation of the luminescent light source 21 according to the variant 29. In the variant 29, the total reflection area 30 is divided into the plurality of grid-like segment areas 30*a*, 30*b*, . . . , thereby forming a convex-concavo pattern on the surface of the total reflection area 30. In the luminescent light source 21 having the flat total reflection area 30, as with the comparative example as shown in FIG. 75A, B, leakage of light from the outer circumferential surface of the mold unit 22 may lead to loss of light amounts, or a corner area tends to be dark because the amount of light at the corner area in the diagonal direction that is located farthest from the light emitting device is short. At the same time, as with the variant 29 of FIG. 73, if the total reflection area is divided into more than on segment area 30*a*, 30*b*, . . . , as shown in FIG. 74A, B, light can be guided to any of the reflection areas 28*i*, 28*j*, 28*k*, . . . , by adjusting inclination or tilt angle of each segment area 30*a*, 30*b*, . . . of the total reflection area 30. Thus, as the degree of freedom in designing increases, a difference in light amounts of light arriving at each reflection area of the reflecting mirror 26 can be alleviated, thus improving optical intensity or color uniformity on the front face of the luminescent light source.

In the variant 29, in the opposite side direction, for instance, light can be diffused by bending an area of the total reflection area 30 like a concave lens, or light amounts to be distributed to the diagonal direction can be increased by inclining an area of the total reflection area 30 to the diagonal direction and having the light reflected to the diagonal direction, which can thus prevent the corner area in the diagonal direction from being dark. In addition, the area of the total reflection area 30 at the end of the diagonal direction reduces lost light that leaks from the outer circumferential surface of the luminescent light source 21 and effectively utilizes light, it would be desirable to incline it to the center or to the opposite side direction.

Figure 76:
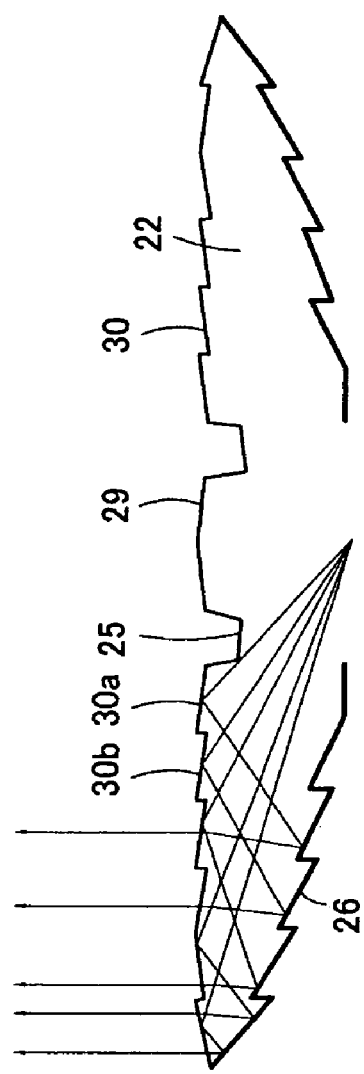
FIG. 76 shows a cross sectional view illustrating optical behavior in the luminescent light source of the variant 29.
Figure 77:
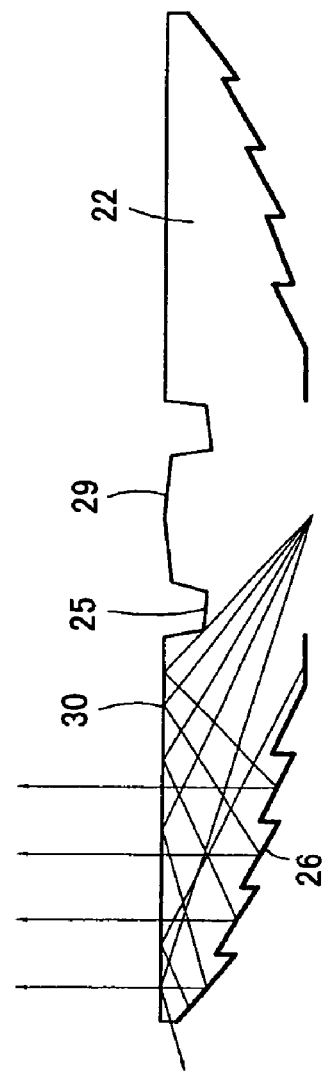
FIG. 77 shows a cross sectional view illustrating optical behavior in the luminescent light source of the comparable example.

In addition, in the luminescent light source in which the total reflection area 30 is flat, as with the comparative example as shown in FIG. 77, although light is equally outputted from the total reflection area 30, optical intensity is weak because light to be outputted from the end of the total reflection area 30 has long light path length from the light emitting device, and thus, it tends to be dark at the edge of the luminescent light source. In addition, light leaks from the outer circumferential surface of the luminescent light source, becoming lost light, which may reduce utilization efficiency of light. In the variant 29, in such a case, as shown in FIG. 76, among the total reflection areas 30, the segment areas 30*a*, 30*b*, . . . other than those in the periphery, are inclined to the outer circumferential side, and light reflected by the segment areas 30*a*, 30*b*, . . . other than those in the periphery can be transmitted to the periphery, which can thus prevent the periphery of the luminescent light source 21 from being dark. In addition, by inclining the segment areas 30*a*, 30*b*, . . . in the periphery among the total reflection areas 30, lost light that leaks from the outer circumferential surface of the luminescent light source 21 can be reduced. Thus, according to the variant 29, the degree of freedom in designing increases, and optical intensity or color uniformity can improve.

Embodiment 2

Figure 78:
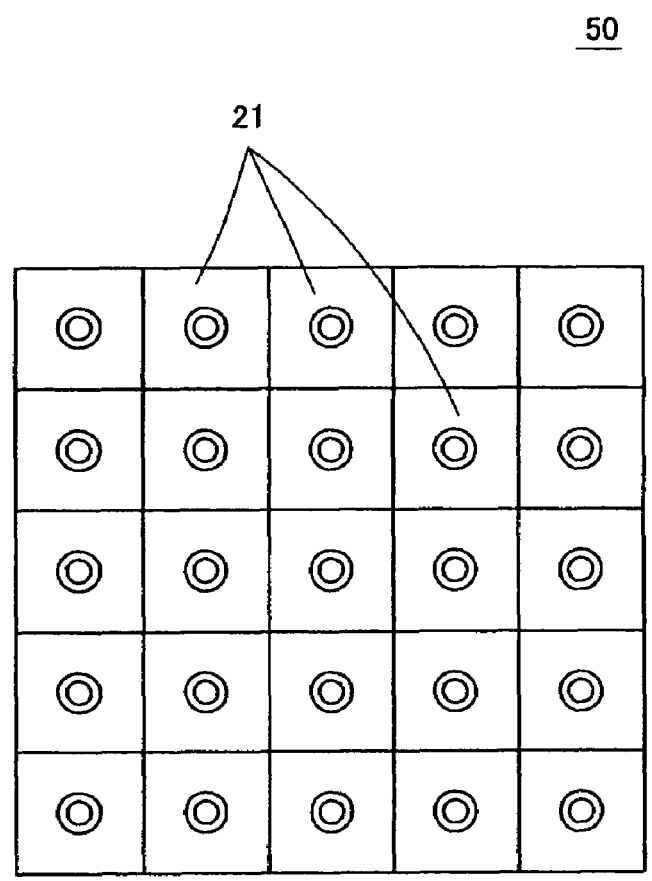
FIG. 78 shows a front elevation of a luminescent light source array according to Embodiment 2 of the present invention.

FIG. 78 shows a front elevation of the luminescent light source array 50 according to Embodiment 2 of the present invention. The luminescent light source array 50 is an array of the luminescent light sources 21 according to the invention either without a gap or with some gap in the same plane. The luminescent light source array 50 is used as a liquid crystal display or a backlight for liquid crystal display television, or a lighting system, and is advantageous in that it is thin, has excellent color reproducibility, is less susceptible to color irregularity, and has high color uniformity.

In addition, if the luminescent light source array 50 using the luminescent light source 21 of the present invention is used as a backlight, the front space (space to the target surface) needed for equalization of optical intensity and color mixing degree can be short, information display equipment (e.g., a liquid crystal display to be discussed later) in which the luminescent light source array 50 is incorporated as a backlight can be thin, thereby enabling an attempt to thin the information display equipment.

In addition, in the luminescent light source array 50 using the luminescent light source 21, the light emitting devices does not become crowded even though the array of the luminescent light sources 21 is made, thus improving radiation performance, and enabling simplification of a radiation mechanism. Then, simplification of the radiation mechanism contributes to thinning of the information display equipment such as the liquid crystal display, etc.

Embodiment 3

Figure 79:
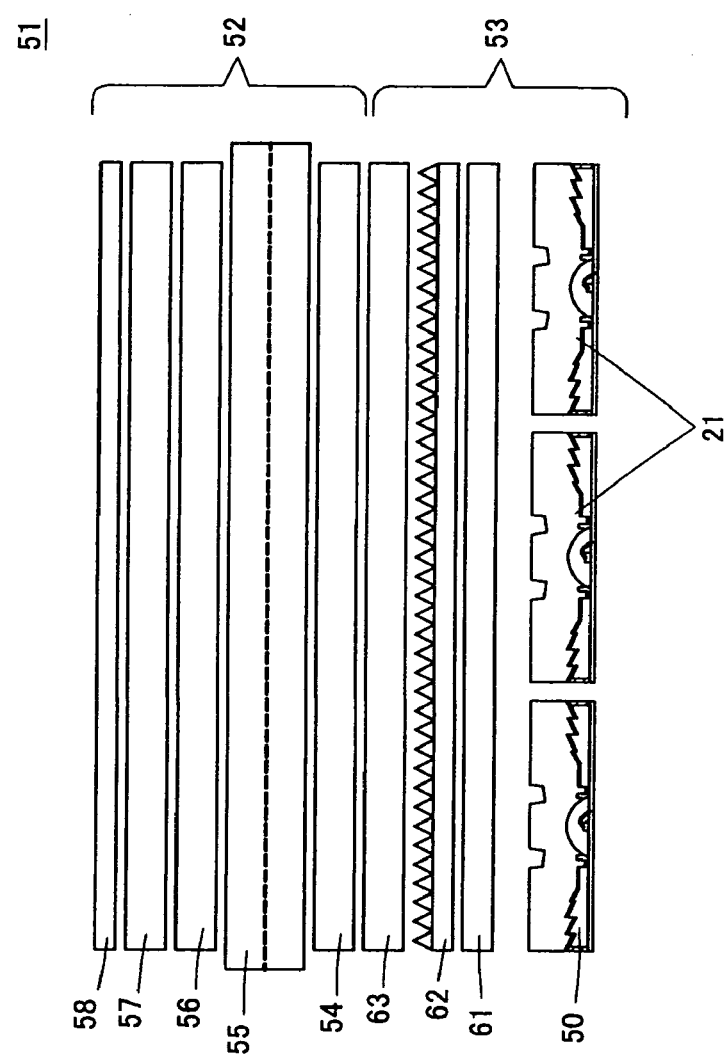
FIG. 79 shows a schematic cross sectional view of the structure of a liquid crystal display according to Embodiment 3 of the present invention.

FIG. 79 shows a schematic cross section of the structure of a liquid crystal display (liquid crystal display device) 51 according to Embodiment 3 of the present invention. The liquid crystal display 51 is comprised by arranging a backlight 53 on the rear of a liquid crystal panel 52. The liquid crystal panel is a general one, and comprised by sequentially laminating a polarization plate 54, a liquid crystal cell 55, a phase difference plate 56, a polarization plate 57 and antireflection film 58 from the rear.

The backlight 53 is comprised by placing a light diffusion film 61, a prism sheet 62 and a luminance improvement film 63 on the front face on the luminescent light source array 50 on which a plurality of luminescent light sources 21 are arranged. As described later, the luminescent light source 21 is formed like a square when viewed from the front, and the luminescent light source array 50 is comprised by arrangement of about one hundred or several hundreds of the luminescent light sources 21 in a grid. By diffusing light outputted from the luminescent light source array 50, the light diffusion film 61 not only attempts to equalize luminance, but also serves to uniformly mix light of respective colors outputted from the luminescent light source array 50. By having obliquely incident light to refract or internally reflected, the prism sheet 62 bends the prism sheet in vertical direction and has the light transmit, thereby improving luminance on the front face the backlight 53.

The luminance improvement film 53 is a film that has straight polarized light within a plane of polarization to transmit and reflects the straight polarized light being orthogonal thereto, and serves to improve utilization efficiency of light to be outputted from the luminescent light source array 50. In fact, the luminance improvement film 63 is arranged to coincide with the plane of polarization of the polarizing plate 54. Thus, among light to be outputted from the luminescent light source 50, although light for which the polarizing plate 54 and the plane of polarization coincide transmits through the luminance improvement film 63 and enters the liquid crystal panel 52, light for which the polarizing plate 54 is orthogonal to the plane of polarization is reflected back by the luminance improvement film 63 and enters the luminance improvement film 63 again. The light reflected back by the luminance improvement film 63 is reflected by the luminescent light source array 50, and a part of it transmits the luminance improvement film 63 because the plane of polarization is rotating till it re-enters the luminance improvement film 63. Repetition of such actions enables most of light outputted from the light source array 50 to be utilized by the liquid crystal panel 52, thus improving luminance of the liquid crystal panel.

Figure 80:
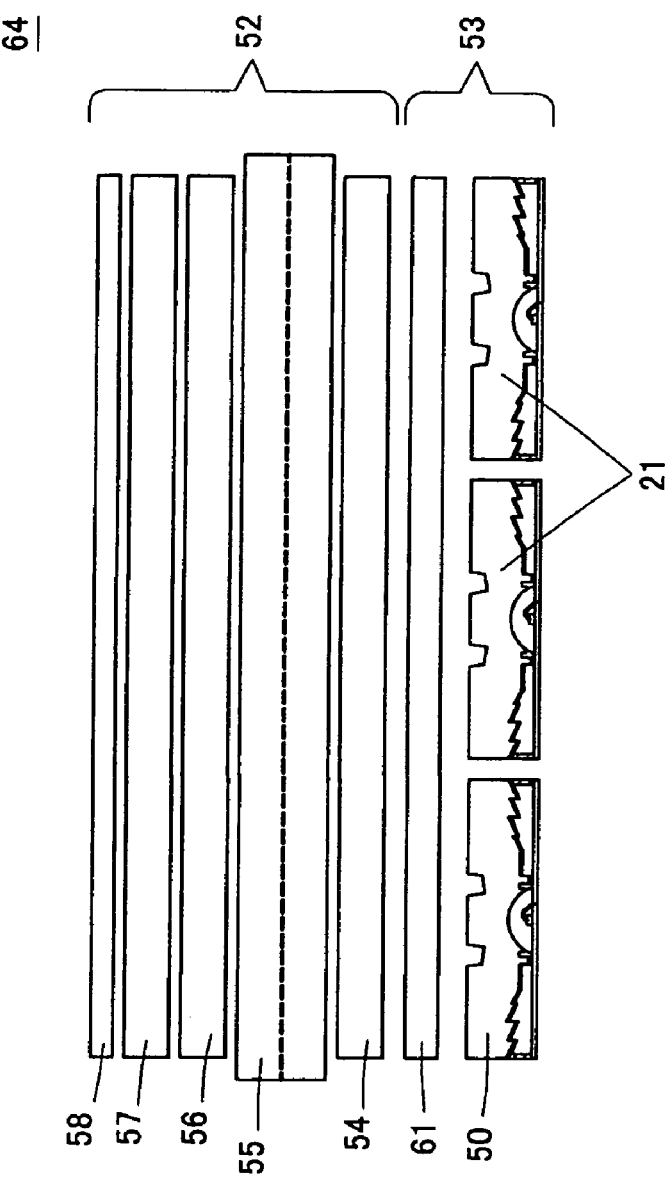
FIG. 80 shows a schematic cross sectional view of the structure of the liquid crystal display according to the variant of Embodiment 3 of the present invention.

FIG. 80 shows a schematic sectional view of a variant of Embodiment 3. In the liquid crystal display 64 according to the variant, the prism sheet 62 and the luminance improvement film 63 that were placed between the luminescent light source array 50 and the liquid crystal panel 52 in the liquid crystal display 51 of FIG. 79 can be omitted. Of course, either one of the prism sheet 62 and the luminance improvement film 63 can be omitted. Use of the luminescent light source array 50 of the present invention could enable adjustment with high precision of the direction or spread of light to be outputted from the luminescent light source 21, thus eliminating the need for the prism sheet used in the conventional liquid crystal display device or backlight. In addition, use of the luminescent light source array 50 of the present invention could improve optical intensity by adjusting the direction or spread of the light to be outputted from the luminescent light source 21, thus eliminating the need for the luminance improvement film used in the conventional liquid crystal display device.

Thus, according to the variant, since the prism sheet or the luminance improvement film can be omitted, the liquid crystal display 64 can be thinned and assembly cost can also be reduced. In addition, since loss of light in the prism sheet or the luminance improvement film is eliminated, the light use efficiency can be improved.

Embodiment 4

Figure 81:
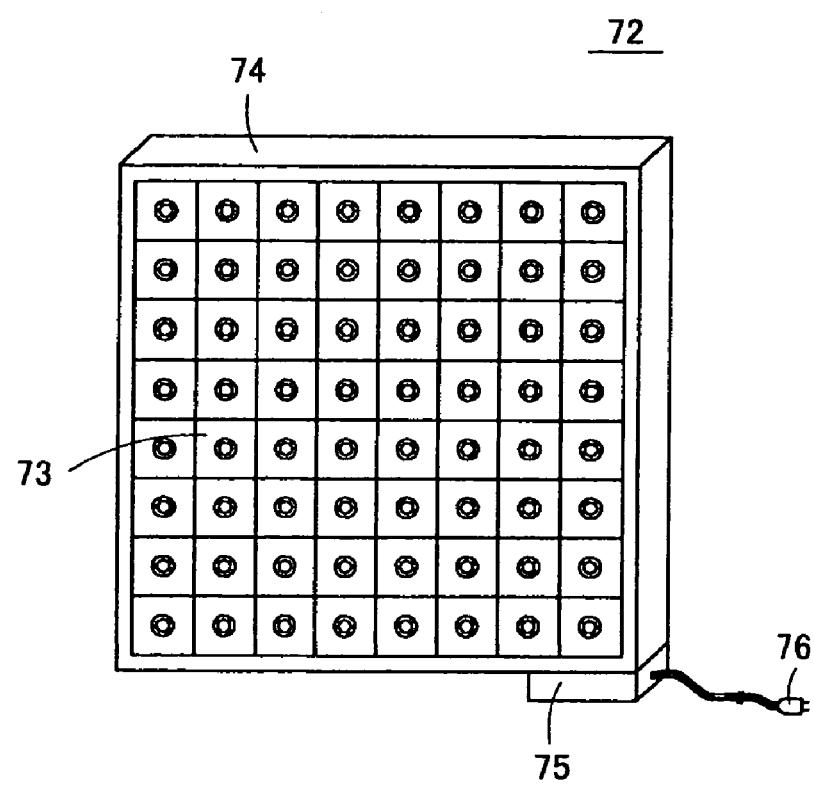
FIG. 81 shows a perspective view of a lighting system for indoor lighting using the luminescent light source array according to Embodiment 4 of the present invention.

FIG. 81 shows a perspective view of a lighting system 72 for indoor lighting that uses the luminescent light source array of the present invention. The lighting system 72 houses the luminescent light source array 73 of the invention in a housing 74, and a power supply unit 75 is attached to the housing 74. A plug from the power supply unit 75 is inserted into the outlet of a commercial power supply and the switch is turned on, alternating power supply to be supplied from the outlet of the commercial power supply is converted into direct current power, by which the luminescent light supply array 73 emits light. Thus, the lighting system 72 can be used in, for instance, a wall-mounted indoor lighting system.

What is claimed is:

1. A luminescent light source, comprising:
a curve shaped reflecting mirror for reflecting light, a light guide unit arranged on a light reflection surface of the reflecting mirror, and
a light emitting device arranged in the central area of the reflecting mirror and outputting light to the light guide unit, wherein the light guide unit has a light output surface for outputting to the outside light outputted from the light emitting device and light of the light emitting device reflected by the reflecting mirror, the reflecting mirror has a light reflection surface for reflecting light outputted from the light emitting device and reflected by the light output surface of the light guide unit, wherein
the light reflection surface comprises a plurality of reflection areas arranged along at least two directions, each of the reflection areas having a plurality of characterizing parameters that characterize the curve of the reflection area, and at least one of the plurality of characterizing parameters is different in adjacent reflection areas, wherein each of the reflection areas is a conic surface, and the characterizing parameter is a curvature radius or a conic coefficient that characterizes the conic surface.

2. The luminescent light source according to claim 1, wherein the reflection areas are square, rectangular, hexagonal, triangular, or fan-shaped.

3. The luminescent light source according to claim 1, wherein the reflection areas being adjacent in an intermediate direction of respective directions in which the reflection areas are arranged have mutually different characterizing parameters that characterize the curve of each reflection area.

4. The luminescent light source according to claim 1, further comprising a plurality of light emitting devices having different luminescent colors.

5. The luminescent light source according to claim 1, wherein adjacent reflection areas reflect light of each light emitting device so that light outputted from mutually different light emitting devices are outputted to the front face direction substantially vertically.

6. The luminescent light source according to claim 1, wherein the surface of the light guide unit is divided into a plurality of areas, and for every divided area, a tilt angle or inclination direction of the surface thereof is changed.

7. A luminescent light source, comprising:
a curve shaped reflecting mirror for reflecting light, a light guide unit arranged on a light reflection surface of the reflecting mirror, and
a light emitting device arranged in the central area of the reflecting mirror and outputting light to the light guide unit, wherein the light guide unit has a light output surface for outputting to the outside light outputted from the light emitting device and light of the light emitting device reflected by the reflecting mirror, the reflecting mirror has a light reflection surface for reflecting light outputted from the light emitting device and reflected by the light output surface of the light guide unit, wherein
the light reflection surface is a mosaic arrangement of a plurality of reflection areas, each of the reflection areas having a plurality of characterizing parameters that characterize the curve of the reflection area, and at least one of the plurality of characterizing parameters is different in adjacent reflection areas, wherein
each of the reflection areas is a conic surface, and the characterizing parameter is a curvature radius or a conic coefficient that characterizes the conic surface.

8. A luminescent light source array, comprising:
a plurality of arranged luminescent light sources, wherein the luminescent light sources comprise: a curve shaped reflecting minor for reflecting light, a light guide unit
arranged on a light reflection surface of the reflecting minor, and a light emitting device arranged in the central area of the reflecting mirror and outputting light to the light guide unit, wherein the light guide unit has a light output surface for outputting to the outside light outputted from the light emitting device and light of the light emitting device reflected by the reflecting mirror, the reflecting minor has a light reflection surface for reflecting light outputted from the light emitting device and reflected by the light output surface of the light guide unit, wherein
the light reflection surface is comprised of a plurality of reflection areas arranged along at least two directions, each of the reflection areas having a plurality of characterizing parameters that characterize the curve of the reflection area, and at least one of the plurality of characterizing parameters is different in adjacent reflection areas, wherein each of the reflection areas is a conic surface, and the characterizing parameter is a curvature radius or a conic coefficient that characterizes the conic surface.

9. A method of setting a light path of a luminescent light source, comprising the steps of:
preparing the luminescent light source comprising a curve shaped reflecting mirror for reflecting light, a light guide unit arranged on a light reflection area of the reflecting mirror, and a light emitting device for outputting light to the light guide unit;
arranging the tight emitting device in the central area of the reflecting minor; configuring a light output surface for outputting to the light guide unit light outputted from the light emitting device, and to the outside light of the light emitting device reflected by the reflecting mirror;
configuring a light reflection surface for reflecting to the reflecting mirror light outputted from the light emitting device and reflected by the light output surface of the light guide unit, and forming on the light reflection surface a plurality of reflection areas arranged along at least two directions, and
individually setting a reflection direction of reflected light for every reflection area, each of the reflection areas having a plurality of characterizing parameters that characterize the curve of the reflection area, and at least one of the plurality of characterizing parameters is different in adjacent reflection areas, wherein
each of the reflection areas is a conic surface, and the characterizing parameter is a curvature radius or a conic coefficient that characterizes the conic surface.

10. A method of outputting light of a luminescent light source, comprising the steps of:
preparing the luminescent light source comprising a curve shaped reflecting mirror for reflecting light, a light guide unit arranged on a light reflection surface of the reflecting mirror, and a light emitting device for outputting light to the light guide unit, arranging the light emitting device in the central area of the reflecting mirror;
configuring a light output surface for outputting to the light guide unit light outputted from the light emitting device, and to the outside light of the light emitting device reflected by the reflecting mirror;
configuring a light reflection surface for reflecting to the reflecting mirror light outputted from the light emitting device and reflected by the light output surface of the light guide unit, forming on the light reflection surface a plurality of reflection areas arranged along at least two directions, each of the reflection areas having a plurality of characterizing parameters that characterize the curve of the reflection area, and at least one of the plurality of characterizing parameters is different in adjacent reflection areas, and
individually setting a reflection direction of reflected light for every reflection area, and outputting light by adjusting an outputting direction and an optical intensity distribution of light outputted from the light output surface of the light guide unit, wherein
each of the reflection areas is a conic surface, and the characterizing parameter is a curvature radius or a conic coefficient that characterizes the conic surface.

11. A lighting system, comprising:
a luminescent light source array in which a plurality of luminescent light sources are arranged, and a power supply unit for supplying power to the luminescent light source array, wherein the luminescent light source comprises:
a curve shaped reflecting mirror for reflecting light, a light guide unit arranged on a light reflection surface of the reflecting mirror, and a light emitting device arranged in the central area of the reflecting mirror and outputting light to the light guide unit, wherein the light guide unit has a light output surface for outputting to the outside light outputted from the light emitting device and light of the light emitting device reflected by the reflecting mirror, the reflecting mirror has a light reflection surface for reflecting light outputted from the light emitting device and reflected by the light output surface of the light guide unit, wherein the light reflection surface is comprised of a plurality of reflection areas arranged along at least two directions, each of the reflection areas having a plurality of characterizing parameters that characterize the curve of the reflection area, and at least one of the plurality of characterizing parameters is different in adjacent reflection areas, wherein each of the reflection areas is a conic surface, and the characterizing parameter is a curvature radius or a conic coefficient that characterizes the conic surface.

12. A backlight, comprising:

a plurality of luminescent Light sources arranged in a same plane; the luminescent light sources, comprising:

a curve shaped reflecting mirror for reflecting light, a light guide unit arranged on a light reflection surface of the reflecting mirror, and a light emitting device arranged in the central area of the reflecting mirror and outputting light to the light guide unit, wherein the light guide unit has a light output surface for outputting to the outside light outputted from the light emitting device and light of the light emitting device reflected by the reflecting mirror, the reflecting mirror has a light reflection surface for reflecting light outputted from the light emitting device and reflected by the light output surface of the light guide unit, wherein the light reflection surface is comprised of a plurality of reflection areas arranged along at least two directions, each of the reflection areas having a plurality of characterizing parameters that characterize the curve of the reflection area, and at least one of the plurality of characterizing parameters is different in adjacent reflection areas, wherein each of the reflection areas is a conic surface, and the characterizing parameter is a curvature radius or a conic coefficient that characterizes the conic surface.

13. A liquid crystal display device, comprising:

a luminescent light source array in which a plurality of luminescent light sources are arranged, and a liquid crystal display panel arranged opposed to the luminescent light source array; the luminescent light source, comprising:

a curve shaped reflecting minor for reflecting light, a light guide unit arranged on a light reflection surface of the reflecting mirror, and a light emitting device arranged in the central area of the reflecting mirror and outputting light to the light guide unit, wherein the light guide unit has a light output surface for outputting to the outside light outputted from the light emitting device and light of the light emitting device reflected by the reflecting mirror, the reflecting mirror has a light reflection surface for reflecting light outputted from the light emitting device and reflected by the light output surface of the light guide unit, wherein the light reflection surface is comprised of a plurality of reflection areas arranged along at least two directions, each of the reflection areas having a plurality of characterizing parameters that characterize the curve of the reflection area, and at least one of the plurality of characterizing parameters is different in adjacent reflection areas, wherein each of the reflection areas is a conic surface, and the characterizing parameter is a curvature radius or a conic coefficient that characterizes the conic surface.

14. The liquid crystal display device according to claim 13, wherein there is no optical element for directing a traveling direction of light outputted from the luminescent light source array to the front face direction of the liquid crystal display panel, between the luminescent light source array and the liquid crystal display panel.

15. The liquid crystal display device according to claim 13, wherein there is no optical element for improving luminance of light for illuminating the liquid crystal display panel, between the luminescent light source array and the liquid crystal display panel.

* * * * *

UNITED STATES PATENT AND TRADEMARK OFFICE
CERTIFICATE OF CORRECTION

PATENT NO. : 7,470,042 B2  Page 1 of 1
APPLICATION NO. : 11/333121
DATED : December 30, 2008
INVENTOR(S) : Takahiro Ayabe et al.

It is certified that error appears in the above-identified patent and that said Letters Patent is hereby corrected as shown below:

In the Claims:

In Claim 8, column 35, line 49, "minor" should be --mi<u>rr</u>or--.

In Claim 8, column 35, line 51, "minor" should be --mi<u>rr</u>or--.

In Claim 8, column 35, line 57 "minor" should be --mi<u>rr</u>or--.

In Claim 9, column 36, line 11, "tight" should be --<u>l</u>ight--.

In Claim 9, column 36, line 12, "minor" should be --mi<u>rr</u>or--.

In Claim 12, column 37, line 23, "Light" should be --<u>l</u>ight--.

In Claim 13, column 38, line 10, "minor" should be --mi<u>rr</u>or--.

Signed and Sealed this

Seventeenth Day of February, 2009

JOHN DOLL
*Acting Director of the United States Patent and Trademark Office*